(12) United States Patent
Fayad et al.

(10) Patent No.: US 11,729,342 B2
(45) Date of Patent: Aug. 15, 2023

(54) DESIGNATED VIEW WITHIN A MULTI-VIEW COMPOSITED WEBCAM SIGNAL

(71) Applicant: Owl Labs Inc., Somerville, MA (US)

(72) Inventors: Joao Renato Kavamoto Fayad, Somerville, MA (US); Tom Bushman, Somerville, MA (US); Ilya Moskovko, Somerville, MA (US); Howard Brown, Somerville, MA (US)

(73) Assignee: OWL LABS INC., Somerville, MA (US)

( * ) Notice: Subject to any disclaimer, the term of this patent is extended or adjusted under 35 U.S.C. 154(b) by 0 days.

(21) Appl. No.: 17/394,373

(22) Filed: Aug. 4, 2021

(65) Prior Publication Data
US 2022/0046186 A1    Feb. 10, 2022

Related U.S. Application Data

(60) Provisional application No. 63/126,534, filed on Dec. 17, 2020, provisional application No. 63/087,876, (Continued)

(51) Int. Cl.
 *H04N 5/272* (2006.01)
 *H04N 5/262* (2006.01)
 *H04N 23/698* (2023.01)

(52) U.S. Cl.
CPC ........... *H04N 5/2628* (2013.01); *H04N 5/272* (2013.01); *H04N 23/698* (2023.01)

(58) Field of Classification Search
CPC ... H04N 5/2628; H04N 5/23238; H04N 5/272
See application file for complete search history.

(56) References Cited

U.S. PATENT DOCUMENTS

| 5,914,940 A | 6/1999 | Fukuoka et al. |
| 6,388,654 B1 | 5/2002 | Platzker et al. |

(Continued)

FOREIGN PATENT DOCUMENTS

| AU | 2016242980 B2 | 8/2019 |
| AU | 2019261804 B2 | 1/2022 |

(Continued)

OTHER PUBLICATIONS

"Universal Serial Bus Device Class Definition for Video Devices: Video Device Examples, Revision 1.5", Video Class v1.5 document set, <URL: https://www.usb.org/document-library/video-class-v15-document-set>, USB Implementers Forum, Inc., Aug. 9, 2012 (527 pages).

(Continued)

*Primary Examiner* — Thai Q Tran
*Assistant Examiner* — Jose M Mesa
(74) *Attorney, Agent, or Firm* — Wilmer Cutler Pickering Hale and Dorr LLP

(57) ABSTRACT

A system or method for imaging a panorama view may include a physical writing surface, a camera capturing the panorama view, and a sensor identifying a bearing of interest within the view. The system may maintain a coordinate map of the view, adjust an aspect ratio of the view, and generate a scaled panorama view based on the adjusted aspect ratio. The system may determine a coordinate of a designated view based on coordinate instructions and may generate a designated view signal based on the determined coordinate of the designated view comprising at least a portion of the physical writing surface. The system may composite a video signal including one or more of the scaled panorama view signal, a stage view signal, or the designated view signal, and may transmit the composite video signal.

49 Claims, 31 Drawing Sheets

Related U.S. Application Data filed on Oct. 6, 2020, provisional application No. 63/061,173, filed on Aug. 4, 2020.

(56) References Cited

U.S. PATENT DOCUMENTS

| | | | |
|---|---|---|---|
| 8,180,112 | B2 | 5/2012 | Kurtz et al. |
| 9,154,730 | B2 | 10/2015 | Lee et al. |
| 10,091,412 | B1 | 10/2018 | Feng et al. |
| 10,636,154 | B2 | 4/2020 | Schnittman et al. |
| 10,991,108 | B2 | 4/2021 | Schnittman et al. |
| 2003/0081820 | A1 | 5/2003 | Avinash |
| 2003/0103647 | A1 | 6/2003 | Rui et al. |
| 2004/0008423 | A1 | 1/2004 | Driscoll, Jr. et al. |
| 2004/0254982 | A1 | 12/2004 | Hoffman et al. |
| 2004/0263611 | A1 | 12/2004 | Cutler |
| 2004/0263636 | A1 | 12/2004 | Cutler |
| 2005/0099492 | A1 | 5/2005 | Orr |
| 2005/0122389 | A1 | 6/2005 | Miao |
| 2005/0140779 | A1 | 6/2005 | Schulz et al. |
| 2006/0164552 | A1 | 7/2006 | Cutler |
| 2007/0263076 | A1 | 11/2007 | Andrews et al. |
| 2007/0297682 | A1 | 12/2007 | Zhang et al. |
| 2008/0218582 | A1 | 9/2008 | Buckler |
| 2009/0002476 | A1 | 1/2009 | Cutler |
| 2009/0002477 | A1 | 1/2009 | Cutler |
| 2009/0079812 | A1 | 3/2009 | Crenshaw et al. |
| 2009/0219387 | A1 | 9/2009 | Marman et al. |
| 2010/0123770 | A1 | 5/2010 | Friel et al. |
| 2010/0149305 | A1 | 6/2010 | Catchpole et al. |
| 2010/0157016 | A1 | 6/2010 | Sylvain |
| 2011/0033086 | A1 | 2/2011 | Kubota |
| 2012/0154513 | A1 | 6/2012 | Su |
| 2012/0268553 | A1 | 10/2012 | Talukder |
| 2013/0271560 | A1 | 10/2013 | Diao |
| 2014/0114664 | A1 | 4/2014 | Khan et al. |
| 2014/0168354 | A1 | 6/2014 | Clavel et al. |
| 2014/0233801 | A1 | 8/2014 | Cho et al. |
| 2015/0156416 | A1* | 6/2015 | Filip .................. H04N 5/23238 348/36 |
| 2015/0205457 | A1 | 7/2015 | Woo et al. |
| 2015/0271446 | A1 | 9/2015 | Browne et al. |
| 2015/0304366 | A1 | 10/2015 | Bader-Natal |
| 2015/0341719 | A1 | 11/2015 | Sun |
| 2016/0112469 | A1 | 4/2016 | Liu |
| 2016/0112673 | A1 | 4/2016 | Feng et al. |
| 2016/0134838 | A1 | 5/2016 | Tangeland et al. |
| 2016/0150186 | A1 | 5/2016 | Huber et al. |
| 2016/0292884 | A1 | 10/2016 | Schnittman et al. |
| 2016/0295128 | A1 | 10/2016 | Schnittman et al. |
| 2017/0076491 | A1* | 3/2017 | Jiang .................... G06T 15/205 |
| 2017/0133036 | A1 | 5/2017 | Cohen et al. |
| 2017/0372449 | A1 | 12/2017 | Yarvis et al. |
| 2018/0122044 | A1* | 5/2018 | Bai ........................... G06T 3/40 |
| 2018/0374192 | A1* | 12/2018 | Kunkel ................ G06T 3/0087 |
| 2019/0087198 | A1 | 3/2019 | Frascati et al. |
| 2021/0082131 | A1 | 3/2021 | Schnittman et al. |
| 2022/0070371 | A1 | 3/2022 | Bushman et al. |
| 2022/0232262 | A1 | 7/2022 | Nicholson |

FOREIGN PATENT DOCUMENTS

| | | |
|---|---|---|
| CN | 1479525 A | 3/2004 |
| CN | 1155292 C | 6/2004 |
| CN | 107980221 A | 5/2018 |
| JP | H5-122689 | 5/1993 |
| JP | H10-145763 A | 5/1998 |
| JP | H11-331827 A | 11/1999 |
| JP | 2004-248125 A | 9/2004 |
| JP | 2005341015 A | 12/2005 |
| JP | 2006263348 A | 10/2006 |
| JP | 2007124149 A | 5/2007 |
| JP | 2007-158860 A | 6/2007 |
| JP | 2009182980 A | 8/2009 |
| JP | 2009278568 A | 11/2009 |
| JP | 4908543 | 4/2012 |
| JP | 2012099906 A | 5/2012 |
| JP | 2013115527 A | 6/2013 |
| KR | 100953509 B1 | 4/2010 |
| WO | WO-2000030402 A1 | 5/2000 |
| WO | WO-2014123306 | 8/2014 |
| WO | WO-2014178235 | 11/2014 |
| WO | WO-2016161288 | 10/2016 |
| WO | WO-2022031872 | 2/2022 |
| WO | WO-2022/046810 | 3/2022 |

OTHER PUBLICATIONS

Extended European Search Report for European Patent Application Serial No. 16774312.9, dated Nov. 28, 2018 (11 pages).

International Search Report and the Written Opinion issued by the Korean Patent Office as International Searching Authority in international Patent Application No. PCT/US2016/025557, dated Jul. 14, 2016 (12 pages).

Wikipedia, "List of Bluetooth profiles", <URL: https://en.wikipedia.org/wiki/List_of_Bluetooth_profiles>, accessed Oct. 27, 2021 (16 pages).

Wikipedia, "USB video device class", <URL: hrrp://https://en.wikipedia.org/wiki/USB_video_device_class>, accessed Dec. 8, 2021 (4 pages).

Wikipedia, "Wi-Fi Direct", <URL: https://en.wikipedia.org/wiki/Wi-Fi_Direct>, Dec. 8, 2021 (6 pages).

International Search Report and Written Opinion issued by the European Patent Office as International Searching Authority in International Application No. PCT/US21/44578, dated Jan. 4, 2022 (22 pages).

Bernardin, et al., "Audio-Visual Multi-Person Tracking and Identification for Smart Environments", Computer Supported Cooperative Work, ACM, MM'07, pp. 661-670, Sep. 23-28, 2007 (10 pages).

Dimitrova, et al., "Video Classification Based on HMM Using Text and Faces", IEEE 10th European Signal Processing Conference, pp. 1-4, Sep. 4, 2000 (4 pages).

EP Search Report issued for European Patent Application No. EP21209838.8, dated Mar. 18, 2022 (12 pages).

International Search Report and Written Opinion issued by European Patent Office as International Searching Authority for International Application No. PCT/US21/47404, dated Feb. 28, 2022 (23 pages).

Luo, et al., "Multiple Object Tracking: A Literature Review", <URL: https://arxiv.org/pdf/1409.7618v4.pdf>, accessed May 22, 2017 (18 pages).

Zhang, et al., "Semantic Saliency Driven Camera Control for Personal Remote Collaboration", IEEE 10th Workshop on Multimedia Signal Processing, pp. 28-33, Oct. 8, 2008 (6 pages).

* cited by examiner

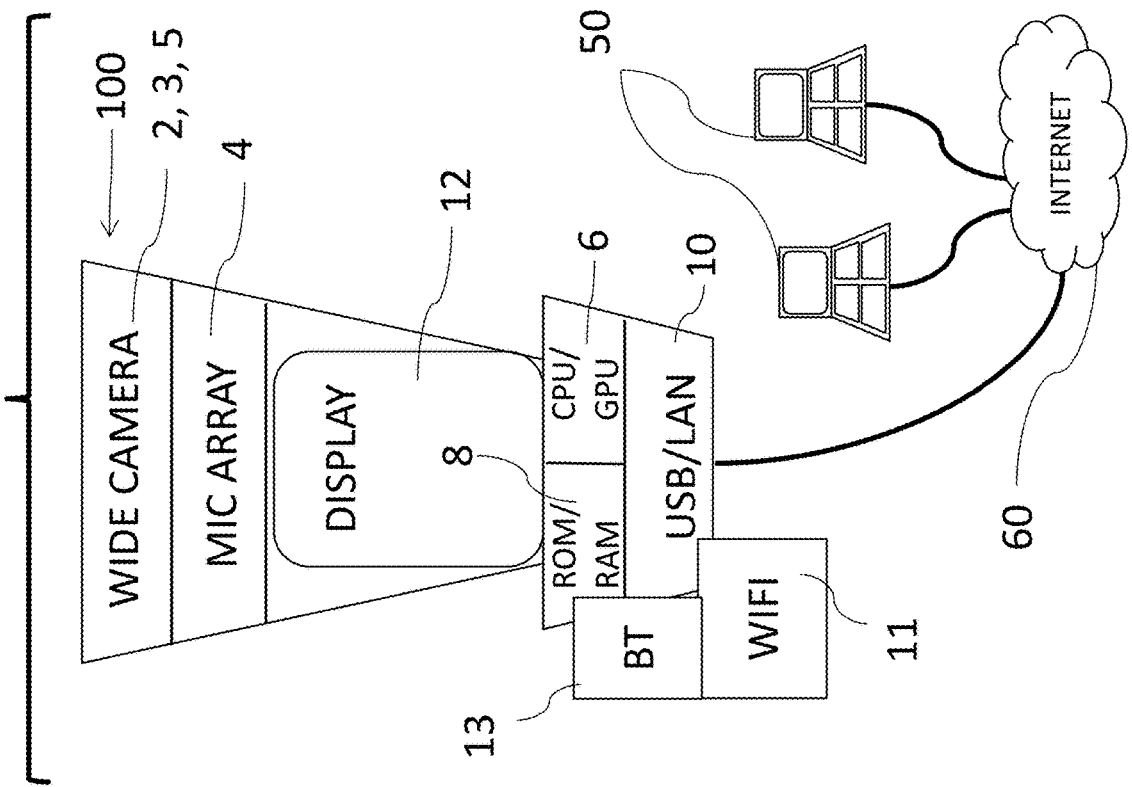
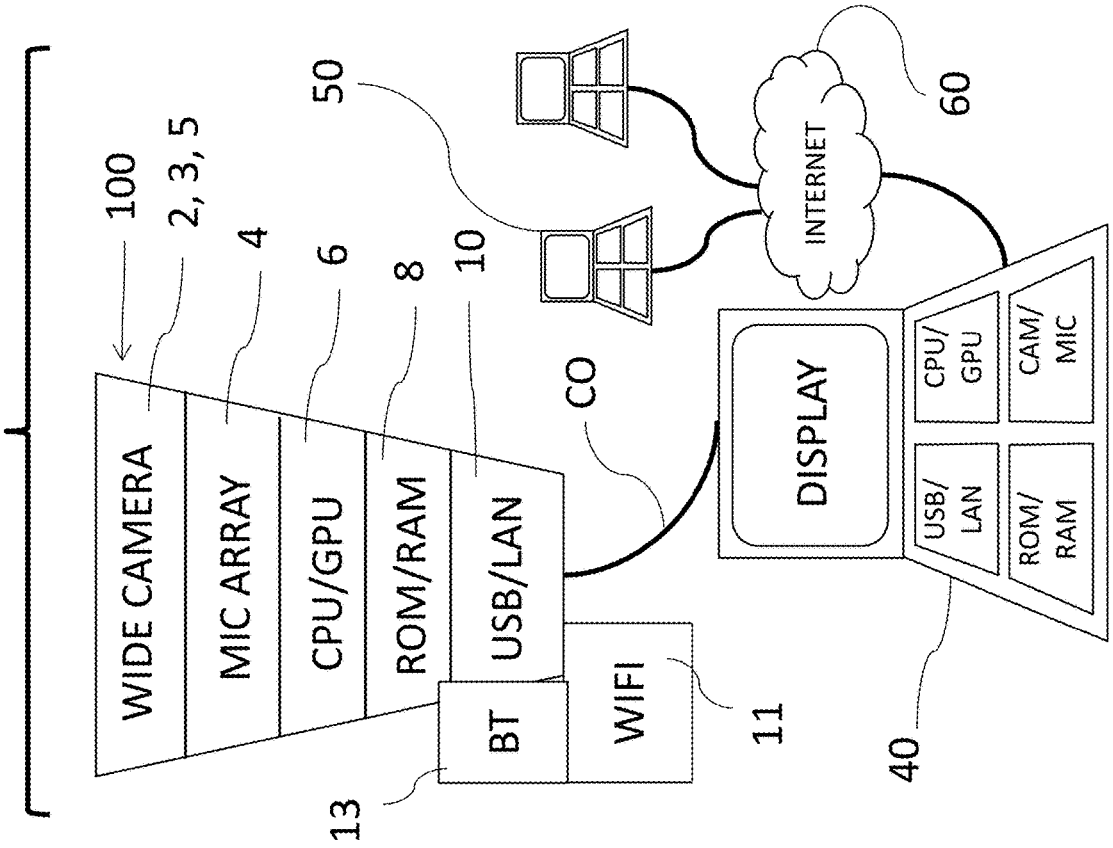

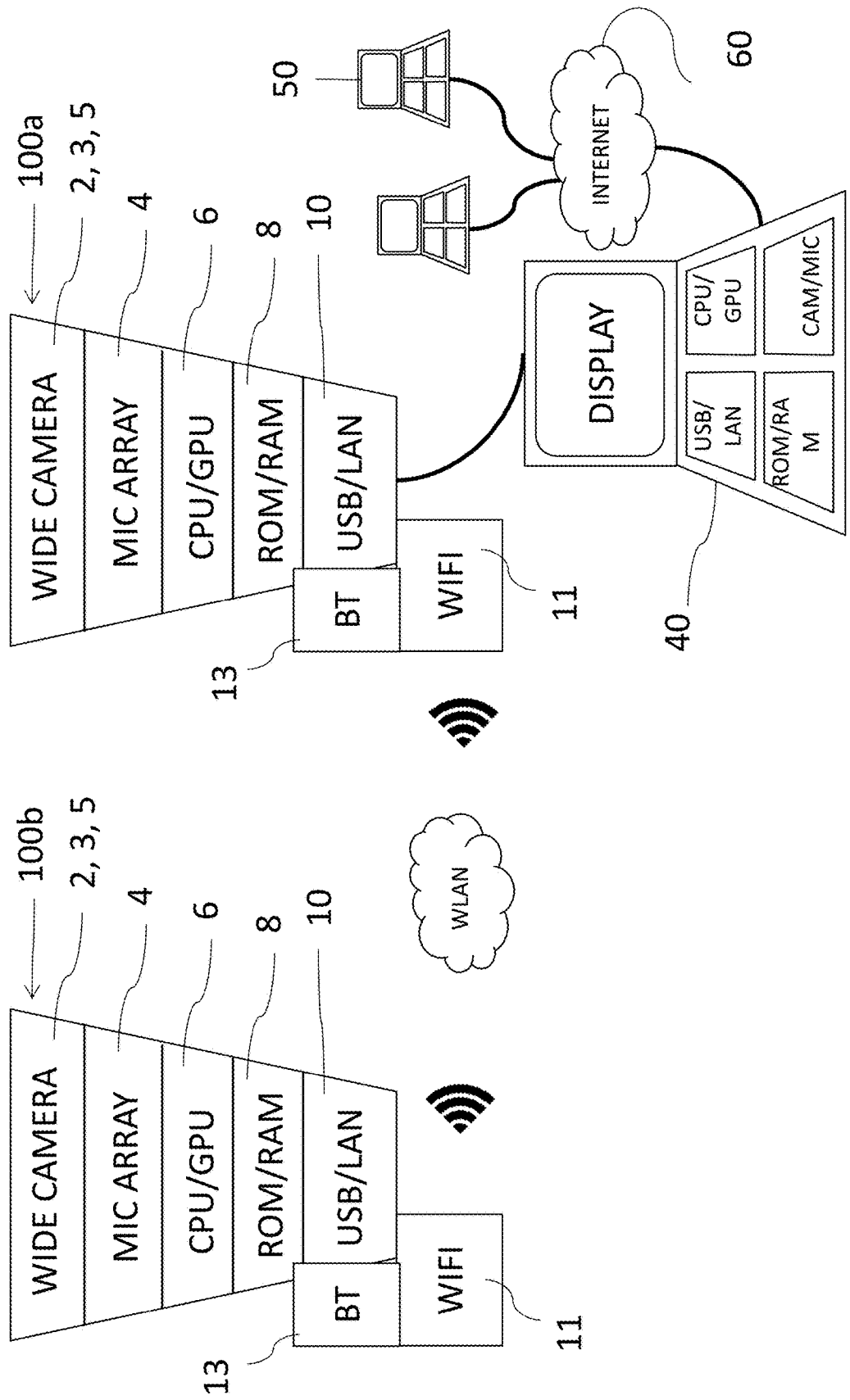

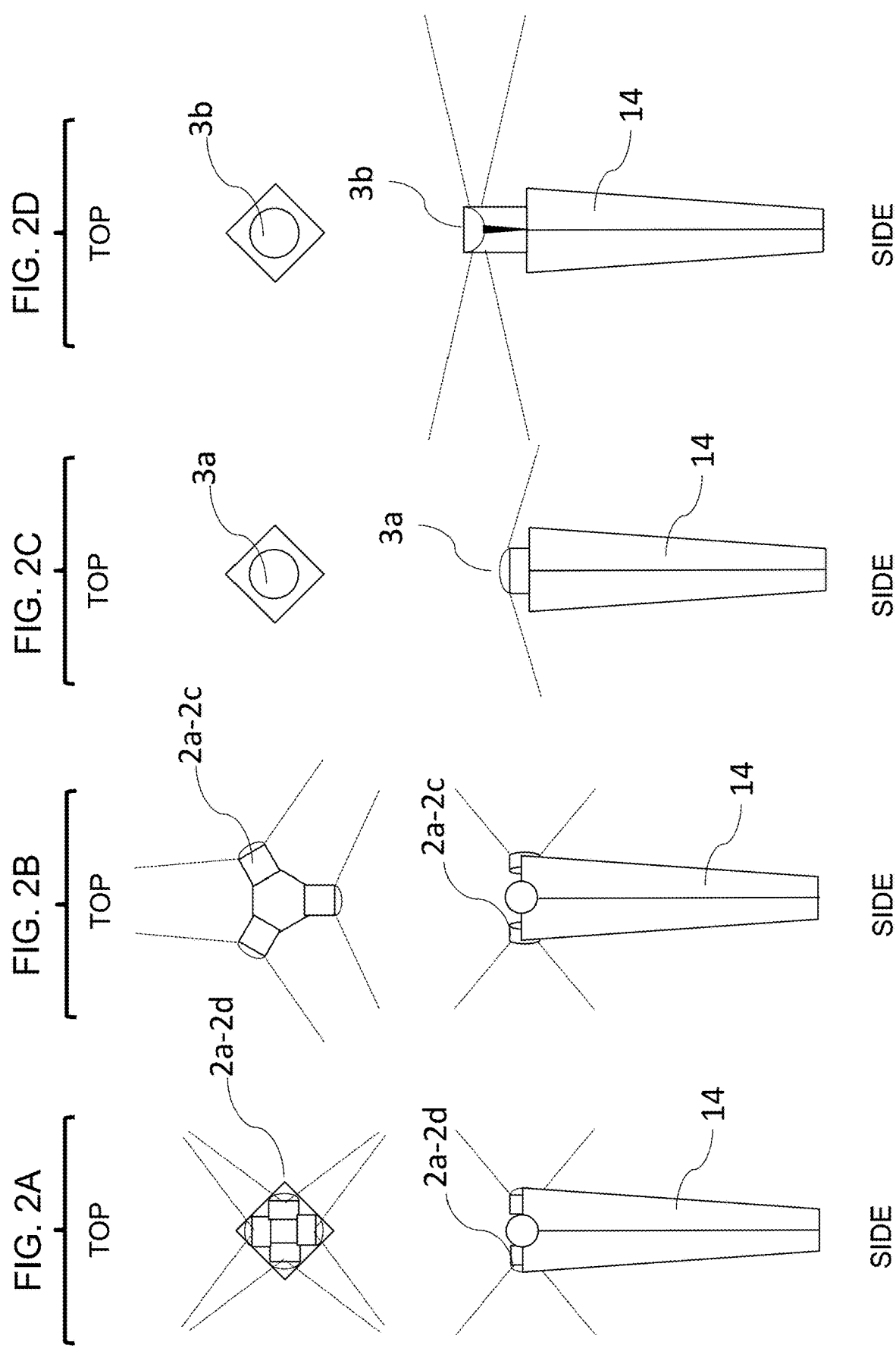

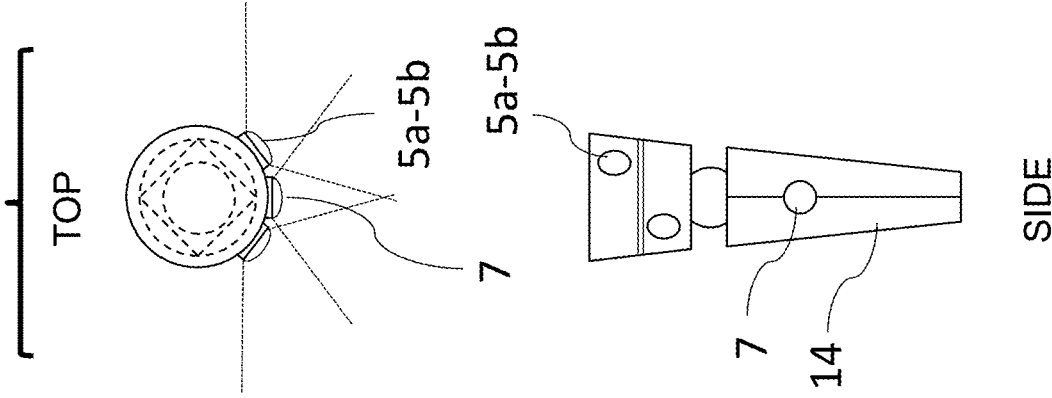
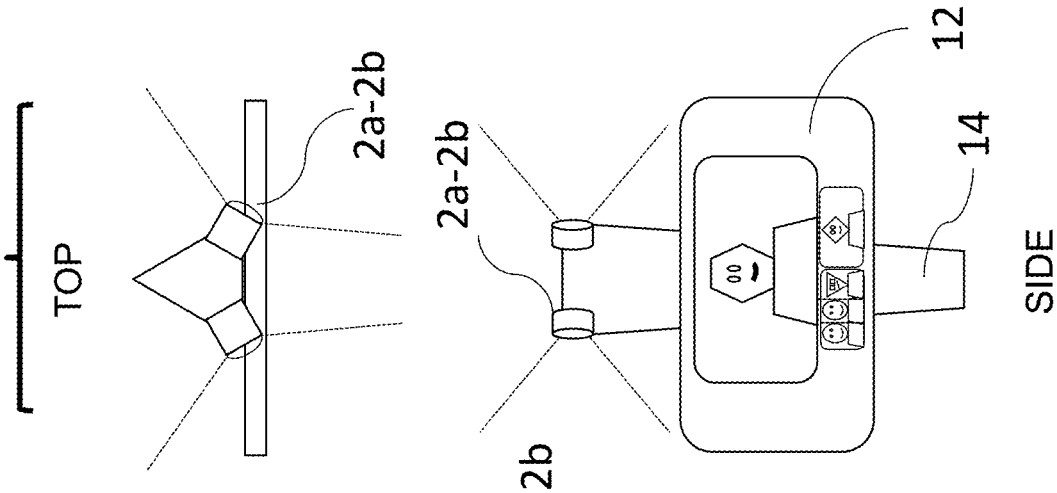
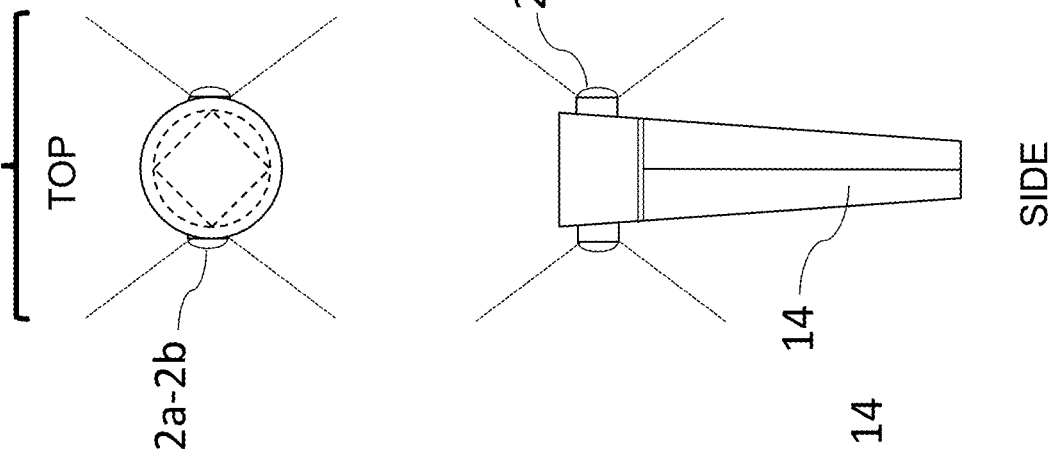

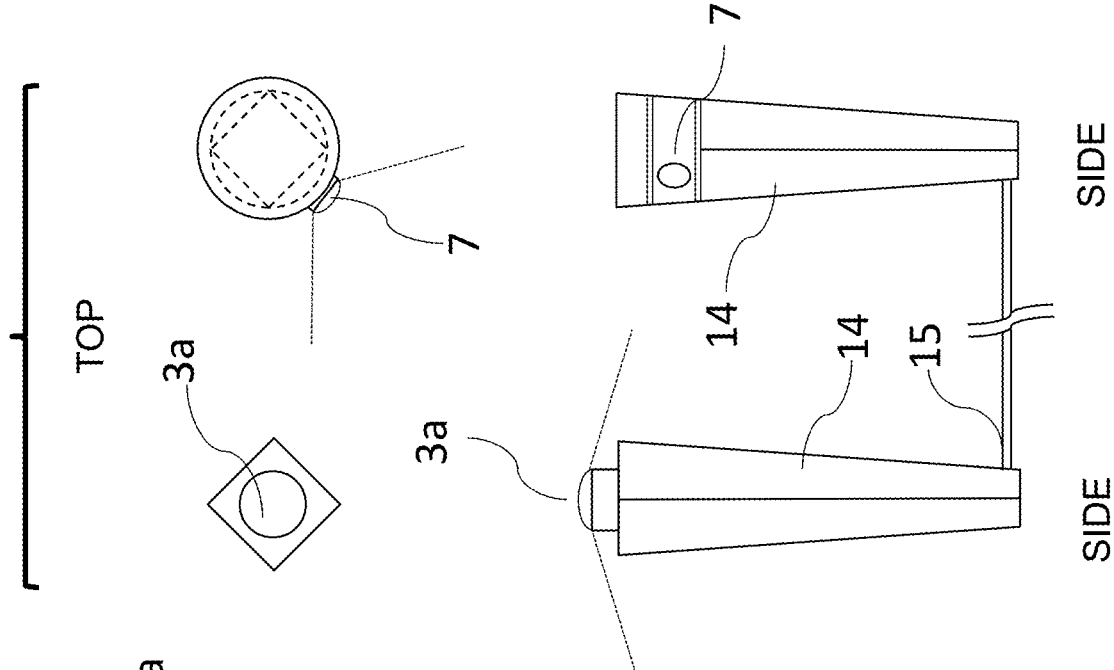
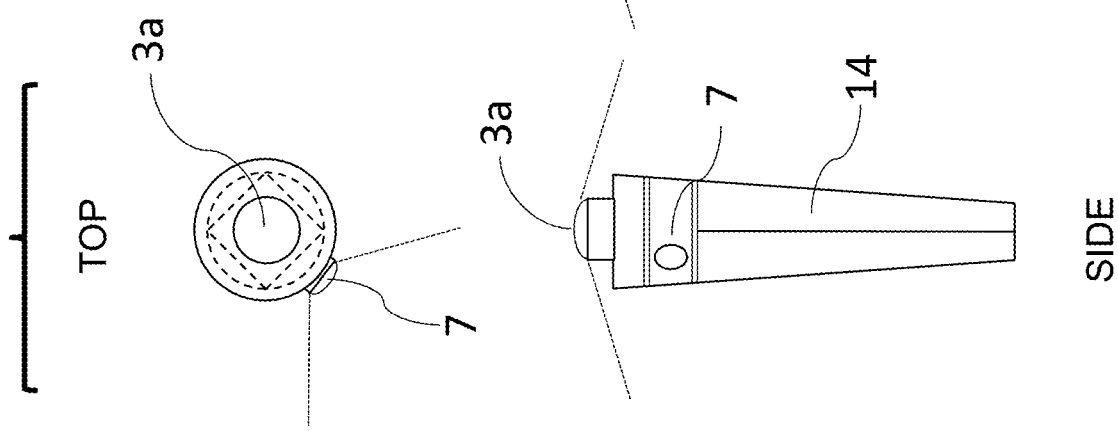
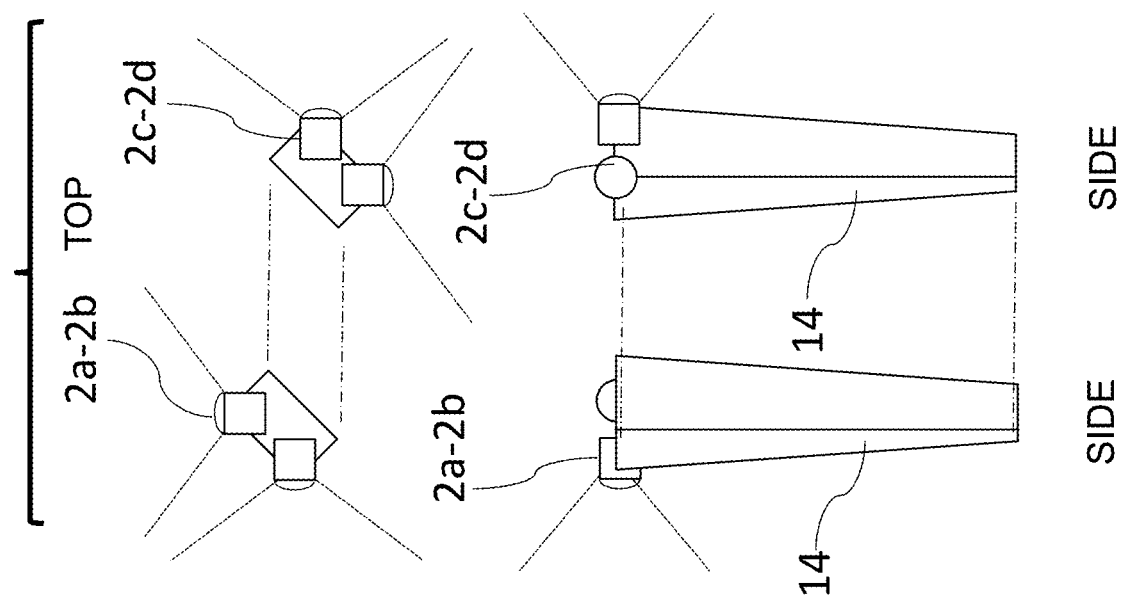

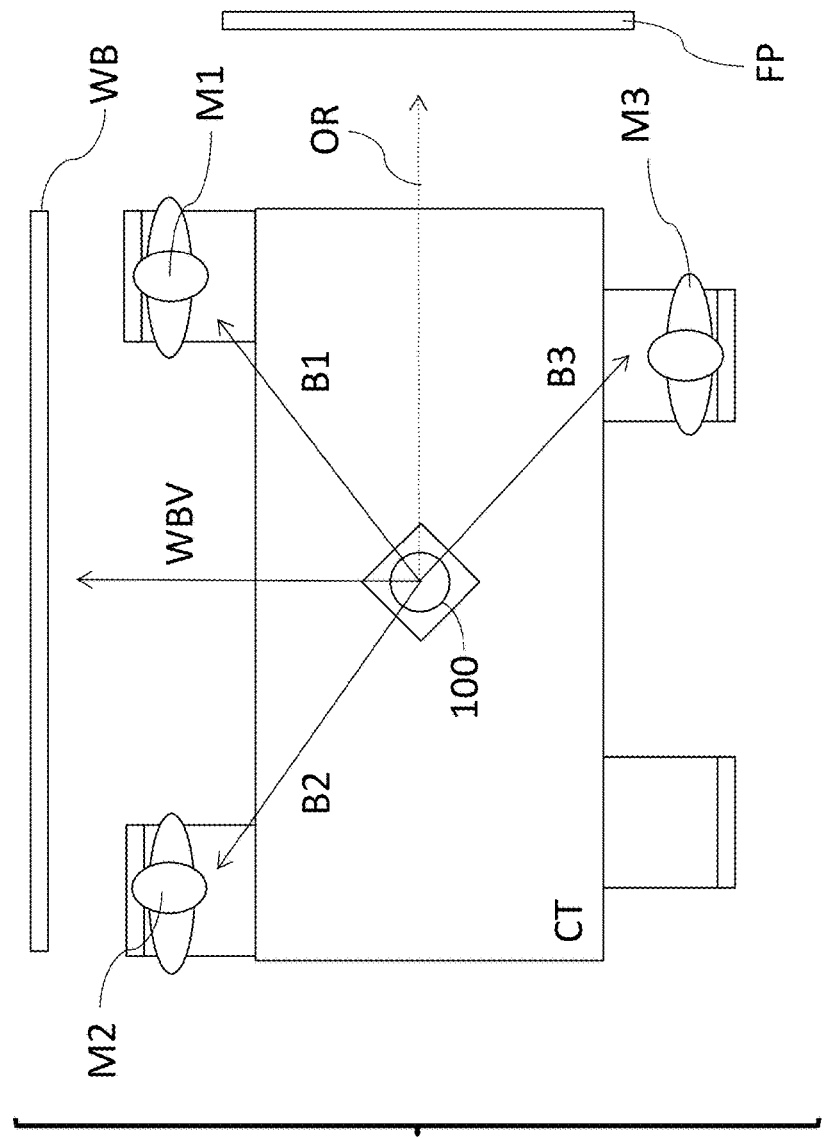
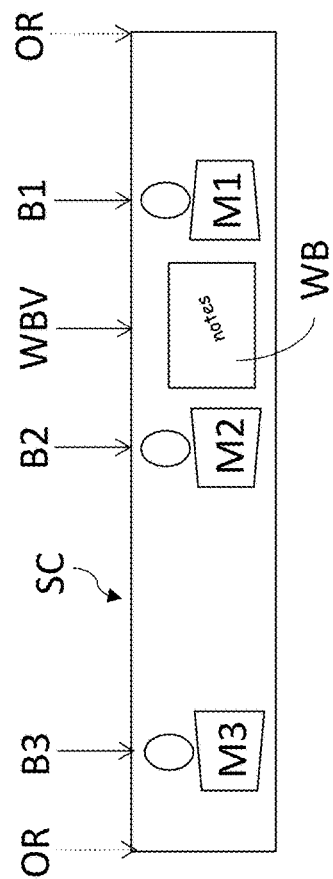
FIG. 3A
FIG. 3B

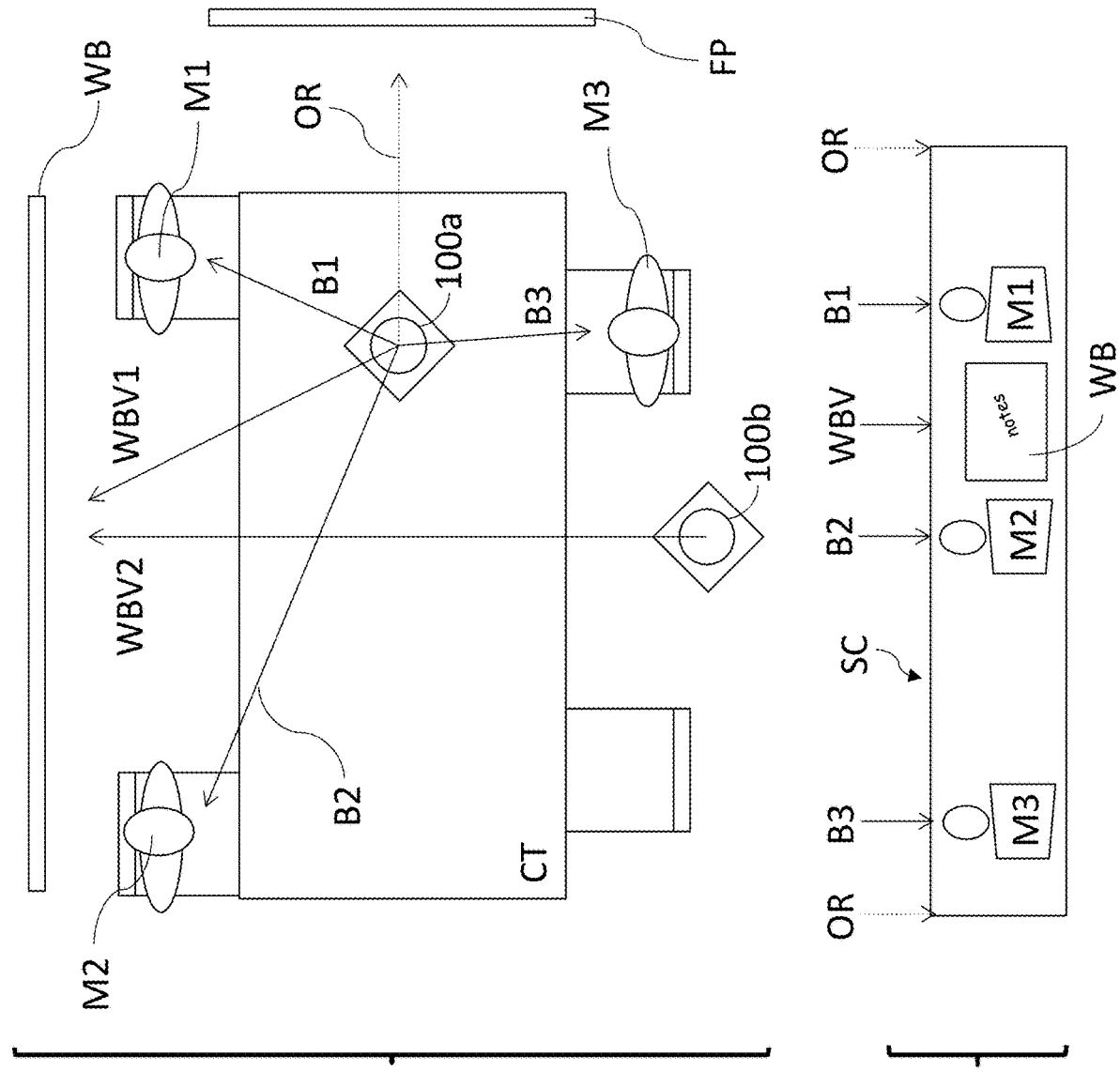

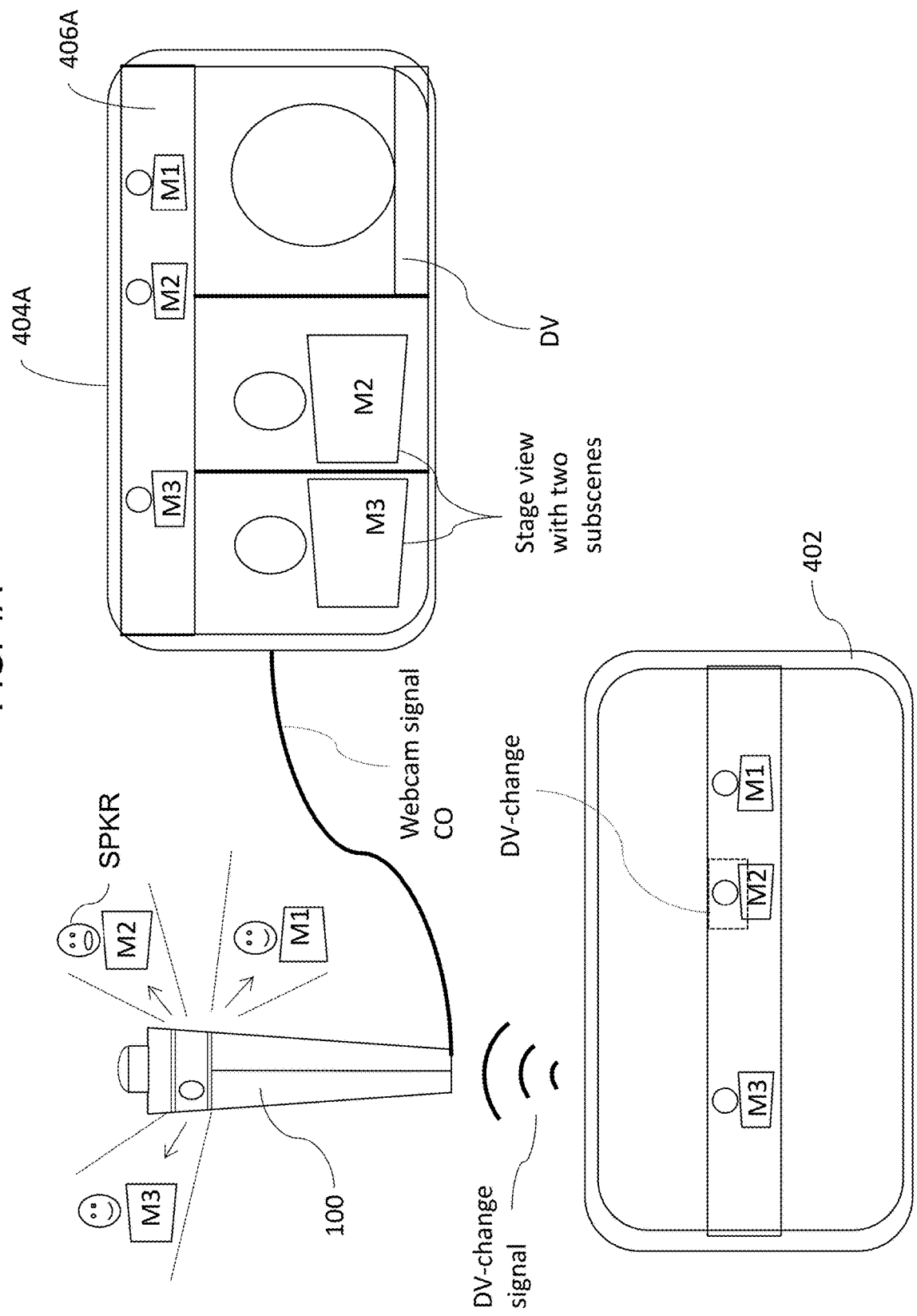

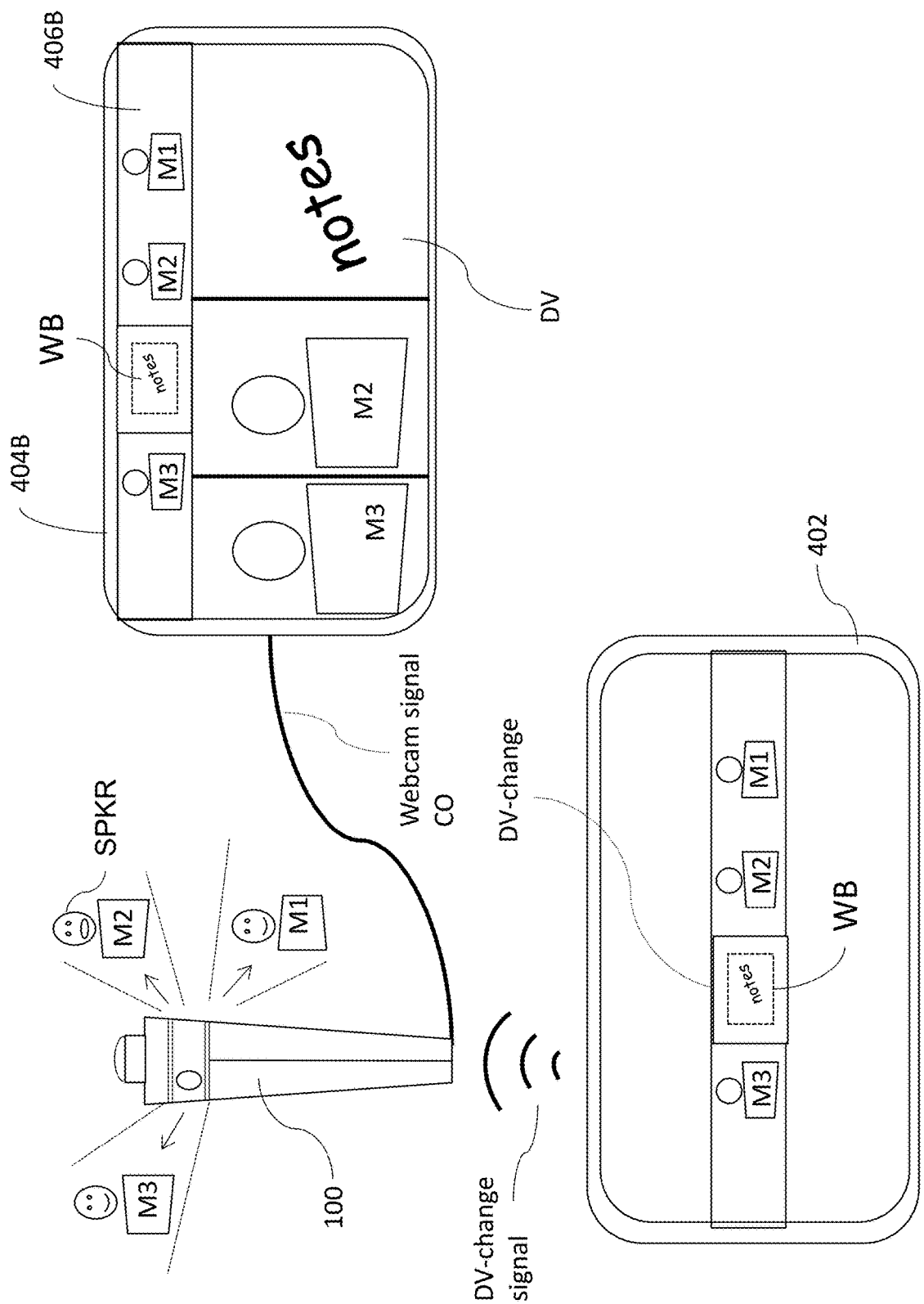

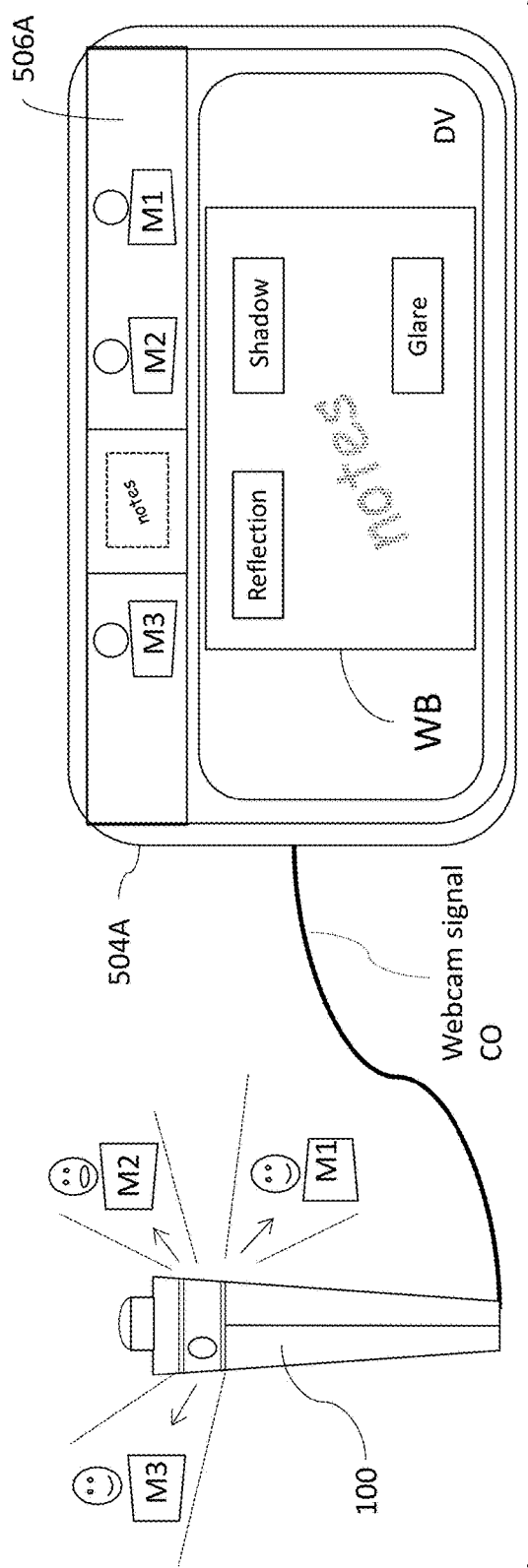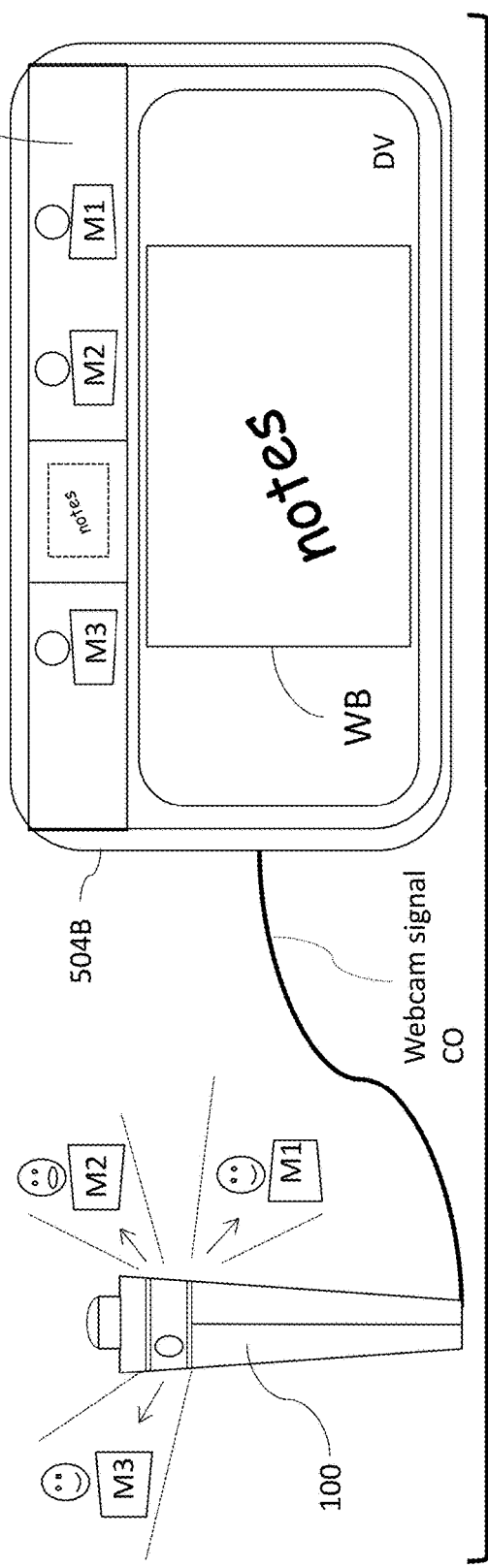
FIG. 5A
FIG. 5B

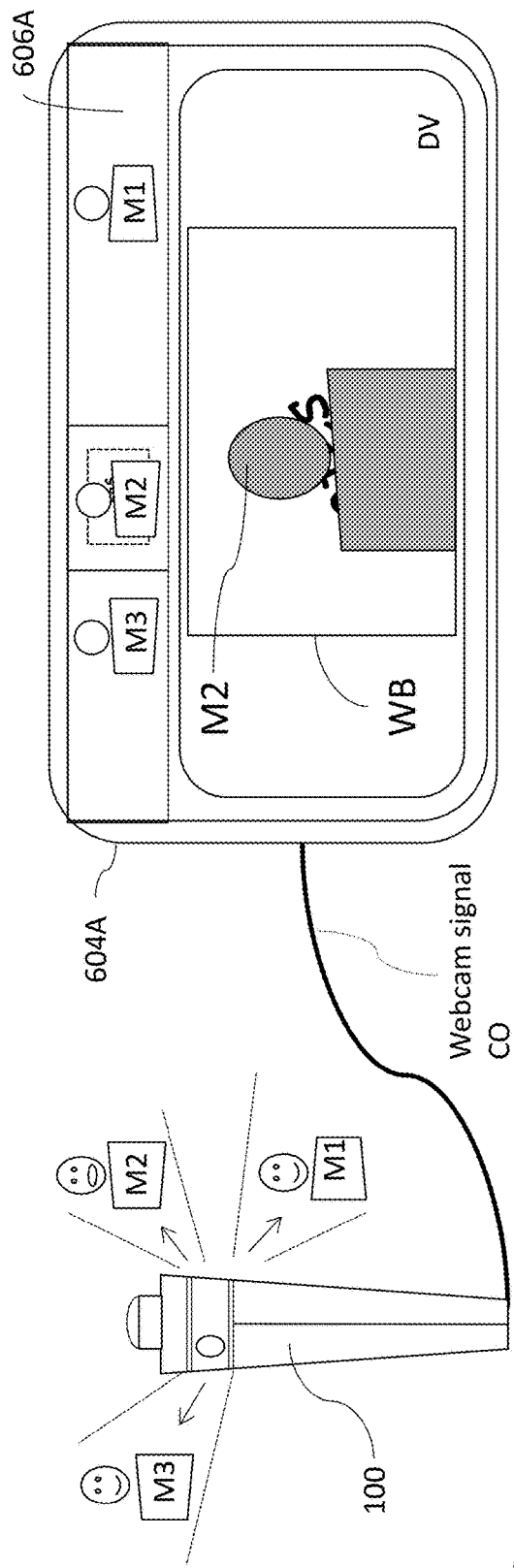
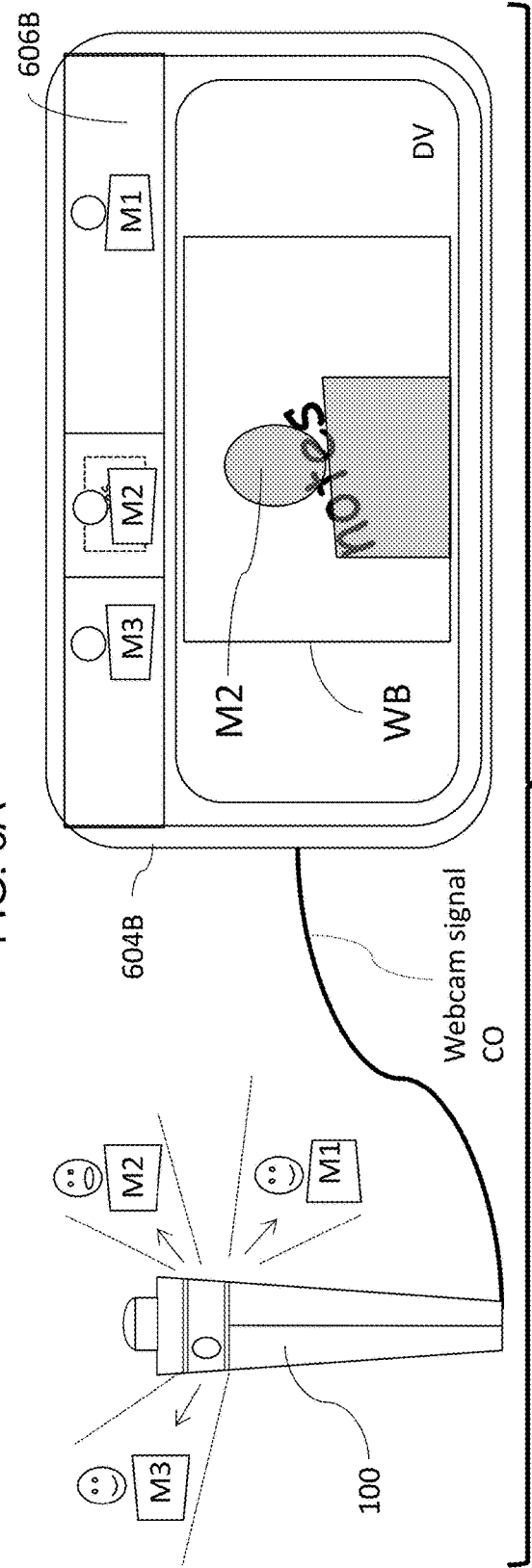
FIG. 6A
FIG. 6B

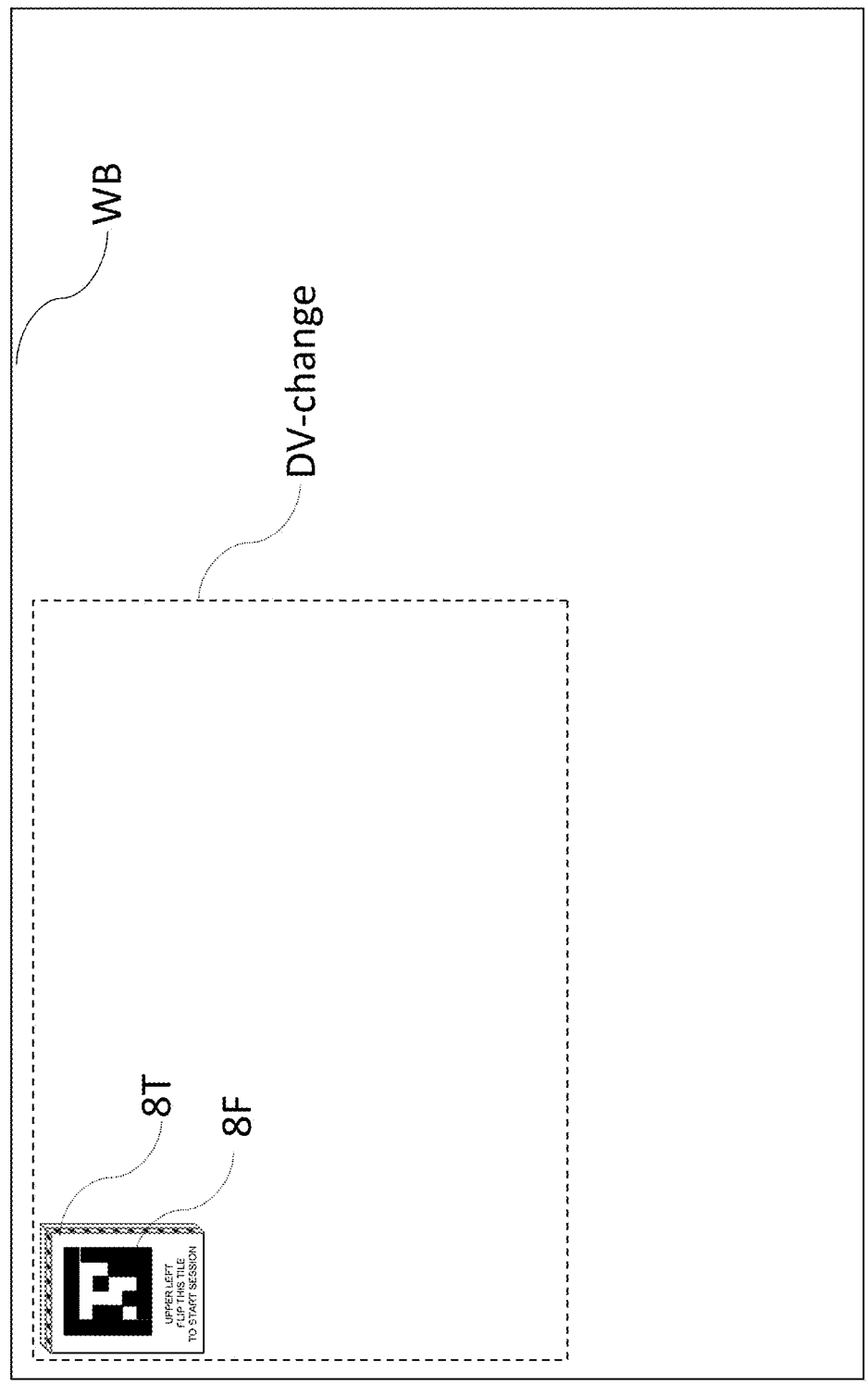

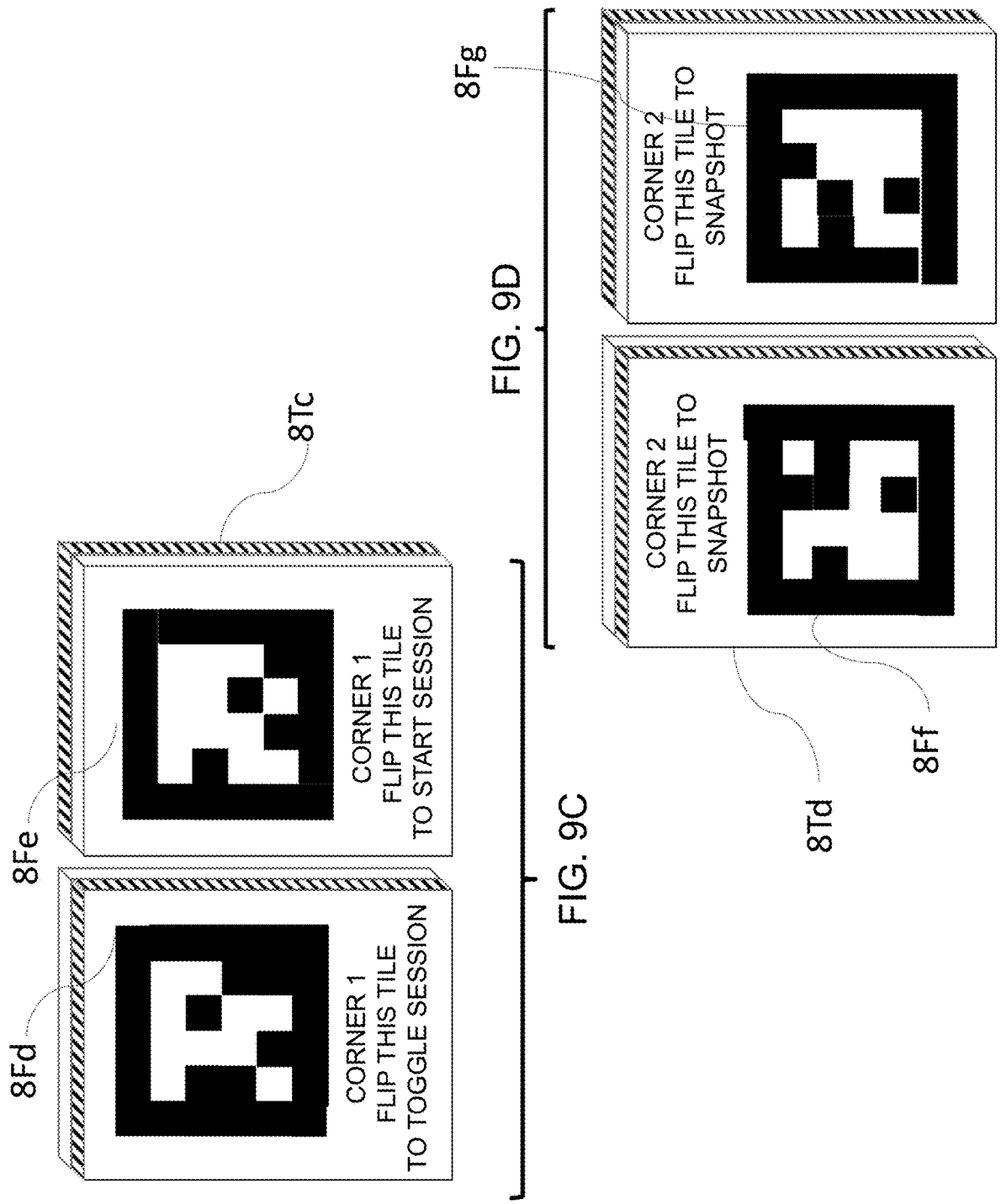

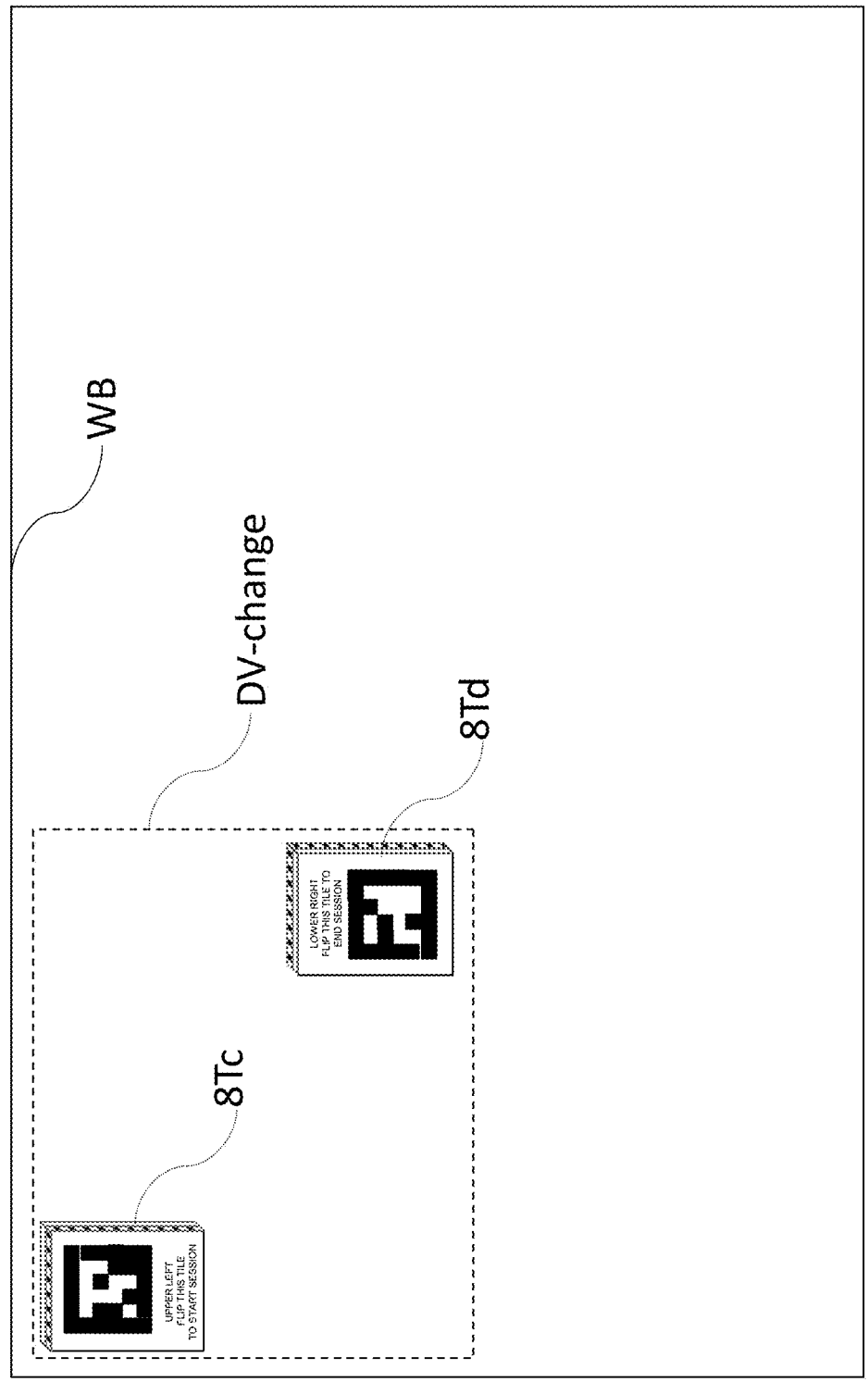

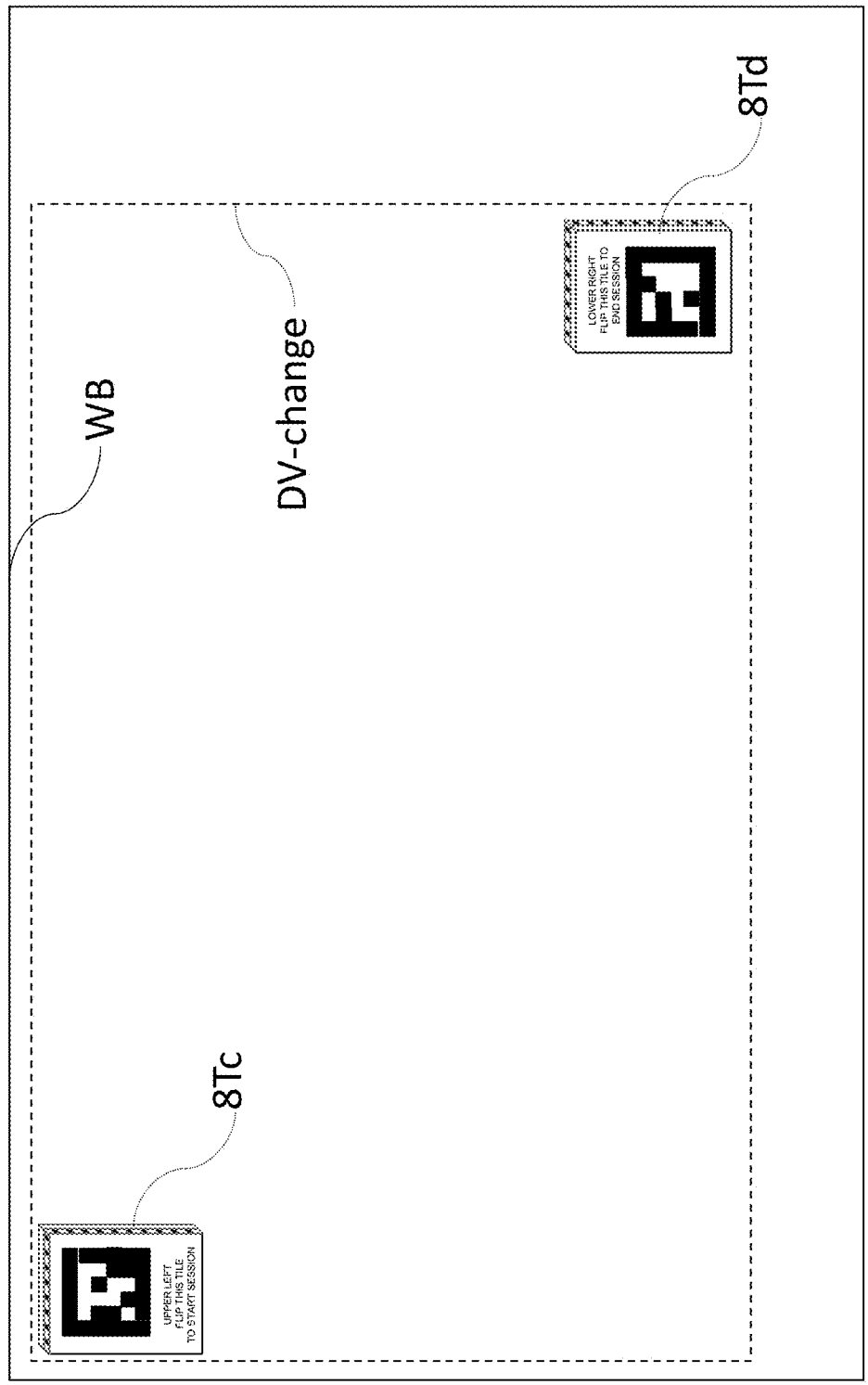

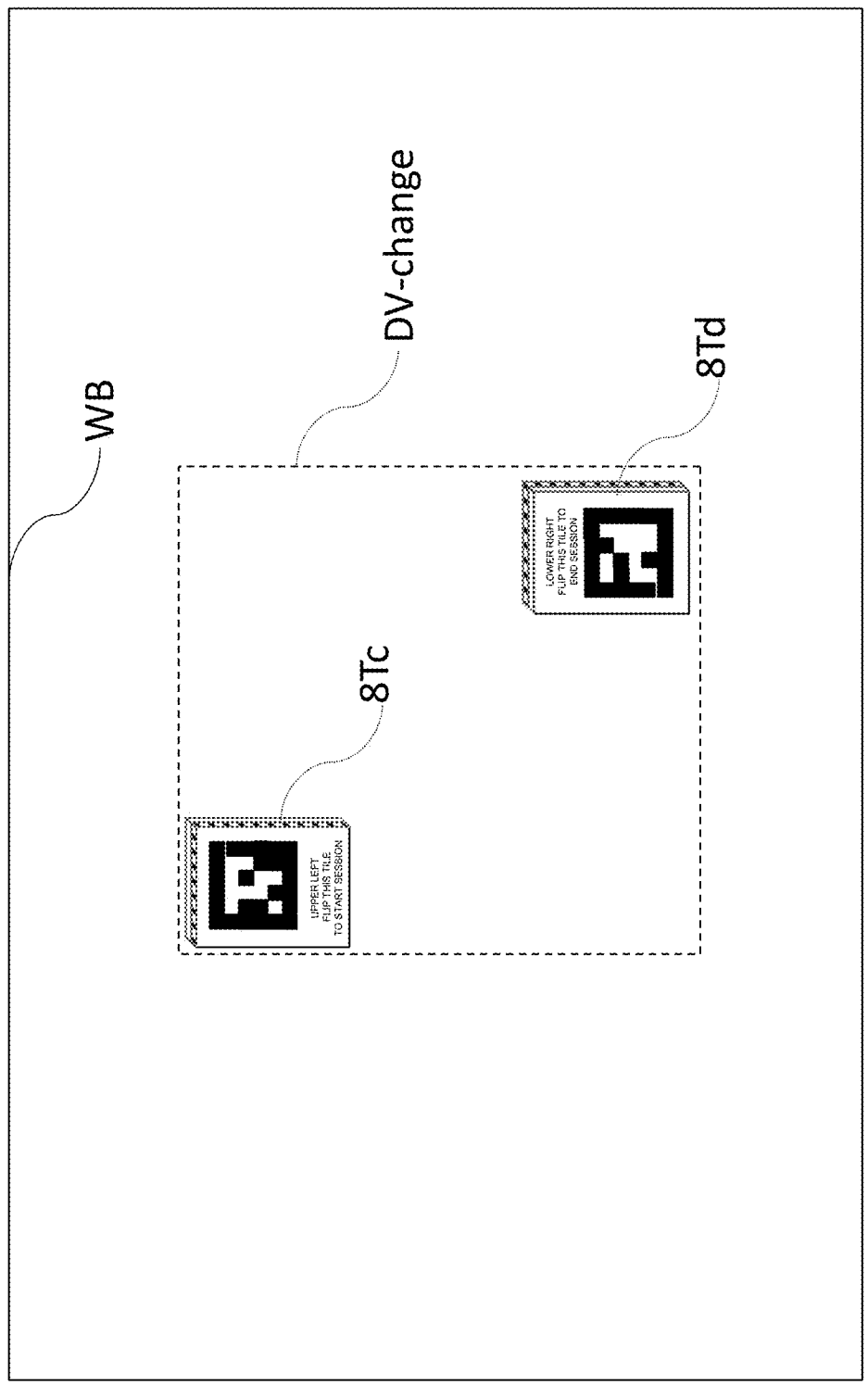

DESIGNATED VIEW WITHIN A MULTI-VIEW COMPOSITED WEBCAM SIGNAL

CROSS-REFERENCE TO RELATED APPLICATIONS

This application relates to U.S. patent application Ser. No. 15/088,644, entitled "DENSELY COMPOSITING ANGULARLY SEPARATED SUB-SCENES," filed Apr. 1, 2016 and Ser. No. 16/859,099, entitled "SCALING SUB-SCENES WITHIN A WIDE ANGLE SCENE," filed on Apr. 27, 2020. The disclosures of the aforementioned applications are incorporated herein by reference in their entireties.

This application claims priority to U.S. Provisional Patent Application Ser. No. 63/061,173, entitled "MANUALLY DESIGNATED VIEW WITHIN A MULTI-VIEW COMPOSITED WEBCAM SIGNAL," filed on Aug. 4, 2020; U.S. Provisional Patent Application Ser. No. 63/087,876, entitled "DEFINING WEBCAM VIEWS FOR A MEETING CAMERA USING LOCAL FIDUCIALS," filed on Oct. 6, 2020; U.S. Provisional Patent Application Ser. No. 63/126,534, entitled "DEFINING WEBCAM VIEWS FOR A MEETING CAMERA," filed on Dec. 17, 2020. The disclosures of the aforementioned applications are incorporated herein by reference in their entireties.

FIELD OF THE DISCLOSURE

The present disclosure relates generally to systems and methods for virtual meetings.

BACKGROUND

Multi-party virtual meetings, videoconferencing, or teleconferencing can take place with multiple participants together in a meeting room connected to at least one remote party.

In the case of a person-to-person mode of videoconferencing software, only one local camera, often of limited horizontal field of view (e.g., 70 degrees or less), is available. Whether this single camera is positioned in front of one participant or at the head of a table directed to all participants, it is difficult for the remote party to follow more distant audio, body language, and non-verbal cues given by those participants in the meeting room who are farther away from the single camera, or that are at sharp angles to the camera (e.g., viewing the profile of a person rather than the face).

In the case of a multi-person mode of videoconferencing software, the availability of the cameras of two or more mobile devices (e.g., laptop, tablet, or mobile phone) located in the same meeting room can add some problems. The more meeting room participants that are logged into the conference, the greater the audio feedback and crosstalk may become. The camera perspectives may be as remote from participants or as skewed as in the case of a single camera. Local participants may tend to engage the other participants via their mobile device, despite being in the same room (thereby inheriting the same weaknesses in body language and non-verbal cues as the remote party).

In some cases, multiple participants in a meeting room may communicate ideas and thoughts by writing images and texts on a writing board. In typical videoconferencing systems, camera(s) in the meeting room may not be able to capture and relay the images and texts on the writing board with sufficient readability for the remote party. The remote party is also unable to communicate ideas or thoughts by writing images and texts on the same writing board because the remote party is not physically present in the meeting room where the writing board is located. Therefore, it is difficult for the remote party to understand the ideas and thoughts being shared on the writing board, and the remote party may not be able to actively participate in such writing board discussions.

Therefore, there is a need for systems and methods for virtual meetings that can provide a better context of the meetings to the participants. There is also a need for systems and methods for virtual meetings that can provide a feeling to the participants that they are physically present in the room. There is also a need for systems and methods for virtual meetings that can allow the participants to effectively share ideas and thoughts by writing images and texts on a writing board.

SUMMARY

According to one aspect of the invention, a system for imaging a panorama view including a physical writing surface comprises a camera configured to capture the panorama view with a horizontal angle greater than 140 degrees; a sensor configured to identify a bearing of interest within the panorama view; a processor; and a memory storing computer-readable instructions that, when executed, cause the processor to: maintain a coordinate map of the panorama view, adjust an aspect ratio of the panorama view captured by the camera, generate a scaled panorama view signal based on the adjusted aspect ratio of the panorama view, sub-sample a localized sub scene video signal based on the panorama view along the bearing of interest, generate a stage view signal based on the subscene video signal, determine a coordinate instruction associated with the coordinate map of the panorama view, determine a coordinate of a designated view based on the coordinate instruction, generate a designated view signal based on the determined coordinate of the designated view, the determined coordinates of the designated view comprising at least a portion of the physical writing surface, composite a video signal including one or more of the scaled panorama view signal, the stage view signal, or the designated view signal, and transmit, to a host computer, the composite video signal.

In one embodiment, the camera is configured to capture the panorama view with a horizontal angle of 360 degrees; and the system is configured to receive, from a second camera, a designated view video of the physical writing surface, the designated view video based on the coordinate of the designated view.

In one embodiment the computer-readable instructions cause the processor to: determine a first location of a first tag attached to the physical writing surface, determine a second location of a second tag attached to the physical writing surface, and determine the coordinate instruction of the designated view based on the first location of the first tag attached to the physical writing surface and the second location of the second tag attached to the physical writing surface.

In one embodiment, the computer-readable instructions cause the processor to: determine, in the coordinate map and based on an image from a second camera, a location of a first tag corresponding to a first designated view trigger or a location of a second tag corresponding to a second designated view trigger, and based on determining, in the coordinate map, the location of the first tag or the location of the second tag, determine the coordinate instruction associated with the coordinate map of the panorama view.

In one embodiment, the computer-readable instructions cause the processor to, responsive to the first designated view trigger or the second designated view trigger: detect an instruction to calibrate and denoise the designated view signal; calibrate the designated view signal by adjusting at least one of brightness, contrast, or gamma; and decrease a noise in the designated view signal by decreasing a frame rate of the designated view signal and averaging two or more image frames in the designated view signal.

In one embodiment, the computer-readable instructions cause the processor to, responsive to the first designated view trigger or the second designated view trigger: detect an instruction to filter an object in the designated view, the object located in between the second camera and the physical writing surface; detect, in the designated view signal, a first set of digital image pixels corresponding to the blocking object; and convert the first set digital image pixels to a second set of translucent digital image pixels by performing a morphological erosion operation and a morphological dilation operation on the first set of digital image pixels.

In one embodiment, the computer-readable instructions cause the processor to: generate, based on a digital writing input, a digital writing signal; generate the composite video signal including one or more of the scaled panorama view signal, the stage view signal, the designated view signal, or the digital writing signal.

In one embodiment, the computer-readable instructions cause the processor to: generate, based on a digital writing input, a digital writing signal; generate, based on the digital writing signal and the designated view signal, an augmented signal by superimposing the digital writing input and the designated view; generate the composite video signal including one or more of the scaled panorama view signal, the stage view signal, or the augmented signal.

In one embodiment, the computer-readable instructions cause the processor to: generate the designated view signal as a subscene of lesser height and lesser width than the panorama view.

In one embodiment, the received coordinate instruction includes a direction of movement of the coordinate of the designated view, and the computer-readable instructions cause the processor to: change the designated view signal responsive to the direction of movement of the coordinate of the designated view, and periodically update the composite video signal to show the changed designated view signal.

In one embodiment, the computer-readable instructions cause the processor to: receive an instruction to change a magnification of the designated view, change the designated view in accordance with the instruction to change the magnification of the designated view, and update the composite video signal to reflect the changed magnification of the designated view.

In one embodiment, a distance between the second camera and the physical writing surface is greater than a minimum threshold distance, and the distance is less than a maximum threshold distance.

In one embodiment, the system includes a wired communication interface and a wireless communication interface.

In one embodiment, the computer-readable instructions cause the processor to: generate, based on a width of the composite video signal, the scaled panorama view signal as a reduced magnification of the panorama view.

In one embodiment, the computer-readable instructions cause the processor to use temporal video denoising to decrease noise in the designated view signal.

In one embodiment, the sensor includes an acoustic array having at least two microphones and configured to compare signals from each of the at least two microphones with one another to identify the bearing of interest.

In one embodiment, the sensor includes a camera, and wherein the computer-readable instructions cause the processor to identify one or more of motion or human faces to identify the bearing of interest.

In one embodiment, the coordinate instruction includes a change in appearance of the manually designate view, and the computer-readable instructions cause the processor to change the manually designated view in real time in accordance with the change in appearance, and continuously update the designated view signal to show the real-time change in appearance of the manually designated view.

In one embodiment, the computer-readable instructions cause the processor to process the designated view signal with spatial noise reduction in one or more of portions of the designated view signal before compositing the designated view signal.

In one embodiment, the computer-readable instructions cause the processor to use temporal video separately in chroma and luma channels to decrease noise before compositing the designated view signal.

In one embodiment, the computer-readable instructions cause the processor to use temporal video denoising without motion compensation in areas of the designated view signal having a textural contrast level lower than a predetermined threshold to decrease noise before compositing the designated view signal.

In one embodiment, the computer-readable instructions cause the processor to: receive digital writing input as vectorized paths; and generate the composite video signal based on rasterizing the digital input from the vectorized paths to a video stream in order to composite the digital input in a composited split screen video stream.

In one embodiment, the computer-readable instructions cause the processor to: receive digital writing input as vectorized paths; and generate the composite video signal as a subsequent independent subscene video stream, wherein the subsequent independent video stream is transitioned into a composited split screen video stream alongside the stage view signal.

In one embodiment, the computer-readable instructions cause the processor to: receive digital writing input as vectorized paths; and generate the composite video signal as an augmented reality video stream and augment the digital writing input into a composited split screen video stream projected into the stage view signal.

In one embodiment, the computer-readable instructions cause the processor to: receive digital writing input as vectorized paths; and generate the composite video signal based on sampling a subsequent independent subscene video stream from the panorama view and transition the subsequent independent video stream into a composited split screen video stream alongside the stage view signal.

According to another aspect of the invention, a method of imaging a panorama view including a physical writing surface comprises: capturing the panorama view with a horizontal angle greater than 140 degrees; identifying a bearing of interest within the panorama view; maintaining a coordinate map of the panorama view; adjusting an aspect ratio of the captured panorama view; generating a scaled panorama view signal based on the adjusted aspect ratio of the panorama view; sub-sampling a localized subscene video signal based on the panorama view along the bearing of interest; generating a stage view signal based on the subscene video signal; determining a coordinate instruction associated with the coordinate map of the panorama view; determining a coordinate of a designated view based on the coordinate instruction; generating a designated view signal based on the determined coordinate of the designated view, the determined coordinates of the designated view comprising at least a portion of the physical writing surface; compositing a video signal including one or more of the scaled panorama view signal, the stage view signal, or the designated view signal; and transmitting, to a host computer, the composite video signal.

In one embodiment, the panorama view is captured with a horizontal angle of 360 degrees, and the method further comprising: receiving a designated view video of the physical writing surface from a source different from a source of the panorama view, the designated view video based on the coordinate of the designated view.

In one embodiment, the method further comprises: determining a first location of a first tag attached to the physical writing surface; determining a second location of a second tag attached to the physical writing surface; and determining the coordinate instruction of the designated view based on the first location of the first tag attached to the physical writing surface and the second location of the second tag attached to the physical writing surface.

In one embodiment, the method further comprises: determining, in the coordinate map and based on an image from a source different from a source of the panorama view, a location of a first tag corresponding to a first designated view trigger or a location of a second tag corresponding to a second designated view trigger, and based on determining, in the coordinate map, the location of the first tag or the location of the second tag, determining the coordinate instruction associated with the coordinate map of the panorama view.

In one embodiment, the method further comprises: responsive to the first designated view trigger or the second designated view trigger: detecting an instruction to calibrate and denoise the designated view signal; calibrating the designated view signal by adjusting at least one of brightness, contrast, or gamma; and decreasing a noise in the designated view signal by decreasing a frame rate of the designated view signal and averaging two or more image frames in the designated view signal.

In one embodiment, the method further comprises: responsive to the first designated view trigger or the second designated view trigger: detecting an instruction to filter an object in the designated view, the object located in between the second camera and the physical writing surface; detecting, in the designated view signal, a first set of digital image pixels corresponding to the blocking object; and converting the first set digital image pixels to a second set of translucent digital image pixels by performing a morphological erosion operation and a morphological dilation operation on the first set of digital image pixels.

In one embodiment, the method further comprises: generating, based on a digital writing input, a digital writing signal; generating the composite video signal including one or more of the scaled panorama view signal, the stage view signal, the designated view signal, or the digital writing signal.

In one embodiment, the method further comprises: generating, based on a digital writing input, a digital writing signal; generating, based on the digital writing signal and the designated view signal, an augmented signal by superimposing the digital writing input and the designated view; generating the composite video signal including one or more of the scaled panorama view signal, the stage view signal, or the augmented signal.

In one embodiment, the method further comprises generating the designated view signal as a subscene of lesser height and lesser width than the panorama view.

In one embodiment, the received coordinate instruction includes a direction of movement of the coordinate of the designated view, the method further comprising: changing the designated view signal responsive to the direction of movement of the coordinate of the designated view, and periodically updating the composite video signal to show the changed designated view signal.

In one embodiment, the method further comprises: receiving an instruction to change a magnification of the designated view, changing the designated view in accordance with the instruction to change the magnification of the designated view, and updating the composite video signal to reflect the changed magnification of the designated view.

In one embodiment, a distance between the source different from the source of the panorama view and the physical writing surface is greater than a minimum threshold distance, and the distance is less than a maximum threshold distance.

In one embodiment, the method further comprises generating, based on a width of the composite video signal, the scaled panorama view signal as a reduced magnification of the panorama view.

In one embodiment, the method further comprises using temporal video denoising to decrease noise in the designated view signal.

In one embodiment, a bearing of interest within the panorama uses an acoustic array having at least two microphones, the method further comprising comparing signals from each of the at least two microphones with one another to identify the bearing of interest.

In one embodiment, identifying a bearing of interest within the panorama uses a camera, the method further comprises identifying one or more of motion or human faces to identify the bearing of interest.

In one embodiment, the coordinate instruction includes a change in appearance of the manually designate view, the method further comprises changing the manually designated view in real time in accordance with the change in appearance; and continuously updating the designated view signal to show the real-time change in appearance of the manually designated view.

In one embodiment, the method further comprise processing the designated view signal with spatial noise reduction in one or more of portions of the designated view signal before compositing the designated view signal.

In one embodiment, the method further comprises using temporal video separately in chroma and luma channels to decrease noise before compositing the designated view signal.

In one embodiment, the method further comprises using temporal video denoising without motion compensation in areas of the designated view signal having a textural contrast level lower than a predetermined threshold to decrease noise before compositing the designated view signal.

In one embodiment, the method further comprises receiving digital writing input as vectorized paths; and generating the composite video signal based on rasterizing the digital input from the vectorized paths to a video stream in order to composite the digital input in a composited split screen video stream.

In one embodiment, the method further comprises receiving digital writing input as vectorized paths; and generating the composite video signal as a subsequent independent subscene video stream, wherein the subsequent independent video stream is transitioned into a composited split screen video stream alongside the stage view signal.

In one embodiment, the method further comprises receiving digital writing input as vectorized paths; and generating the composite video signal as an augmented reality video stream and augment the digital writing input into a composited split screen video stream projected into the stage view signal.

In one embodiment, the method further comprises receiving digital writing input as vectorized paths; and generating the composite video signal based on sampling a subsequent independent subscene video stream from the panorama view and transition the subsequent independent video stream into a composited split screen video stream alongside the stage view signal.

Any of the aspects, implementations, and/or embodiments can be combined with any other aspect, implementation, and/or embodiment.

BRIEF DESCRIPTION OF THE DRAWINGS

Drawing descriptions generally preface paragraphs of detailed description herein.

FIGS. 1A-1D show exemplary schematic block representations of devices 100 according to aspects of the disclosed subject matter.

FIGS. 2A-2J show exemplary top and side views of the devices 100 according to aspects of the disclosed subject matter.

FIGS. 3A-3B show exemplary top down view of a meeting camera use case, and a panorama image signal according to aspects of the disclosed subject matter.

FIGS. 3C-3D show exemplary top down view of using two meeting cameras, and a panorama image signal according to aspects of the disclosed subject matter.

FIGS. 4A-4C show exemplary schematic views of composited signal CO by the devices 100 according to aspects of the disclosed subject matter.

FIGS. 5A-5B show exemplary schematic views of composited signal CO by the devices 100 according to aspects of the disclosed subject matter.

FIGS. 6A-6C show exemplary schematic views of composited signal CO by the devices 100 according to aspects of the disclosed subject matter.

FIG. 8 shows an exemplary use of a fiducial marker, tag, or tile according to aspects of the disclosed subject matter.

FIGS. 9A-9D show exemplary uses of one or more fiducial marker, tag, or tile according to aspects of the disclosed subject matter.

FIGS. 10A-10C show exemplary uses of one or more fiducial marker, tag, or tile according to aspects of the disclosed subject matter.

DETAILED DESCRIPTION

Figure 1D:
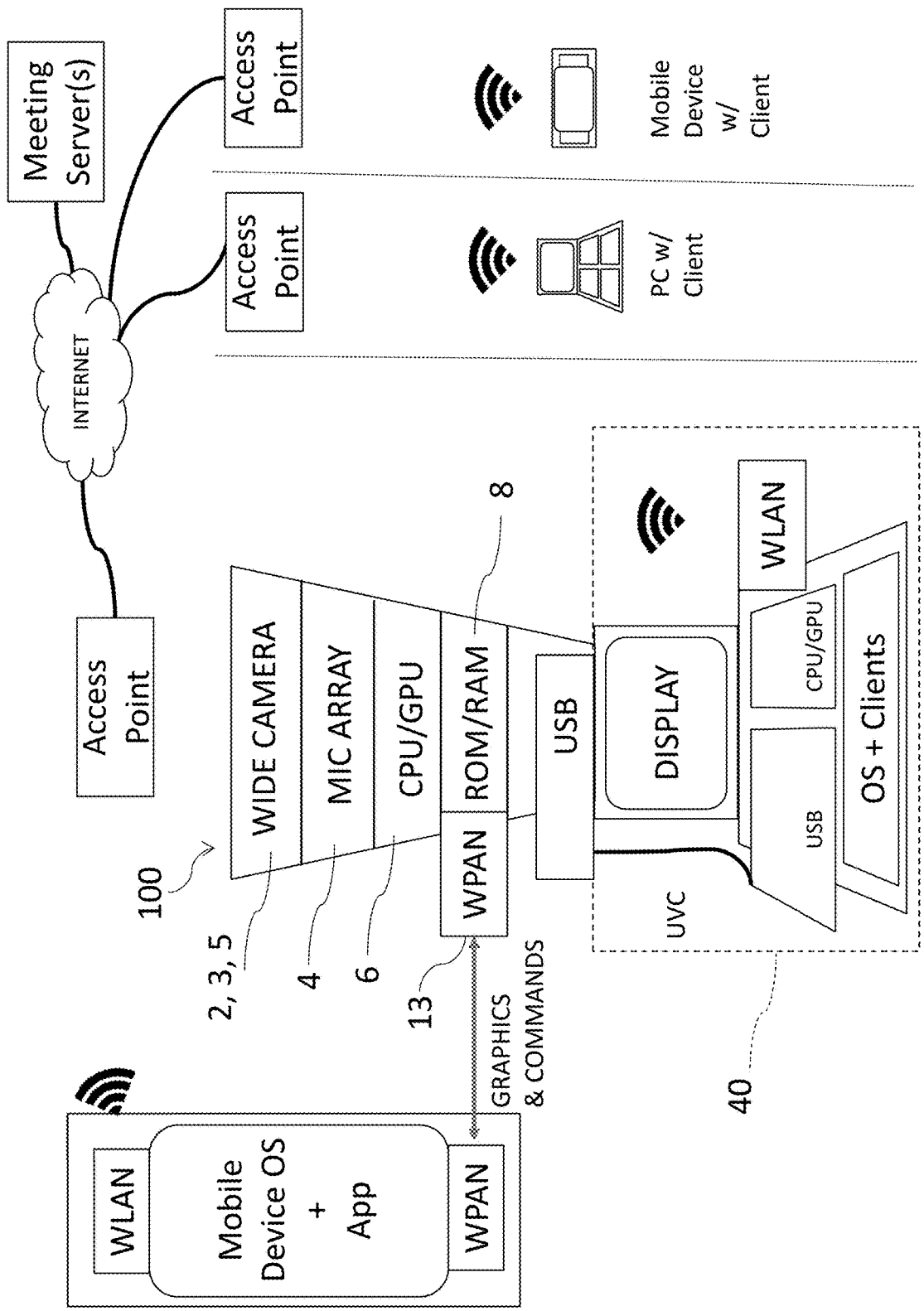

The following describes embodiments of the present disclosure. The designs, figures, and description are non-limiting examples of embodiments of the present disclosure. Other embodiments may or may not include the features disclosed herein. Moreover, disclosed advantages and benefits may apply to only one or some embodiments and should not be used to limit the scope of the present disclosure.

Meeting Camera

A great deal of productivity work in organizations (business, education, government) is conducted using notebook or tablet computers. These are most often used as a vertically oriented flat panel screen connected to or associated with a second panel with a keyboard and trackpad for user input.

A small camera is often located at the top of the flat panel, to be used together with microphone(s) and speakers in one of the panels. These enable videoconferencing over any such application or platform that may be executed on the device. Often, the user of the notebook computer may have multiple applications or platforms on the notebook computer in order to communicate with different partners—for example, the organization may use one platform to video conference, while customers use a variety of different platforms for the same purpose.

Interoperability between platforms is fragmented, and only some larger platform owners have negotiated and enabled interoperability between their platforms, at a variety of functional levels. Hardware (e.g., Dolby Voice Room) and software (e.g., Pexip) interoperability services have provided partial platforms to potentially address interoperability. In some cases, even without interoperability, improvements in user experience may readily enter a workflow that uses multiple platforms via a direct change to the video or audio collected locally.

In some embodiments, the camera, microphones, and/or speakers provided to notebook computers or tablets are of reasonable quality, but not professional quality. For this reason, some video videoconferencing platform accepts the input of third party "webcams," microphones, or speakers to take the place of a notebook computer's built-in components. Webcams are typically plugged into a wired connection (e.g., USB in some form) in order to support the relatively high bandwidth needed for professional quality video and sound. The above referenced applications: U.S. patent application Ser. No. 15/088,644, and 16/859,099, disclosures of each are incorporated herein by reference in their entireties, disclose one such device, replacing the camera, microphones, and speakers of a host notebook computer with an augmented 360 degree videoconferencing nexus device.

Improvements in user experience may be achieved upon the nexus device by processing or compositing video and audio as a webcam signal before it is presented to the notebook computer and any videoconferencing platform thereon. This may be accomplished on the nexus device itself, or remotely, but in most cases lag and audio/video synchronization are important for user experience in teleconferencing, so local processing may be advantageous in the case of real-time processing. FIGS. 1A and 1B are schematic block representations of embodiments of devices suitable for compositing, tracking, and/or displaying angularly separated sub-scenes and/or sub-scenes of interest within wide scenes collected by the devices, meeting cameras 100. Herein, device 100 and meeting camera 100 is used interchangeably.

FIG. 1A shows a device constructed to communicate as a meeting camera 100 or meeting "webcam," e.g., as a USB peripheral connected to a USB host or hub of a connected laptop, tablet, or mobile device 40; and to provide a single video image of an aspect ratio, pixel count, and proportion commonly used by off-the-shelf video chat or videoconferencing software such as "Google Hangouts", "Skype," "Microsoft Teams," "Webex," "Facetime," etc. The device 100 includes a "wide camera" 2, 3, or 5, e.g., a camera capable of capturing more than one attendee, and directed to survey a meeting of attendees or participants M1, M2 . . . Mn. The camera 2, 3, or 5 may include one digital imager or lens, or two or more digital imagers or lenses (e.g., stitched in software or otherwise stitched together). In some embodiments, depending on the location of the device 100 within a meeting, the field of view of the wide camera 2, 3, or 5 may be no more than 70 degrees. In some embodiments, the wide camera 2, 3, 5 can be useful in the center of the meeting, and in this case, the wide camera may have a horizontal field of view of substantially 90 degrees, or more than 140 degrees (e.g., contiguously or not contiguously), or up to 360 degrees.

In some embodiments, in large conference rooms (e.g., conference rooms designed to fit 8 people or more) it may be useful to have multiple wide-angle camera devices recording wide fields of view (e.g. substantially 90 degrees or more) and collaboratively stitching together a wide scene to capture a desirable angle. For example, a wide angle camera at the far end of a long (e.g., 10'-20' or longer) table may result in an unsatisfying, distant view of the speaker SPKR but having multiple cameras spread across a table (e.g., 1 for every 5 seats) may yield one or more satisfactory or pleasing view. In some embodiments, the camera 2, 3, 5 may image or record a panoramic scene (e.g., of 2.4:1 through 10:1 aspect ratio, e.g., H:V horizontal to vertical proportion) and/or make this signal available via the USB connection.

As discussed with respect to FIGS. 2A-2D, the height of the wide camera 2, 3, 5 from the base of the meeting camera 100 is preferably more than 8 inches, so that the camera 2, 3, 5 may be higher than typical laptop screens at a meeting, and thereby have an unobstructed and/or approximately eye-level view to meeting attendees M1, M2 . . . Mn. A microphone array 4 includes at least one or more microphones, and may obtain bearings of interest to sounds or speech nearby by beam forming, relative time of flight, localizing, or received signal strength differential. The microphone array 4 may include a plurality of microphone pairs directed to cover at least substantially the same angular range as the wide camera 2 field of view.

In some embodiments, the microphone array 4 can be optionally arranged together with the wide camera 2, 3, 5 at a height of higher than 8 inches, again so that a direct "line of sight" exists between the array 4 and attendees M1, M2 . . . Mn as they are speaking, unobstructed by typical laptop screens. A CPU and/or GPU (and associated circuits such as a camera circuit) 6, for processing computing and graphical events, are connected to each of the wide camera 2, 3, 5 and microphone array 4. ROM and RAM 8 are connected to the CPU and GPU 6 for retaining and receiving executable code. Network interfaces and stacks 10 are provided for USB, Ethernet, and/or WiFi, connected to the CPU 6. One or more serial busses interconnects these electronic components, and they are powered by DC, AC, or battery power.

The camera circuit of the camera 2, 3, 5 may output a processed or rendered image or video stream as a single camera image signal, video signal or stream from 1.25:1 to 2.4:1 or 2.5:1 "H:V" horizontal to vertical proportion or aspect ratio (e.g., inclusive of 4:3, 16:10, 16:9 proportions) in landscape orientation, and/or, as noted, with a suitable lens and/or stitching circuit, a panoramic image or video stream as a single camera image signal of substantially 2.4:1 or greater. The meeting camera 100 of FIG. 1A may be connected as a USB peripheral to a laptop, tablet, or mobile device 40 (e.g., having a display, network interface, computing processor, memory, camera and microphone sections, interconnected by at least one bus) upon which multi-party teleconferencing, video conferencing, or video chat software is hosted, and connectable for teleconferencing to remote clients 50 via the internet 60.

FIG. 1B is a variation of FIG. 1A in which both the device 100 of FIG. 1A and the teleconferencing device 40 are integrated. A camera circuit output as a single camera image signal, video signal or video stream is directly available to the CPU, GPU, associated circuits and memory 5, 6, and the teleconferencing software is hosted instead by the CPU, GPU and associated circuits and memory 5, 6. The device 100 is directly connectable (e.g., via WiFi or Ethernet) for teleconferencing to remote clients 50 via the internet 60 or INET. A display 12 provides a user interface for operating the teleconferencing software and showing the teleconferencing views and graphics discussed herein to meeting attendees M1, M2 . . . M3. The device or meeting camera 100 of FIG. 1A may alternatively be connect directly to the internet 60, thereby allowing video to be recorded directly to a remote server, or accessed live from such a server, by remote clients 50.

FIGS. 2A through 2D are schematic representations of embodiments of meeting camera 14 or camera tower 14 arrangements for the devices or meeting cameras 100 of FIGS. 1A and 1B, and suitable for collecting wide and/or panoramic scenes. "Camera tower"14 and "meeting camera" 14 may be used herein substantially interchangeably, although a meeting camera need not be a camera tower. The height of the wide camera 2, 3, 5 from the base of the device 100 in FIGS. 2A-2J is preferably more than 8 inches and less than 15 inches.

FIG. 2A shows an exemplary camera tower 14 arrangement with multiple cameras that are peripherally arranged at the camera tower 14 camera level (e.g., 8 to 15 inches), equiangularly spaced. The number of cameras can be determined by field of view of the cameras and the angle to be spanned, and in the case of forming a panoramic stitched view, the cumulative angle spanned may have overlap among the individual cameras. In the case of, for example, FIG. 2A, four cameras 2a, 2b, 2c, 2d (labeled 2a-2d) each of 100-110 degree field of view (shown in dashed lines) are arranged at 90 degrees to one another, to provide cumulative view or a stitchable or stitched view of 360 degrees about the camera tower 14.

FIG. 2B shows an exemplary camera tower 14 arrangement with three cameras 2a, 2b, 2c (labeled 2a-2c) each of 130 or higher degree field of view (shown in dashed lines) are arranged at 120 degrees to one another, again to provide a 360 degree cumulative or stitchable view about the tower 14. The vertical field of view of the cameras 2a-2d is less than the horizontal field of view, e.g., less than 80 degrees. In some embodiments, images, video or sub-scenes from each camera 2a-2d may be processed to identify bearings or sub-scenes of interest before or after optical correction such as stitching, dewarping, or distortion compensation, and can be corrected before output.

FIG. 2C shows an exemplary camera tower 14 arrangement with a single fisheye or near-fisheye camera 3a, directed upward, is arranged atop the camera tower 14 camera level (e.g., 8 to 15 inches). In this case, the fisheye camera lens is arranged with a 360 continuous horizontal view, and approximately a 215 (e.g., 190-230) degree vertical field of view (shown in dashed lines). Alternatively, a single catadioptric "cylindrical image" camera or lens 3b, e.g., having a cylindrical transparent shell, top parabolic mirror, black central post, telecentric lens configuration as shown in FIG. 2D, is arranged with a 360 degree continuous horizontal view, with an approximately 40-80 degree vertical field of view, centered approximately on the horizon. In the case of each of the fisheye and cylindrical image cameras, the vertical field of view, positioned at 8-15 inches above a meeting table, extends below the horizon, permitting attendees M1, M2 . . . Mn about a meeting table to be imaged to waist level or below. In some embodiments, images, video or sub-scenes from each camera 3a or 3b may be processed to identify bearings or sub-scenes of interest before or after optical correction for fisheye or catadioptric lenses such as dewarping, or distortion compensation, and can be corrected before output.

In the camera tower 14 arrangement of FIG. 2E, multiple cameras are peripherally arranged at the camera tower 14 camera level (8 to 15 inches), equiangularly spaced. The number of cameras is not in this case intended to form a completely contiguous panoramic stitched view, and the cumulative angle spanned does not have overlap among the individual cameras. In the case of, for example, FIG. 2E, two cameras 2a, 2b each of 130 or higher degree field of view (shown in dashed lines) are arranged at 90 degrees to one another, to provide a separated view inclusive of approximately 260 degrees or higher on both sides of the camera tower 14. This arrangement would be useful in the case of longer conference tables CT. In the case of, for example, FIG. 2E, the two cameras 2a-2b are panning and/or rotatable about a vertical axis to cover the bearings of interest B1, B2 . . . Bn discussed herein. Images, video or sub-scenes from each camera 2a-2b may be scanned or analyzed as discussed herein before or after optical correction.

In FIGS. 2F and 2G, table head or end arrangements are shown, e.g., each of the camera towers 14 shown in FIGS. 2F and 2G are intended to be placed advantageously at the head of a conference table CT. As shown in FIGS. 3A-3D, a large flat panel display FP for presentations and videoconferencing can be placed at the head or end of a conference table CT, and the arrangements of FIGS. 2F and 2G are alternatively placed directly in front of and proximate the flat panel FP. In the camera tower 14 arrangement of FIG. 2F, two cameras of approximately 130 degree field of view are placed 120 degrees from one another, covering two sides of a long conference table CT. A display and touch interface 12 is directed down-table (particularly useful in the case of no flat panel FP on the wall) and displays a client for the videoconferencing software. This display 12 may be a connected, connectable or removable tablet or mobile device. In the camera tower arrangement of FIG. 2G, one high resolution, optionally tilting camera 7 (optionally connected to its own independent teleconferencing client software or instance) is directable at an object of interest (such as a whiteboard WB or a page or paper on the table CT surface), and two independently panning/or tilting cameras 5a, 5b of, e.g., 100-110 degree field of view are directed or directable to cover the bearings of interest.

Images, video or sub-scenes from each camera 2a, 2b, 5a, 5b, 7 may be scanned or analyzed as discussed herein before or after optical correction. FIG. 2H shows a variation in which two identical units, each having two cameras 2a-2b or 2c-2d of 100-130 degrees arranged at 90 degree separation, may be independently used 180 or greater degree view units at the head(s) or end(s) of a table CT, but also optionally combined back-to-back to create a unit substantially identical to that of FIG. 2A having four cameras 2a-2d spanning an entire room and well-placed at the middle of a conference table CT. Each of the tower units 14, 14 of FIG. 2H would be provided with a network interface and/or a physical interface for forming the combined unit. The two units may alternatively or in addition be freely arranged or arranged in concert as discussed with respect to FIG. 2J.

In FIG. 2I, a fisheye camera or lens 3a (physically and/or conceptually interchangeable with a catadioptric lens 3b) similar to the camera of FIG. 2C, is arranged atop the camera tower 14 camera level (8 to 15 inches). One rotatable, high resolution, optionally tilting camera 7 (optionally connected to its own independent teleconferencing client software or instance) is directable at an object of interest (such as a whiteboard WB or a page or paper on the table CT surface). In some embodiments, this arrangement works advantageously when a first teleconferencing client receives the composited sub-scenes from the scene SC camera 3a, 3b as a single camera image or Composited Output CO, e.g., via first physical or virtual network interface, and a second teleconferencing client receives the independent high resolution image from camera 7.

FIG. 2J shows a similar arrangement, similarly in which separate videoconferencing channels for the images from cameras 3a, 3b and 7 may be advantageous, but in the arrangement of FIG. 2J, each camera 3a, 3b, and 7 has its own tower 14 and is optionally connected to the remaining tower 14 via interface 15 (which may be wired or wireless). In the arrangement of FIG. 2J, the panoramic tower 14 with the scene SC camera 3a, 3b may be placed in the center of the meeting conference table CT, and the directed, high resolution tower 14 may be placed at the head of the table CT, or anywhere where a directed, high resolution, separate client image or video stream would be of interest. Images, video or sub-scenes from each camera 3a, 3b, and 7 may be scanned or analyzed as discussed herein before or after optical correction.

Meeting Camera Usage

With reference to FIGS. 3A-3D, according to an embodiment of the present method of compositing and outputting photographic scenes, a device or meeting camera 100 (or 200) is placed atop, for example, a circular or square conference table CT. In some embodiments, the device 100 in FIG. 3A, or the devices 100a and 100b in FIG. 3C may be located according to the convenience or intent of the meeting participants M1, M2, M3 . . . Mn, for example, based on the locations of the participants, a flat panel display FP, and/or a whiteboard WB.

In some embodiments, in a meeting, participants M1, M2 . . . Mn can be angularly distributed with respect to the device 100. For example, if the device 100 is placed in the center of the participants M1, M2 . . . Mn, the participants and/or a whiteboard WB can be captured, as discussed herein, with a panoramic camera. In another example, if the device 100 is placed to one side of the participants (e.g., at one end of the table, or mounted to a flat panel FP), then a wide camera (e.g., 90 degrees or more) may be sufficient to span or capture the participants M1, M2 . . . Mn, and/or a whiteboard WB.

As shown in FIG. 3A, participants M1, M2 . . . Mn can each have a respective bearing B1, B2 . . . Bn from the device 100, and a whiteboard WB can also have a bearing WBV (Whiteboard View) from the device 100. For example, the bearings (e.g., B1, B2 Bn, and/or WBV) are measured for illustration purposes from an origin OR. For example, each bearing B1, B2 . . . Bn and/or WBV may be a range of angles or a nominal angle. In some embodiments, the device 100 can include one or more high resolution, optionally tilting camera 7 (optionally connected to its own independent teleconferencing client software or instance), for example as illustrated in FIGS. 2G, 2I, 2J that can be directed at an object of interest such as the whiteboard WB. For example, the high resolution camera 7 can be configured to generate a high-resolution image of the whiteboard WB.

As shown in FIGS. 3B and 3D, an "unrolled," projected, or dewarped fisheye, panoramic or wide scene SC includes imagery of each participant M1, M2 . . . Mn and/or a whiteboard WB arranged at the expected respective bearing B 1, B2 . . . Bn and/or WBV. In some embodiments, in the case of rectangular tables CT and/or an arrangement of the device 100 or the devices 100a and 100b to one side of the table CT, imagery of each participant M1, M2 . . . Mn and/or WB may be foreshortened or distorted in perspective according to the facing angle of the participant (e.g., depicted in FIGS. 3B and 3D and throughout the drawings with an expected foreshortening direction). In some embodiments, perspective and/or visual geometry correction may be applied to foreshortened or perspective distorted imagery, sub-scenes, or the scene SC, but might not be necessary.

As shown in FIG. 3C, a device 100a can be configured to generate an "unrolled", projected, or dewarped fisheye, panoramic or wide scene SC that can include imagery of each participant M1, M2 . . . Mn and/or a whiteboard WB arranged at the expected respective bearing B1, B2 . . . Bn and/or WBV as illustrated in FIGS. 3B and 3D. In some embodiments, the device 100 or 100a can be used to perform the functions described in greater detail in the following above referenced applications: U.S. patent application Ser. No. 15/088,644, and Ser. No. 16/859,099, disclosures of each are incorporated herein by reference in their entireties.

In some embodiments, in addition to the device 100 or 100a, another device 100b can be used to generate an imagery of the whiteboard WB. For example, the device 100b can include one or more high resolution, optionally tilting camera 7 (optionally connected to its own independent teleconferencing client software or instance) that can be directed at an object of interest such as the whiteboard WB. In some embodiments, the device 100b can be configured to function with the device 100 or 100a as described herein. In other embodiments, the device 100b can be a standalone device configured to generate, process, and/or share a high resolution image of an object of interest such as whiteboard WB as describe herein. Herein, device 100 is described as performing various functions in addition to collecting video and audio input. For example, device 100 may perform audio and video analysis, compositing, and/or network communications. It should be understood that device 100 refers to a single device as well as more than one device acting cooperatively. Thus, device 100 alone, or as device 100, device 100a, and/or device 100b can perform the recited functions cooperatively or in place of each other.

In some embodiments, the device 100b can be mounted to a ceiling of the meeting room, to a wall, at the top of the table CT, on a tripod, or any other means to place the device 100b, such that the device 100b can be directed to and used to generate an imagery of an object of interest such as the whiteboard WB. In some embodiments, the device 100b can be mounted on a wall that is on the opposite side of a meeting room where an object of interest such as the whiteboard WB is located. In some embodiments, the device 100b can be placed in a certain minimum threshold distance away from the whiteboard WB and/or a certain maximum threshold distance within the whiteboard WB, for example, about 7-16 feet or about 2-5 meters from an object of interest such as the whiteboard WB. In some embodiments, the device 100b can be placed within a certain threshold viewing/facing angle such that an object of interest such as whiteboard WB is not distorted in perspective. In some embodiments, the device 100b can be placed on a tripod, or on the table CT, and can be moved and placed at a certain minimum or maximum threshold distance and at a certain minimum or maximum viewing/facing angle to generate a high-resolution image of the whiteboard WB that is not too far away, not to close, and/or not distorted in perspective.

In some embodiments, an object of interest such as whiteboard WB in a meeting room can be, for example, a white enamel board, magnetic or non-magnetic, upon which dry-erase markers are used to make whiteboard notes, or any physical writing surface of any color (e.g., not limited to white color) or any material. In some embodiments, an object of interest such as whiteboard WB can be mounted on a wall, on a tripod, or any other means to place an object of interest such as whiteboard WB that can be displayed to the device 100a and/or 100b to show its content (e.g., such as writing on the whiteboard WB). In some embodiments, an object of interest such as whiteboard WB can be a whiteboard on a tripod, an easel, or on wheels that can be placed at a location in a meeting room within certain minimum/maximum threshold distance and/or certain threshold viewing/facing angle from the device 100b.

Combining a Manually or Automatically Designated View (DV)

In some embodiments, a self-contained portable webcam apparatus such as a meeting camera 100 may benefit from integrating, in addition to the stage presentation and panorama presentation discussed herein, the function of integrating a manually or automatically designated portion of the overall wide camera or panorama view. In some embodiments, the wide, or optionally 360-degree camera 2, 3, 5 may generate the panorama view (e.g., at full resolution, a "scaled" panorama view being down-sampled with substantially identical aspect ratio).

In some embodiments, a meeting camera 100's processor 6 (e.g., CPU/GPU) may maintain a coordinate map of the panorama view within RAM 8. As discussed herein, the processor 6 may composite a webcam video signal (e.g., also a single camera image or Composited Output CO). In addition to the scaled panorama view and stage views discussed herein, a manually or automatically designated view DV may be added or substituted by the processor 6.

In some embodiments, as shown in FIG. 1A, a meeting camera 100 can be tethered to a host PC or workstation, and can be configured to identify itself as a web camera (e.g., via USB). In some embodiments, the meeting camera 100 can be configured with a ready mechanism for specifying or changing designation of the manually or automatically designated view DV. In another embodiment, the meeting camera 100 can be configured without a ready mechanism for specifying or changing designation of the manually or automatically designated view DV.

Figure 4C:
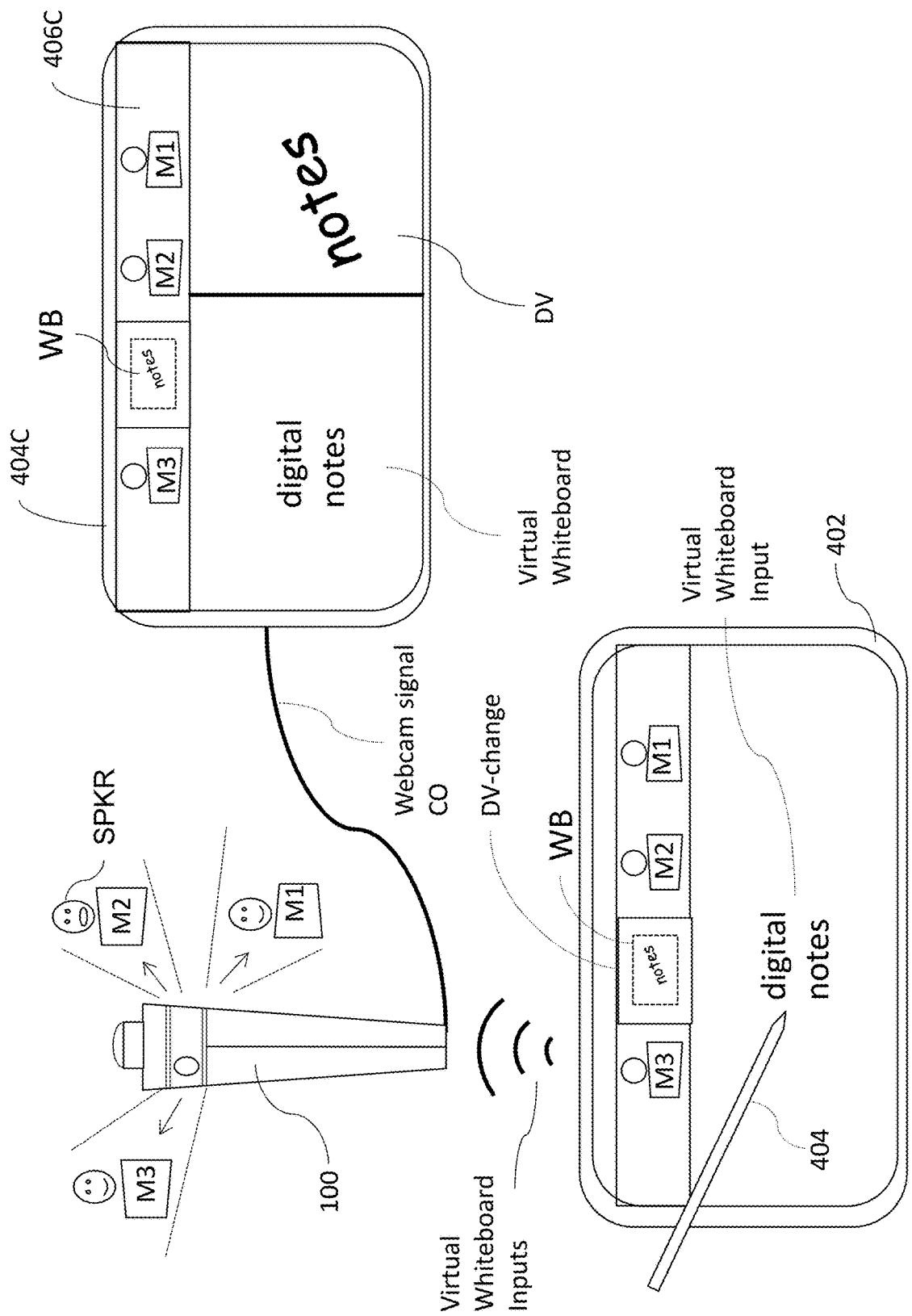

In some embodiments, as shown in FIGS. 4A, 4B, and 4C, a local mobile device 402 connected to the meeting camera 100 via a peripheral interface, e.g., Bluetooth, may be configured to provide the location or size or change in either location or size "DV-change" of the designated view DV within the panorama view. In this case, the meeting camera 100 includes a receiver for that interface, e.g., a Bluetooth receiver, as a first communications interface configured to receive coordinate instructions within the coordinate map that determine coordinates of the manually or automatically designated view DV within the panorama view, while the tethered webcam connection, e.g., USB, is a second communications interface. For example, the meeting camera 100 can be configured to include a second communications interface configured to communicate the webcam video signal CO, including the manually or automatically designated view DV, as a video signal to e.g., a host computer.

In some embodiments, as discussed herein, a meeting camera 100 may act as a device for compositing webcam video signals according to sensor-localized and manual inputs. For example, a meeting camera 100 may have a wide camera observing a wide field of view of substantially 90 degrees or greater. A localization sensor array may be configured to identify one or more bearings of interest within the wide field of view. As discussed herein, this array may be a fusion array including both audio and video localization.

In some embodiments, a meeting camera 100's processor 6 may be operatively connected to the wide camera, and may be configured to maintain a coordinate map of the wide camera field of view, e.g., in RAM 8. The processor may be configured to sub-sample subscene video signals along the bearings of interest to include within the stage view.

In some embodiments, a meeting camera 100's processor 6 may composite a webcam video signal that includes just some or all of the views available. For example, the views available can include a representation of the wide field of view (e.g., the downsampled scaled panorama view that extends across the top of the webcam video signal CO), a stage view including the subscene video signals (arranged as discussed herein, with 1, 2, or 3 variable width subscene signals composited into the stage), or a manually or automatically designated view DV.

In some embodiments, a manually or automatically designated view DV can be similar to the subscene video signals used to form the stage view. For example, the designated view DV may be automatically determined, e.g., based on sensor-localized, bearing of interest, that can be automatically added to or moved off the stage, or resized according to an expectation of accuracy of the localization (e.g., confidence level). In another embodiment, the designated view DV can be different from the subscene video signals used to form the stage view, and may not be automatically determined (e.g., manually determined).

In some embodiments, a first communications interface such as Bluetooth may be configured to receive coordinate instructions within the coordinate map that determine coordinates of the designated view "DV-change" within the wide field of view, and a second communications interface such as USB (e.g., camera) may be configured to communicate the webcam video signal including at least the manually or automatically designated view DV.

In some embodiments, a meeting camera 100's processor 6 may form the manually or automatically designated view DV as a subscene of lesser height and width than the panorama view. For example, as discussed herein, the stage views may be assembled according to a localization sensor array configured to identify one or more bearings of interest within panorama view, wherein the processor sub-samples localized subscene video signals of lesser height and width than the panorama view along the bearings of interest, and the stage view includes the localized subscene video signals. For example, the processor may form the scaled panorama view as a reduced magnification of the panorama view of approximately the width of the webcam video signal.

In some embodiments, the meeting camera 100 may begin a session with a default size and location (e.g., arbitrary middle, last localization, pre-determined, etc.) for the manually or automatically designated view DV, in which case the coordinate instructions may be limited or may not be limited to a direction of movement of a "window" within the panorama view corresponding to the default size and location. As shown in FIGS. 4A-4C, the mobile device may send, and the meeting camera 100 may receive, coordinate instructions that include a direction of movement of the coordinates of the designated view DV.

In some embodiments, a meeting camera 100's processor 6 may change the manually or automatically designated view DV in real time in accordance with the direction of movement, and may continuously update the webcam video signal CO to show the real-time motion of the designated view DV. In this case, for example, the mobile device and corresponding instructions can be a form of joystick that move the window about. In other examples, the size and location of the manually or automatically designated view DV may be drawn or traced on a touchscreen.

In some embodiments, a meeting camera 100's processor 6 may change the "zoom" or magnification of the designated view DV. For example, the processor may change the designated view DV in real time in accordance with the change in magnification, and can be configured to continuously update the webcam video signal CO to show the real-time change in magnification of the designated view DV.

In some embodiments, as shown in FIG. 4A, a local mobile device 402 connected to the meeting camera 100 (e.g., via Bluetooth) can be configured to provide the location or size or change in either location or size "DV-change" of the designated view DV within the panorama view. In this case, for example, the local mobile device 402 can be designating the participant M2's head. In response to receiving the signal from the mobile device 402, the meeting camera 100 can be configured to communicate the webcam video signal CO, including the designated view DV that shows the participant M2's head, as a video signal to e.g., a host computer. In some embodiments, the webcam video signal CO in FIG. 4A can generate a composited video 404A, which can be displayed, for example, by a host computer 40, remote client 50, etc. For example, the composited video 404A shows the panorama view 406A with the participants M1, M2, and M3. For example, the composited video 404A also shows the stage view with two subscenes, where one subscene is showing the participant M3 and the other subscene is showing the participant M2. For example, the composited video 404A also shows the designated view DV as designated by the local mobile device 402 to show the participant M2's head.

In another embodiments, as shown in FIG. 4B, a local mobile device 402 connected to the meeting camera 100 (e.g., via Bluetooth) can be configured to provide the location or size or change in either location or size "DV-change" of the designated view DV within the panorama view. In this case, for example, the local mobile device 402 can be designating the whiteboard WB's writing "notes." In response to receiving the signal from the mobile device 402, the meeting camera 100 can be configured to communicate the webcam video signal CO, including the designated view DV that shows the whiteboard WB's writing "notes," as a video signal to e.g., a host computer. In some embodiments, the webcam video signal CO in FIG. 4B can generate a composited video 404B, which can be displayed, for example, by a host computer 40, remote client 50, etc. For example, the composited video 404B shows the panorama view 406B with the participants M1, M2, and M3, and the whiteboard WB. For example, the composited video 404B also shows the stage view with two subscenes on the participants M2 and M3, where one sub scene is showing the participant M3 and the other subscene is showing the participant M2. For example, the composited video 404B also shows the designated view DV as designated by the local mobile device 402 to show the writing "notes" on the whiteboard WB.

In another embodiments, as shown in FIG. 4C, a local mobile device 402 connected to the meeting camera 100 (e.g., via Bluetooth) can be configured to provide the location or size or change in either location or size "DV-change" of the designated view DV within the panorama view. In addition, the local mobile device 402 can also be configured to provide an input to a virtual whiteboard described herein, for example, using a writing device 404 (e.g., stylus, finger, etc.). In this case, for example, the local mobile device 402 is designating the whiteboard WB's writing "notes," and also sending virtual whiteboard input "digital notes." In response to receiving the signal from the mobile device 402, the meeting camera 100 can be configured to communicate the webcam video signal CO, including the designated view DV that shows the whiteboard WB's writing "notes" and the virtual whiteboard with "digital notes" input, as a video signal to e.g., a host computer. In some embodiments, the webcam video signal CO in FIG. 4C can generate a composited video 404C, which can be displayed, for example, by a host computer 40, remote client 50, etc. For example, the composited video 404C shows the panorama view 406C with the participants M1, M2, and M3, and the whiteboard WB. For example, the composited video 404C also shows the stage view with the virtual whiteboard and the designated view DV. For example the virtual whiteboard is showing the digital writing "digital notes" according to the virtual whiteboard input "digital notes" from the mobile device 402. For example, the composited video 404C also shows the designated view DV as designated by the local mobile device 402 to show the writing "notes" on the whiteboard WB.

Whiteboard Mode

In some embodiments, as shown in FIGS. 4B, 4C, 5A, and 5B, when the designated view is designating a whiteboard WB, it may be desirable to enhance or improve the writing on the whiteboard WB, for example, to improve the legibility of such writing for the remote participants.

For example, FIG. 5A shows a webcam signal CO of an unaltered (e.g., un-enhanced or unimproved) designated view of the whiteboard WB with "notes" writing. In some embodiments, the webcam video signal CO in FIG. 5A can generate a composited video 504A, which can be displayed, for example, by a host computer 40, remote client 50, etc. For example, the composited video 504A shows the panorama view 506A with the participants M1, M2, and M3, and the whiteboard WB. For example, the composited video 504A also shows the stage view with the unaltered (e.g., un-enhanced or unimproved) designated view DV of the whiteboard WB. In some embodiments, a webcam signal CO of an unaltered (e.g., un-enhanced or unimproved) designated view of the whiteboard WB may show reflection(s), shadow(s), and/or glare(s) on the whiteboard WB, which can show non-uniform background of the whiteboard WB (e.g., the background of the whiteboard WB is not showing uniform white color). In another embodiments, a webcam signal CO of an unaltered (e.g., un-enhanced or unimproved) designated view DV of the whiteboard WB may show text writings (e.g., text writing of "notes" in the whiteboard WB as shown in FIG. 5A) that is not in correct, bright, or saturated color (e.g., text writing of "notes" in the whiteboard WB as shown in FIG. 5A is in grey). In both instances, it may be desirable to calibrate and/or denoise the webcam signal CO to improve the legibility of writings (e.g., text writing of "notes") on the whiteboard WB (e.g., to provide a "digital" feel to texts on the whiteboard WB).

In some embodiments, when the meeting camera 100 as illustrated in FIG. 3A, or the meeting camera 100a or 100b as illustrated in FIG. 3C detects that the designated view DV is designated to view a whiteboard WB, the processor 6 in the meeting camera 100, 100a, or 100b can be configured to perform the calibration and/or denoising of the webcam signal CO to improve the legibility of writings (e.g., text writing of "notes") on the whiteboard WB. In some embodiments, the processor can detect that the designated view DV is designated to view a whiteboard WB, based on a fiducial-bearing tile or tag as described herein (e.g., in FIGS. 9A-9D, 10A-10B, and 11). In other embodiments, the processor can automatically recognize (e.g., image processing) and/or detect that the designated view DV is designated to view a whiteboard WB, for example, when the designated view DV is designated to view an object of interest such as a whiteboard WB. For example, the processor can be configured to perform an image recognition processing and detect certain object of interest such as a whiteboard WB (e.g., a rectangular shaped white region, or any region or object with certain shape, color, or combination thereof). In other embodiments, the processor can detect that the designated view DV is designated to view a whiteboard WB, based on any combinations of visual or audio signals as described herein (e.g., hand gestures, sound of tapping the whiteboard, etc.). In embodiments relying on sounds, such as tapping on the whiteboard, the meeting camera 100, 100a, or 100b can determine the bearing of the designated view DV based on localizing the sound.

In some embodiments, when the meeting camera's processor detects that the designated view DV is designated to view a whiteboard WB, the processor can be configured to perform "whiteboard mode" function(s) to calibrate and/or denoise the designated view DV portion(s) of the webcam signal CO to improve or enhance the legibility of writings on the whiteboard WB. In some embodiments, the processor can be configured to apply the calibration and/or denoising process to a static image of the whiteboard WB. In another embodiment, the processor can be configured to apply the calibration and/or denoising process to adapt to a dynamically changing content on the whiteboard WB (e.g., when a participant writes or erases texts on the whiteboard WB).

For example, FIG. 5B shows a webcam signal CO with calibrated and/or denoised designated view DV signal (e.g., in a whiteboard mode) with improved or enhanced legibility of writings (e.g., text writing of "notes") on the whiteboard WB. For example, the webcam signal CO in FIG. 5B have been denoised to remove the reflection(s), shadow(s), and/or glare(s) on the whiteboard WB, and calibrated to show correct, bright, and/or saturated black color of the writings (e.g., text writing of "notes") on the whiteboard WB. In some embodiments, the webcam video signal CO in FIG. 5B can generate a composited video 504B, which can be displayed, for example, by a host computer 40, remote client 50, etc. For example, the composited video 504B shows the panorama view 506B with the participants M1, M2, and M3, and the whiteboard WB. For example, the composited video 504B also shows the stage view with a calibrated and/or denoised designated view DV (e.g., in a whiteboard mode) with improved or enhanced legibility of writings (e.g., text writing of "notes") on the whiteboard WB.

In some embodiments, the processor 6 may be configured to perform the calibration process on the designated view DV (e.g., when the designated view DV is designated to view the whiteboard WB) by increasing or decreasing one of the following characteristics of the designated view DV before or during the process of compositing the designated view DV into the webcam video signal CO: brightness, contrast, and/or gamma. In some embodiments, these characteristics can be changed within the designated view DV portion(s) of the composited signal CO. In some embodiments, changing these values can alter the appearance of persons in the meeting as shown in the stage view or panorama view. In some embodiments, changing these values can alter (e.g., enhance) the readability of a whiteboard WB.

In some embodiments, the processor 6 can be configured to perform a color calibration process by transforming the original whiteboard WB image's pixel colors into the correct, bright, and/or saturated color. For example, this color calibration processing can be based on the background color of the whiteboard WB (e.g., white). The processor 6 can be configured to perform the digital image's white balancing to calibrate the three color channels and normalize the three channels such that the white color region of the whiteboard WB correspond to the white color (e.g., [255, 255, 255] in unit 8). In some embodiments, the background color of the whiteboard WB can be in any color. For example, the processor 6 can be configured to perform the color balancing of the whiteboard WB content based on the corresponding background color of the whiteboard WB.

In some embodiments, the digital image's color balancing can be applied to the digital image as a whole. In some embodiments, based on some factors (e.g. environment illumination, whiteboard materials, camera characteristics), a single normalization factor for the whole whiteboard WB image may not be desirable to color balance all the pixels. In some embodiments, the processor 6 can be configured to divide the whiteboard into a grid and compute the normalizing factors for each region on the grid. For example, the processor 6 can be configured to implement a color balancing algorithm (e.g., the principles of the White Patch Retinex), where the brightest pixels of a patch can be taken to be the white color. In some embodiment, the processor 6 configured such that the brightness can be evaluated on the L channel of the HSL color space to perform the color balancing (e.g., color calibration).

In some embodiments, when the processor 6 divides the whiteboard image into a grid and computes the normalizing factors for each region on the grid, it may be desirable to prevent a grid or tiling effect on the color calibrated image of the whiteboard WB. For example, to prevent a grid/tiling effect on the output image, the processor 6 can be configured to compute a per-pixel normalization factor (e.g., by using bilinear interpolation) by upsampling the M×N grid to the size of the input image of whiteboard WB.

In some embodiments, when the processor 6 performs the color (e.g., white) balance correction on the digital image of whiteboard WB, this can cause the image's content color to appear washed out, and it may be desirable to further configure the processor 6 to perform a gamma correction. For example, the processor 6 can be configured to apply a gamma correction as a post-processing step that can push low values of the color channel(s) to 0, and high values of the color channel(s) to 255 based on a non-linear formula. For example, the processor 6 can be configured to apply the parametric formula of cos(pow (Pc, Gamma)*PI). In this formula, Pc is calibrated pixel value per color channel. Cos is a cosine function. Pow is a power function. Pi ($\pi$) is a mathematical constant. Gamma value is a value that can be adjusted to a value (e.g., Gamma value can be set to 3) that can correctly enhance and apply the gamma correction to the whiteboard WB image.

In some embodiments, the processor 6 may be configured to perform temporal video denoising, optionally, with or without motion compensation (e.g., by averaging subsequent frames of the designated view DV) to decrease noise before compositing the designated view DV into the webcam video signal CO. In some embodiments, the whiteboard WB's content can be quasi-static in nature (e.g., the change in the content happens at the relatively slow speed of a participant writing, erasing, sketching, drawing content on the whiteboard WB). For example, by taking advantage of the quasi-static nature of the whiteboard WB content, a frame rate at which the meeting camera 100 is imaging the whiteboard WB content can be decreased to provide a better signal to noise ratio (SNR), and the processor 6 can be configured to average the Whiteboard WB input frames (e.g., the images of the whiteboard WB) to decrease the noise. In some embodiments, the temporal video denoising can be applied to the designated view DV portion(s) of the composited signal or webcam signal CO. In some embodiments, temporal video denoising without motion compensation may cause motion blur and can alter the appearance of persons in the meeting as shown in the stage view or panorama view. In some embodiments, video denoising can enhance the readability of a whiteboard WB, for example, when there is little relevant motion to cause blur. In some embodiments, the processor 6 may be configured to use temporal video denoising with or without motion compensation in areas of the designated view DV having a textural contrast level that is lower than a predetermined threshold.

In some embodiments, when the meeting camera's processor detects that the designated view DV is designated to view a whiteboard WB, the processor can be configured to perform a "whiteboard mode" function(s) such as ghosting of any object that is blocking the camera's view of the whiteboard content, for example, by making the image of the blocking object partially or fully translucent. In some embodiments, the processor 6 (e.g., in a whiteboard mode) can be configured to detect whether an object (e.g., a participant M2 standing in between the whiteboard WB and the meeting camera 100) is blocking the whiteboard WB's contents.

For example, FIG. 6A shows that a participant M2 is standing in between the whiteboard WB and the meeting camera 100, and covering the whiteboard WB's contents (e.g., text writing of "notes"). In some embodiments, the processor 6 can be configured to detect and perform a morphological image processing of erosion and/or dilation on the obstructing object's digital image pixels (e.g., a participant M2 standing in between the whiteboard WB and the meeting camera 100) and cause the obstructing object's digital pixels to appear partially or fully transparent in the composited signal or webcam signal CO. In some embodiments, the webcam video signal CO in FIG. 6A can generate a composited video 604A, which can be displayed, for example, by a host computer 40, remote client 50, etc. For example, the composited video 604A shows the panorama view 606A with the participants M1, M2, and M3, and the whiteboard WB that is located behind M2. For example, the composited video 604A also shows the designated view DV with a participant M2 standing in front of the whiteboard WB, and for example, blocking the whiteboard WB's content (e.g., a participant M2 is standing in front of the text writing "notes" on the whiteboard WB).

For example, FIG. 6B shows that the processor 6's morphological image processing of erosion and/or dilation of the participant M2's image (e.g., digital pixels corresponding to the participant M2's image in the designated view DV) to make it partially or fully transparent. For example, the processor 6 can process the participant M2's image appearing in front of the designated view DV of the whiteboard WB to be partially translucent (e.g., ghosted) to allow, for example, the remote participant to view the content of the whiteboard WB (e.g., text writing of "notes"). In some embodiments, the processor 6's image processing on the obstructing object(s) can allow the processor to generate the composited signal or webcam signal CO that shows the whiteboard WB content (e.g., text writing of "notes") hidden behind the obstructing object(s) by (e.g., a participant M2 who is standing in between the whiteboard WB and the meeting camera 100). In some embodiments, the webcam video signal CO in FIG. 6B can generate a composited video 604B, which can be displayed, for example, by a host computer 40, remote client 50, etc. For example, the composited video 604B shows the panorama view 606B with the participants M1, M2, and M3, and the whiteboard WB that is located behind M2. For example, the composited video 604B also shows the designated view DV with a participant M2 standing in front of the whiteboard WB, and the participant M2's image is partially translucent (e.g., ghosted). For example, the composited video 604B also shows the designated view DV with the content of the whiteboard WB (e.g., text writing of "notes") that is behind the partially translucent image of participant M2.

Figure 6C:
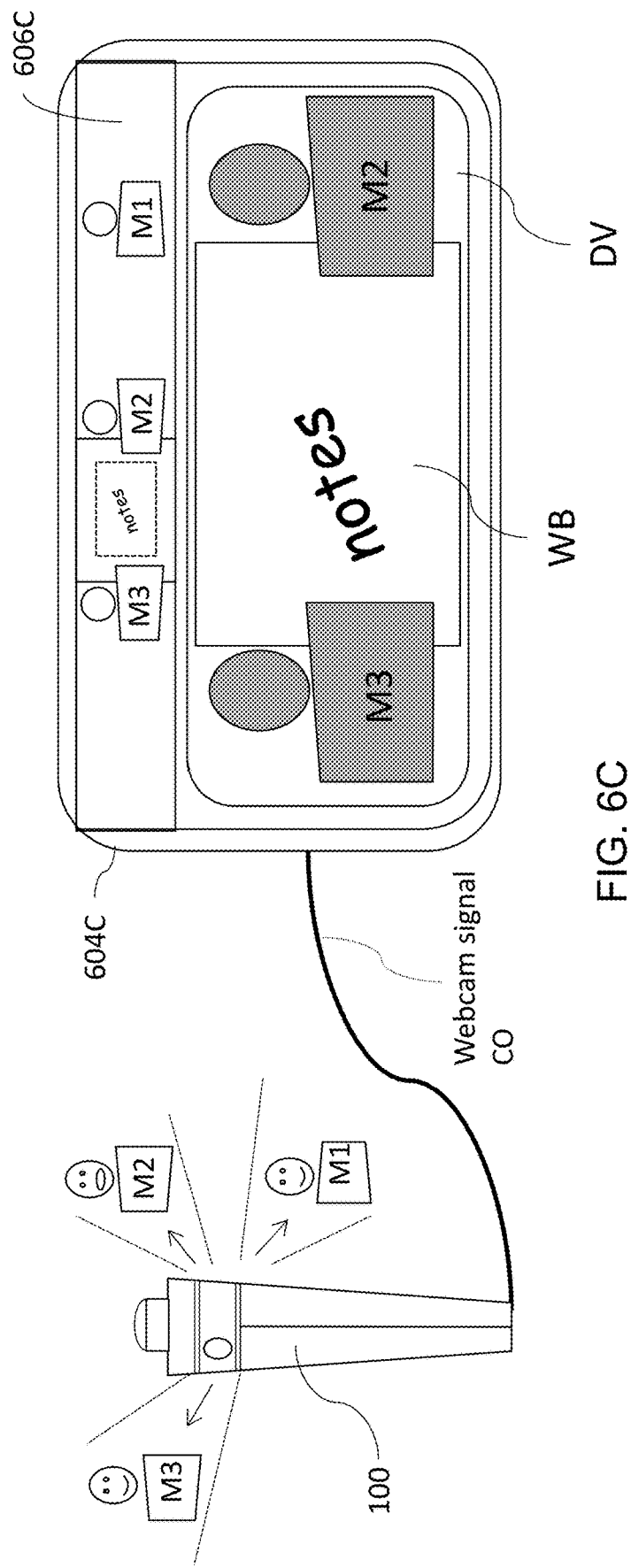

In some embodiments, as shown in FIG. 6C, a designated view DV can be configured to show a whiteboard WB and two participants (M2 and M3) on each side of the whiteboard WB. In some embodiments, the processor 6 can be configured to detect that the designated view DV is designated to view a whiteboard WB, and the processor 6 can be configured to perform "whiteboard mode" function(s) including the calibration and/or denoising the designated view DV portion(s) of the webcam signal CO to improve or enhance the legibility of writings on the whiteboard WB. In some embodiments, the processor 6 can be configured to further detect only the whiteboard WB portions within the designated view DV that include two participants on the sides. For example, the processor 6 can be configured to perform an image recognition processing and detect certain object of interest such as a whiteboard WB (e.g., a rectangular shaped white region, or any region or object with certain shape, color, or combination thereof). In some embodiments, when the processor detects the whiteboard WB portions of the designated view DV, the processor 6 can be configured to perform the calibration and/or denoising on the whiteboard WB portions of the designated view DV. In some embodiments, the processor can be configured to perform the "whiteboard mode" function(s) including the calibration and/or denoising on the entire portions of designated view DV including, for example, the two participants (M2 and M3) and the whiteboard WB. In some embodiments, the webcam video signal CO in FIG. 6C can generate a composited video 604C, which can be displayed, for example, by a host computer 40, remote client 50, etc. For example, the composited video 604C shows the panorama view 606C with the participants M1, M2, and M3, and the whiteboard WB that is located between M2 and M3. For example, the composited video 604C also shows the designated view DV with the whiteboard WB and the participants M2 and M3 standing on each side of the whiteboard WB.

In some embodiments, the processor 6 can be configured to perform dynamic updates of the whiteboard WB image by comparing the current camera image input of the whiteboard WB (e.g., designated view DV portions of the whiteboard WB content) with the previously updated internal configuration of the whiteboard WB, and/or previously saved image of whiteboard WB. In some embodiments, the processor 6 can be configured to perform semantic segmentation, for example, by discriminating which pixels in the image relate to the whiteboard WB's texts, contents, drawings, users or participants standing near or in front the whiteboard WB, and/or other objects. In some embodiments, the processor 6 can be configured to measure or detect dynamic effects on the image input of the whiteboard WB based on pixel levels and/or geometric blob analysis.

In some embodiments, the processor 6 can be configured to receive a digital image of an initial state of the whiteboard WB (e.g., when a meeting started, when the meeting camera 100, 100a, or 100b was initialized, restarted, etc.) and use such initial image as the first input for the dynamic update analysis. In some embodiments, the processor 6 can be configured to process images of the whiteboard WB regardless of whether a participant in a meeting is using the whiteboard WB (e.g., by writing on the whiteboard WB) or not using the whiteboard WB. In some embodiments, the processor 6 can be configured to process images of the whiteboard WB that is not in use, to obtain digital image data on a representation of the whiteboard WB to be used when needed.

In some embodiments, the processor 6 can be configured to perform the dynamic update analysis by processing every input image of the whiteboard WB, determining which part(s) of the input image to incorporate into the background layer of the whiteboard WB content (e.g., new text or erased text), which to reject (e.g., a participant M2 standing in between the whiteboard WB and the meeting camera 100 as illustrated in FIGS. 6A and 6B).

In some embodiments, the processor 6 can be configured to perform the dynamic update analysis by considering an input image of the whiteboard WB, for example, with new unseen writing. The processor 6 can be configured to compare pixels between the two input images (current input image and previous input image) and compute a new difference image results (e.g., called Delta) where changes to the whiteboard WB can be highlighted. The process 6 can compare some or every pixel between the two input images to compute the new difference image results (Delta).

In some embodiments, the processor 6 can be configured to perform a morphological image processing of erosion on changes, for example, due to marker or writing strokes. In another embodiment, the processor 6 can be configured to perform a morphological image processing of erosion on the changes, for example, due to erased texts, drawings, etc. on the whiteboard WB. In some embodiments, similar or analogous morphological image processing can be applied to new texts and erased texts, for example, because the computed new difference image results (Delta) can be configured to include the absolute difference values.

In some embodiments, the processor 6 can be configured to detect large changes in the new difference image results (Delta), for example, when performing a morphological image processing of erosion on large change areas, that may not fully remove the data. In some embodiments, the processor 6 can be configured to detect such large changes as being caused by, for example, foreground object(s) (e.g., a participant M2 standing in between the whiteboard WB and the meeting camera 100 as illustrated in FIGS. 6A and 6B) that may not be incorporated or dynamically updated. In some embodiments, the processor 6 can be configured to perform a morphological image processing of dilation to compensate the previously processed erosion, and/or add a safety margin around the foreground object(s). In some embodiments, the processor 6 can be configured to mark pixels that correspond to the detected foreground object(s) with an accumulator value that can be incremented at each processing iteration. In some embodiments, the processor 6 can be configured to detect that whether the accumulator reaches a predetermined threshold value. In some embodiments, when the accumulator reaches a predetermine threshold value, the processor 6 can be configured to incorporate the corresponding pixel to the whiteboard WB image that is to be dynamically updated.

In some embodiments, when the accumulator for large static objects is analyzed on a per-pixel bases, the processor 6 can partially incorporate undesirable foreground object to the dynamically updated image of whiteboard WB. For example, a participant who is writing on the whiteboard can be moving the arm (e.g., the participant is writing by moving the arm) while the participant's torso can remain static. In some embodiments, the processor 6 can be configured to perform a connected component analysis on the difference image results (Delta) and perform the accumulator logic at the connected component level. In some embodiments, the processor 6 can be configured to perform the connected component analysis to determine if a part of the connected component is out of sync with the rest. In some embodiments, the processor 6 can be configured to reset the accumulator for the connected component, for example, when one or more parts of the connected component's out of sync is detected, and the object can remain as an ignored foreground object (e.g., ghosted, or partially or fully transparent). In some embodiments, the processor 6 can be configured to avoid excessive reset of the accumulator, for example, by analyzing or considering image noise on object boundaries on the inner part of the connected components. In some embodiments, the processor 6 can be configured to set or have a tolerance between the minimum and maximum accumulator value(s) inside the connected component.

In some embodiments, the processor 6 can be configured to send/upload the dynamically updated and processed image(s) of the designated view DV of the whiteboard WB to one or more networks describe herein. For example, the processor 6 can be configured to send/upload the dynamically updated and processed image(s) of the designated view DV of the whiteboard WB to a remote server, a local network, remote clients 50 via internet 60 (e.g., as illustrated in FIGS. 1A-1C). In some embodiments, the processor 6 can be configured to periodically send/upload the dynamically updated and processed image(s) of the designated view DV of the whiteboard WB to the networks. For example, the processor 6 can be configured to upload the image in certain predetermined time period (e.g., every 30 seconds, every minute, every 5 minutes, every 10 minutes, etc.), regardless of whether the whiteboard WB's content (e.g., writings, drawings, etc.) changed or did not change. In some embodiments, the processor 6 can be configured to send/update the dynamically updated and processed image(s) of the designated view DV of the whiteboard WB to the networks when a change in the whiteboard WB's content (e.g., writings, drawings, etc.) is detected.

Figure 7A:
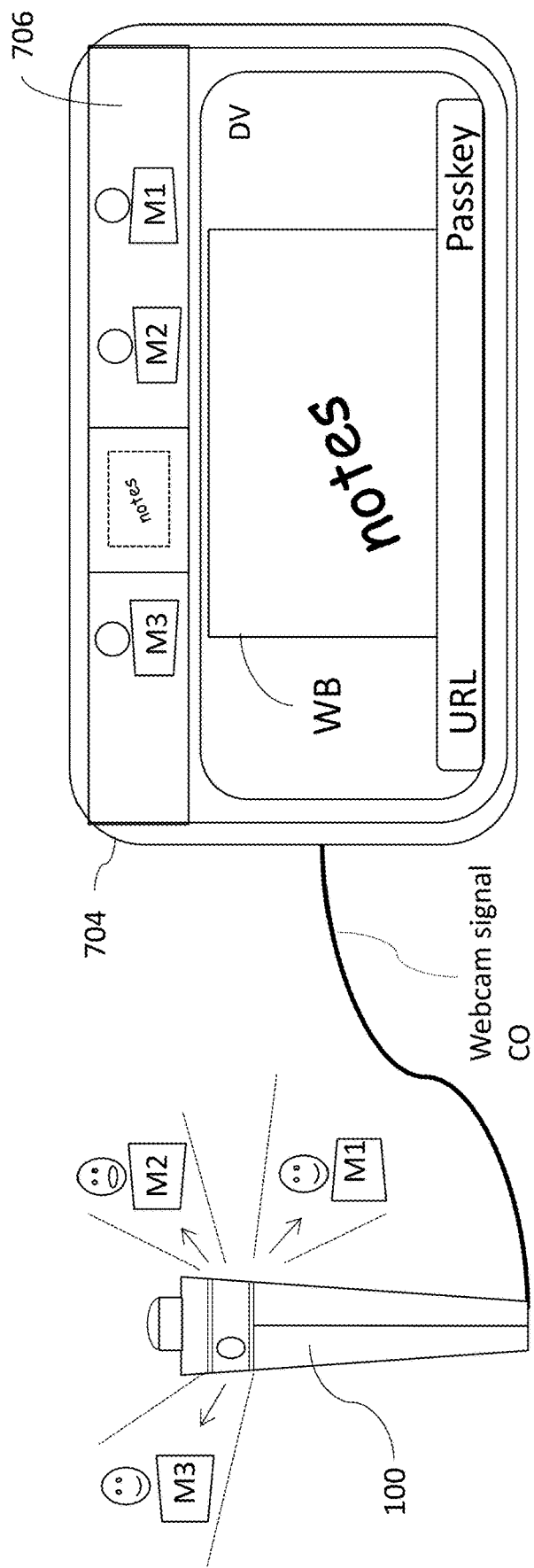
FIG. 7A shows an exemplary schematic view of composited signal CO by the devices 100 according to aspects of the disclosed subject matter.

In some embodiments, the processor 6 can be configured to send/upload the dynamically updated and processed image(s) of the designated view DV of the whiteboard WB to a secure server, and provide the access information to the participants, remote clients, etc. For example, FIG. 7A shows a webcam signal CO configured to include the designated view DV signal (e.g., in a whiteboard mode) showing the dynamically updated and processed image of the whiteboard WB. FIG. 7A also shows a webcam signal CO configured to include a URL (e.g., internet address of the remote server locations updated with dynamically updated and processed image(s) of the whiteboard WB, and the passkey to access the URL. For example, a web signal CO sent to the remote clients and participants shows the URL and the passkey. In some embodiments, the processor 6 can be configured to send/upload the dynamically updated and processed image(s) of the designated view DV of the whiteboard WB to a non-secure server, and provide the access information to the participants, remote clients, etc., which may not include a passkey because the non-secure server can be not protected by a passkey. In some embodiments, the webcam video signal CO in FIG. 7A can generate a composited video 704, which can be displayed, for example, by a host computer 40, remote client 50, etc. For example, the composited video 704 shows the panorama view 706 with the participants M1, M2, and M3, and the whiteboard WB. For example, the composited video 704 also shows the designated view DV with the whiteboard WB and the access information (e.g., URL and Passkey) to access the image(s) of the whiteboard WB uploaded on a server.

In some embodiments, a server can be configured to store and show a series of the dynamically updated and processed image(s) of the designated view DV of the whiteboard WB sent/updated by the meeting camera 100 (e.g., by the processor 6 and/or network interface(s)).

Figure 7B:
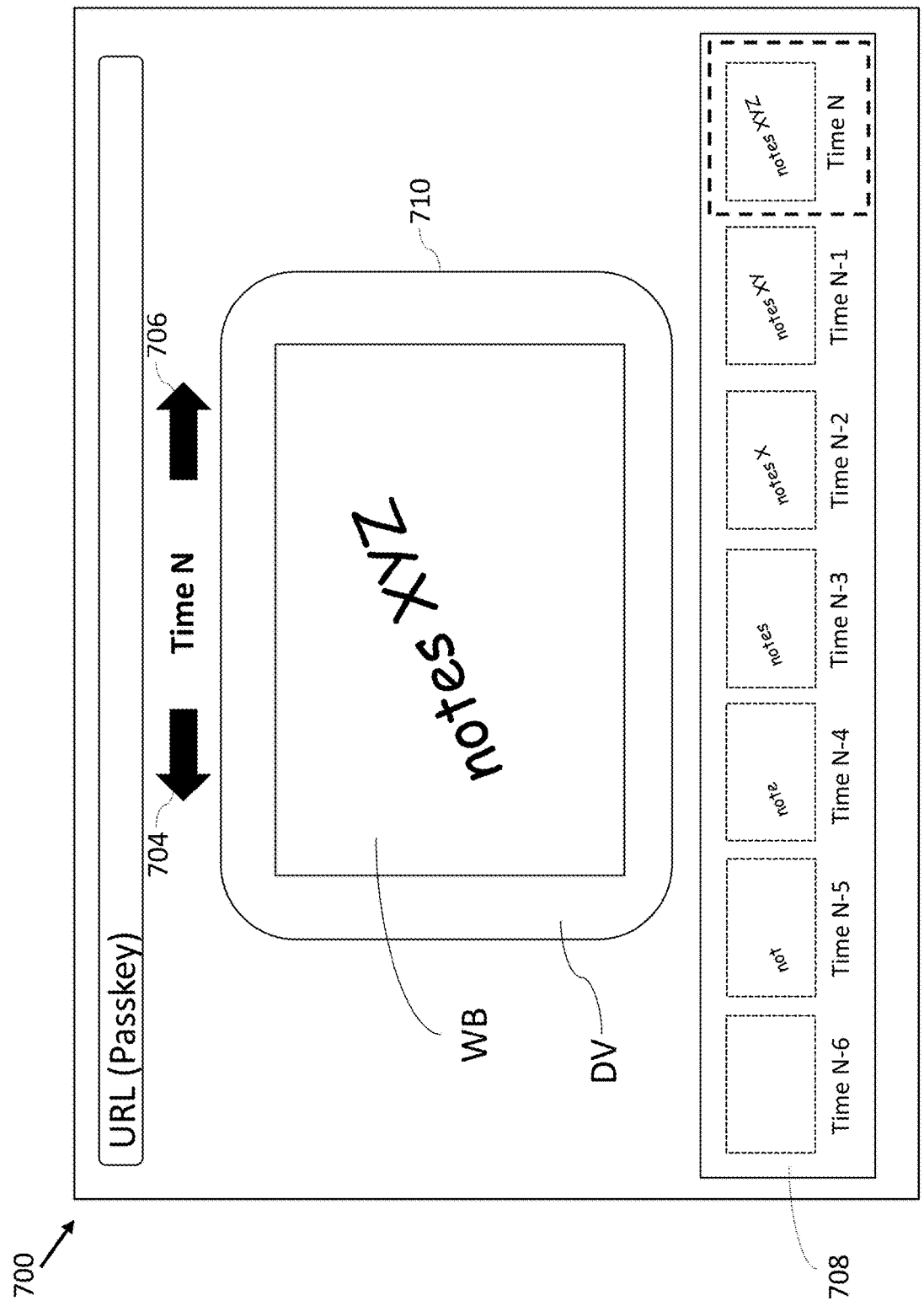
FIG. 7B shows an exemplary server website layout according to aspects of the disclosed subject matter.

FIG. 7b shows an exemplary server website 700 storing and showing a series (e.g., time n−6, time n−5, time n−4, time n−3, time n−2, time n−1, and time n) of the dynamically updated and processed image(s) of the designated view DV of the whiteboard WB sent/updated by the meeting camera 100. For example, the server website 700 can be accessed by the URL address and Passkey provided by a webcam signal CO to a host PC, remote clients 50, participants, etc., (e.g., as illustrated in FIG. 7A). In some embodiments, the server website 700 can be configured to show its URL and/or the Passkey. In some embodiments, the server website 700 can be configured to show, in display 710, one of the selected series of the dynamically updated and processed image(s). For example, a user accessing the server website 700 can select one of the dynamically updated and processed image(s) by clicking the arrows 704 and 706. For example, arrow 704 can be clicked to select dynamically updated and processed image(s) with older time stamp(s), and arrow 706 can be clicked to select dynamically updated and processed image(s) with later time stamp(s). For example, the display 710 in FIG. 7b shows that the dynamically updated and processed image corresponding to time n is selected. In some embodiments, the server website 700 can be configured to show the index or thumbnails 708 of the series of the dynamically updated and processed image(s) with time stamp: time n−6, time n−5, time n−4, time n−3, time n−2, time n−1, and time n. For example, the time n−6 can represent the dynamically updated and processed image corresponding to time n−6 (e.g., earlier in the meeting). For example, the time n can represent the dynamically updated and processed image corresponding to time n (e.g., later in the meeting). In some embodiments, a user can select a series (e.g., time n−6, time n−5, time n−4, time n−3, time n−2, time n−1, and time n) of the dynamically updated and processed image(s) of the designated view DV of the whiteboard WB to obtain information on a history of the writings in the whiteboard WB. For example, in time n−6, the whiteboard WB had no writing. For example, in time n−5, the whiteboard WB had writing that states "not." For example, in time n−4, the whiteboard WB had writing that states "note." For example, in time n−3, the whiteboard WB had writing that states "notes." For example, in time n−2, the whiteboard WB had writing that states "notes X." For example, in time n−1, the whiteboard WB had writing that states "notes XY." For example, in time n, the whiteboard WB's writing shows "notes XYZ."

In some embodiments, a user can download all or part of the series of the dynamically updated and processed image(s) of the designated view DV of the whiteboard WB that are stored on the server 700. In some embodiments, the server 700 can be configured to permanently store all or part of the series of the dynamically updated and processed image(s). In some embodiments, the server 700 can be configured to delete all or part of the series of the dynamically updated and processed image(s) after a predetermined time has elapsed. For example, the server 700 can be configured to delete the dynamically updated and processed image 2 hours after the image was uploaded to the server. In another example, the server 700 can be configured to delete the dynamically updated and processed image 24 hours after the image was uploaded to the server.

In some embodiments, the processor 6 may receive coordinate instructions including a direction of movement of the designated view DV, and the continuously update the webcam video signal CO to show real-time motion of the designated view DV. The received coordinate instructions may include a change in appearance of the designated view DV. The processor 6 may be configured to process the designated view DV with spatial noise reduction in one or more of portions of the designated view DV, and/or to use temporal video separately in chroma and luma channels to decrease noise as described herein, before compositing the manually designated view DV into the webcam video signal.

In some embodiments, a meeting camera 100 can be configured to include a localization sensor array with an acoustic array 4 having at least two microphones and configured to compare signals from each of the at least two microphones with one another to identify the one or more bearings of interest. In some embodiments, the localization sensor array can be configured to include a camera, which may be the wide camera 2, 3, 5. The processor 6 may then be configured, as discussed herein, to identify one or more of motion or human faces to identify the one or more bearings of interest.

Semi-Manual Designation

In some embodiments, with reference to FIG. 4A-4C, 5A-5B, or 6A-6B, a fiducial-bearing tile or tag may be employed as an alternative manner of designating the location, size or change thereof "DV-change" of the manually designated view DV within the panorama view, especially in the case of a whiteboard mode for the manually designate view. In this case, the meeting camera 100's processor may execute recognition and localization for a fiducial, and based upon the detection and localization of the fiducial, determine coordinate instructions within the coordinate map that define coordinates of the manually designated view within the panorama view, while the tethered webcam connection, e.g., USB, remains a communications interface as previously discussed.

As shown in FIG. 8, a fiducial marker, tag or tile placed within the field of view of the meeting camera 100 may be used to designate or change a location or size DV-change of a designated view DV. In one example, a magnetic tile 8T (e.g., a plastic tile with rare earth magnets embedded within) may be marked with an appropriate fiducial 8F and may trigger or activate the whiteboard mode for the designated view DV.

Figure 9A:
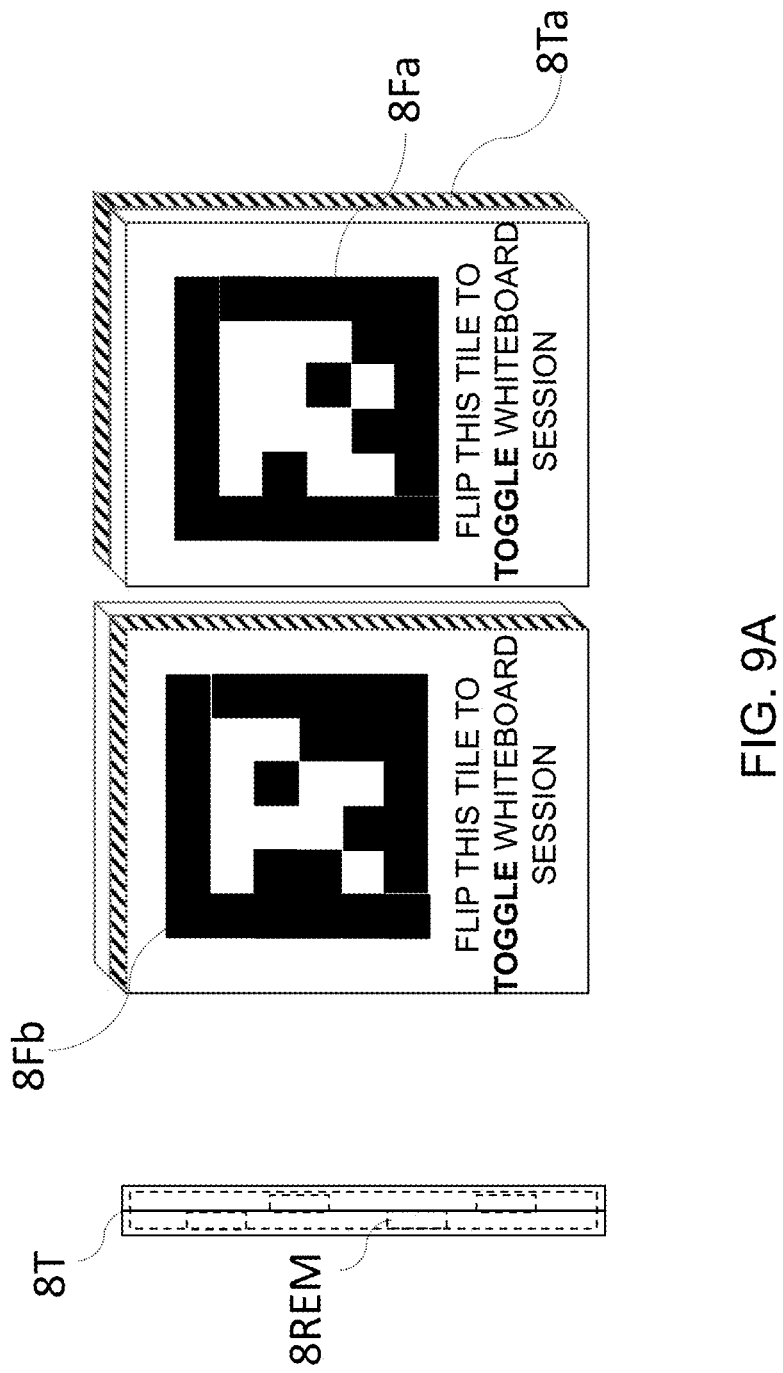

Some forms of such a tile are shown in FIGS. 9A-9D. FIG. 9A shows a two-sided tile, both sides functional, and each side having a differently encoded fiducial. To the left of FIG. 9A, a side schematic view shows internal rare earth magnets 8REM which are distributed sufficiently closely to each side surface to allow the tile to adhere magnetically to a magnetic whiteboard WB. In some embodiments, a fiducial marker, tag or tile may not include any magnet, and can be placed on to a whiteboard WB (e.g., a non-magnetic whiteboard WB) using other means. In one example, a fiducial marker, tag or tile may be coated with adhesive that can allow the fiducial marker, tag or tile to be temporarily attached and removed at least one or more times to a whiteboard WB. In another example, a fiducial marker, tag or tile can include a hole, a cutout, or a hanger to allow the fiducial marker, tag or tile to be placed on a hook that is located on a whiteboard WB.

To the right of FIG. 9A, although two views of the tile 8Ta are shown side-by-side, these are opposing sides of the same tile for illustrative purposes. On the front side of the tile 8Ta, an encoded fiducial 8Fa is recognizable by the meeting camera 100. On the rear side of the tile, a differently encoded fiducial 8Fb is also recognizable by the meeting camera 100. Instructive indicia may appear on both sides. Differently encoded fiducials 8Fa and 8Fb allow the meeting camera 100's processor to recognize a tile flipped by a meeting participant as a toggled change in status for the tile 8Ta, which may be used by the camera 100's processor as a toggle trigger between two functional states. In the example shown in FIGS. 8 and 9A, each time the tile 8Ta is flipped, the camera 100's processor may recognize this as an DV-change instruction to activate and/or re-activate and locate the designated view DV, e.g., in a default whiteboard window size.

For example, the processor may be configured to not consider the first fiducial 8Fa or 8Fa recognized upon startup to be an DV-change instruction, but instead the second and/or subsequent one of fiducials 8Fa or 8Fa to be such an instruction. In this manner, when an operator has left the tile 8Ta adhered to a whiteboard WB, the meeting camera may be prevented from initiating a whiteboard mode from the DV-change instruction. A meeting attendee, instead, would actively flip the tile 8Ta to begin the whiteboard mode session.

Figure 9B:
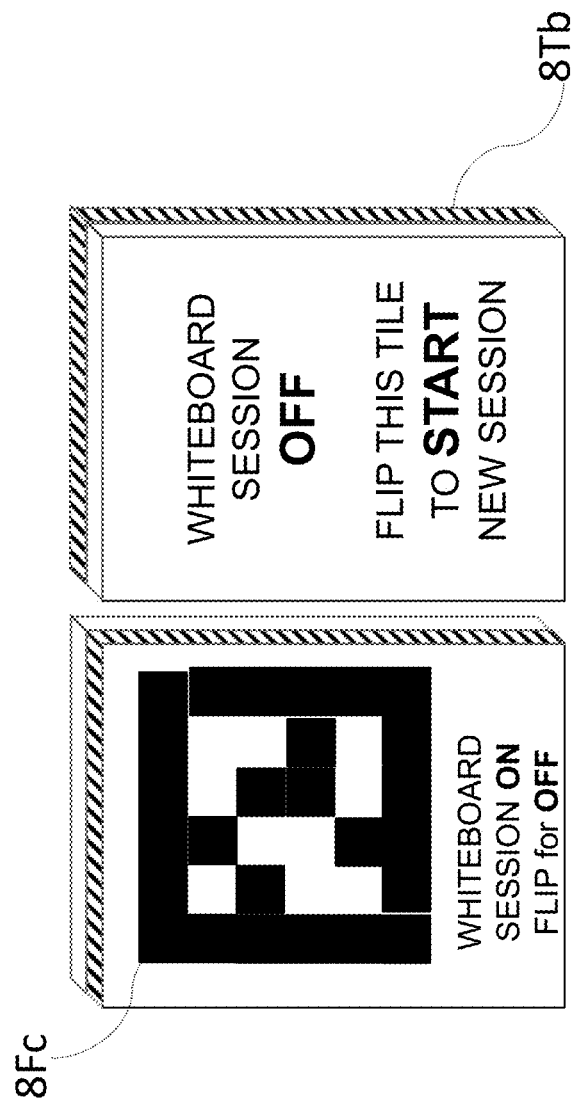

FIG. 9B shows a two-sided tile, both sides functional, and only one side having an encoded fiducial. Again, although two views of the tile 8Tb are shown side-by-side, these are opposing sides of the same tile for illustrative purposes. On the front side of the tile 8Tb, an encoded fiducial 8Fc is recognizable by the meeting camera 100. On the rear side of the tile, no fiducial, but instructive indicia may appear. One of the encoded fiducials 8Fc allows the meeting camera 100's processor to recognize a tile flipped by a meeting participant as a switched change in status for the tile 8Tb, which may be used by the camera 100's processor as a switch trigger between two functional states. In the example shown in FIG. 9B, each time the tile 8Tb is flipped, the camera 100's processor may recognize this as a DV-change instruction to appropriately activate and/or de-activate and locate the manually or automatically designated view DV, e.g., in a default whiteboard window size. All three fiducials 8Fa, 8Fb and 8Fc, and accordingly all states of both tiles 8Ta and 8Tb, may be recognized by the meeting camera 100's processor, allowing an operator to use either toggle or switch mode, whichever they may prefer.

FIGS. 9C and 9D shows two two-sided tiles, each with both sides functional, and each side having a differently encoded fiducial. Again, in each of FIGS. 9C and 9D, although two views of the tile 8Ta are shown side-by-side, these are opposing sides of the same tile for illustrative purposes. Again, illustrative indicia may appear on the faces of the tiles along with the fiducials. As with tile 8Ta, each side of each tile 8Tc and 8Td has a differently encoded fiducial. Each pair of the fiducials 8Fd, 8Fe, 8Ff, and 8Fg are associated, such that the meeting camera 100's processor is configured to recognize any pair of these four fiducials as representative of a location and/or size change instruction DV-change for the designated view DV, e.g., defining opposing corners of the whiteboard mode window.

FIGS. 10A-10C show examples of defining opposing corners of the whiteboard mode window. For example, when one of the tiles 8Tc or 8Td is translated upon the whiteboard WB, the window may resize or relocate according to the new localization. In one example, as shown in FIG. 10A, tile 8Tc can define the upper left position of the whiteboard WB's window, and tile 8Td can define the upper left position of the whiteboard WB's window. The two tiles 8Tc and 8Td, for example, can be translated away from each other to increase the size of the whiteboard WB's window, can be moved closer to each other to decrease the size of the whiteboard WB's window, or can be moved to relocate the whiteboard WB's window. For example, as shown in FIG. 10B, tile 8Td can be moved closer to the lower right corner of the whiteboard WB, while tile 8Tc remains near the upper left corner of the whiteboard WB, thereby increasing the whiteboard's window size as illustrated by the DV-change dotted line. In another example, as shown in FIG. 10C, the two tiles 8Tc and 8Td can be moved to define the window at the whiteboard WB's center space as illustrated by the DV-change dotted line. Therefore, an operator can move the tiles 8Tc or 8Td across the whiteboard WB to resize or relocate the window, for example, to show certain desirable area of the whiteboard WB to meeting participants. Such resizing and/or relocating the window can be performed automatically during use of the meeting camera 100, 100a, and/or 100b in an active meeting session. In the alternative, meeting camera 100, 100a, and/or 100b can restrict resizing and/or relocation to occur only during a designated configuration mode.

In some embodiments, when the 8Tc tile (or any other tile) is flipped a whiteboard mode with a designated view DV session can be started, restarted, or stopped, and when the 8Td tile (or any other tile) is flipped, the whiteboard mode window may be recorded as a still image and saved to an archive. Each change in position, appearance, or disappearance of a fiducial 8Fa-8Fg may correspond to a different instruction DV-change, as may combinations of them. All shown fiducials 8Fa-8Fg, and all states of tiles 8Ta-8Td may be recognized by the meeting camera 100, allowing an operator to command the meeting camera 100 by showing or hiding a fiducial 8Fa-8Fg (e.g., with respect to camera 100, e.g., by placing a tile within the field of view, removing it, or flipping it) or by changing the pose (e.g., location and/or orientation) of a tile 8Ta-8Td.

Figure 10D:
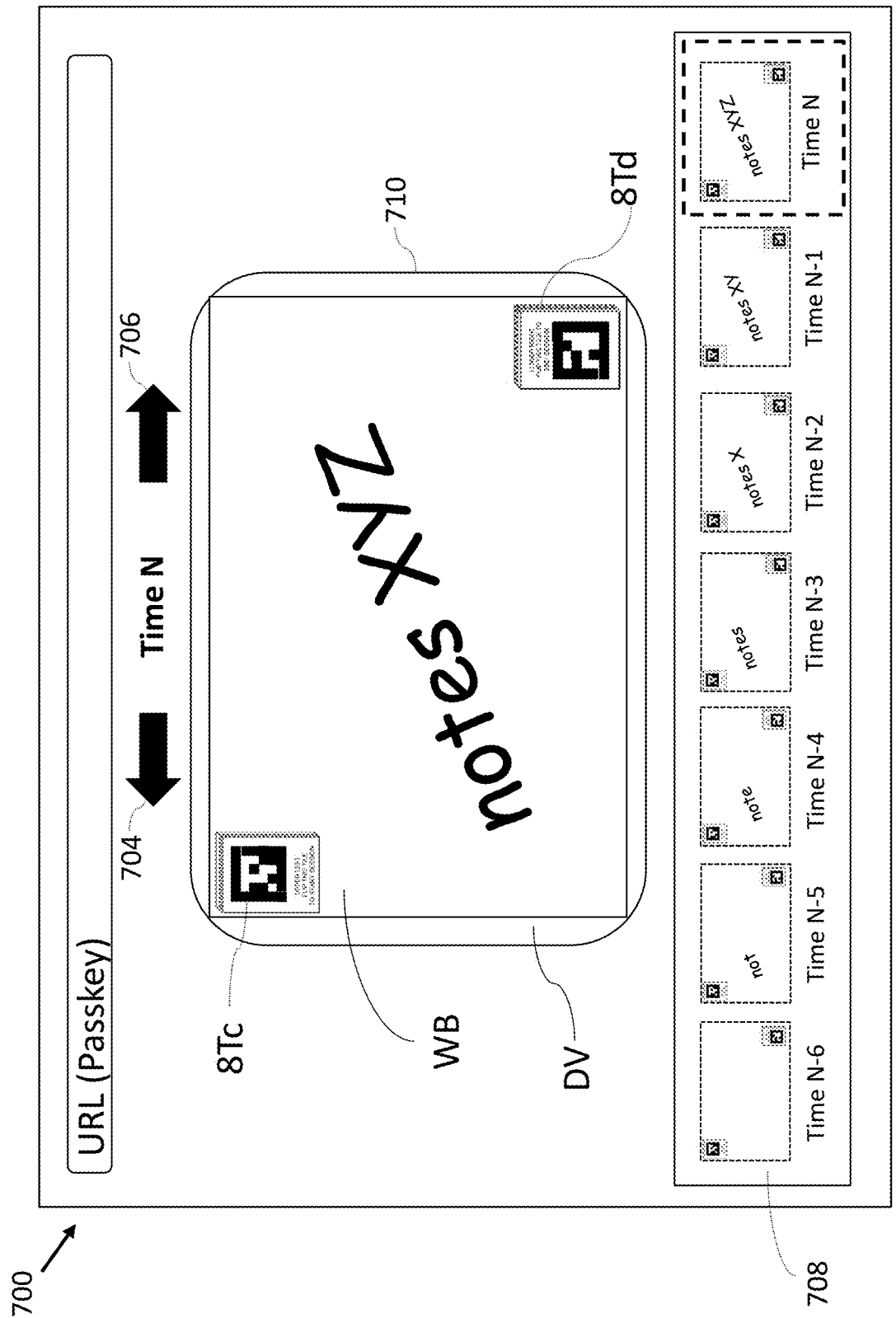
FIG. 10D shows an exemplary server website layout according to aspects of the disclosed subject matter.

In some embodiments, when whiteboard mode is on, the window may be recorded as a still image and saved to an archive (e.g., in a remote server or any local storage device). FIG. 10D is an exemplary server website 700 storing and showing a series (e.g., time n−6, time n−5, time n−4, time n−3, time n−2, time n−1, and time n) of the window images (e.g., dynamically updated and processed images) of the designated view DV (e.g., designated based on the tiles 8Tc and 8Td) of the whiteboard WB sent/updated by the meeting camera 100. FIG. 10D's descriptions are similar or analogous to FIG. 7B. In some embodiments, the meeting camera 100 (e.g., based on the processor 6 and network interface(s)) can be configured to periodically record/update portions of the whiteboard WB images (e.g., dynamically updated and processed images) as defined by the two tiles 8Tc (e.g., defining the upper left corner of the window for the designated view DV) and 8Td (e.g., defining the lower right corner of the window of the de view DV). In some embodiments, the meeting camera 100 (e.g., based on the processor 6 and network interface(s)) can be configured to record/update the designated view DV portions of the whiteboard WB image when the tiles 8Tc and 8Td are flipped in predetermined manner. For example, the meeting camera 100 can be configured to start or end the whiteboard mode when the tile 8Tc is flipped. In another example, the meeting camera 100 can be configured to record/update portions of the whiteboard WB images as defined by the two tiles 8Tc and 8Td when the tile 8Td is flipped.

In some embodiments, some or all window images in FIG. 10D (e.g. the images corresponding to time n−6, time n−5, time n−4, time n−3, time n−2, time n−1, and time n) may have been periodically updated to the server 700. In another example, some or all window images in FIG. 10D (e.g. the images corresponding to time n−6, time n−5, time n−4, time n−3, time n−2, time n−1, and time n) may have been updated to the server 700 based on the tile command (e.g., the image was uploaded when tile 8Td was flipped).

In some embodiments, a valid recognized fiducial may have one or more functional identities to activate various functions in the meeting camera, and examples herein include: turn on whiteboard mode, toggle whiteboard mode on/off; restart whiteboard mode; identify first anchor corner (e.g., upper left); identify second anchor corner (e.g., lower right); turn off whiteboard mode.

Figure 11:
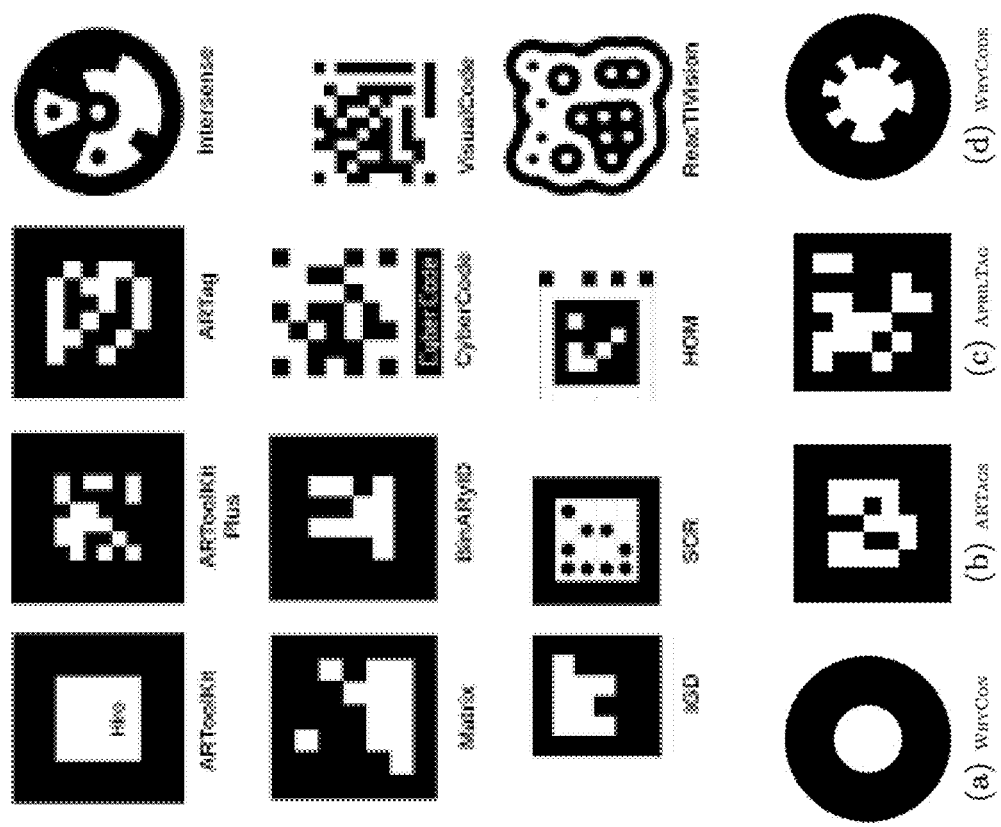
FIG. 11 shows exemplary fiducial markers, tags, or tiles according to aspects of the disclosed subject matter.

FIG. 11 shows a variety of illustrative fiducial types suitable for recognition and localization in this manner. Each type of fiducial encodes a small amount of data (e.g., as low as 1 bit for presence/absence) and may be recognized from a distance of few meters even when the fiducial's size is relatively small (e.g., 1-4 inches along a side).

A fiducial type may include, for example, ARToolkit, ARToolkit Plus, ARTag, Intersense, Matrix, BinARyID, CyberCode, VisualCode, IGD, SCR, HOM, ReacTIVision, WhyCon, ARTags, AprilTag, WhyCode, QR Code, or another type.

Figure 12:
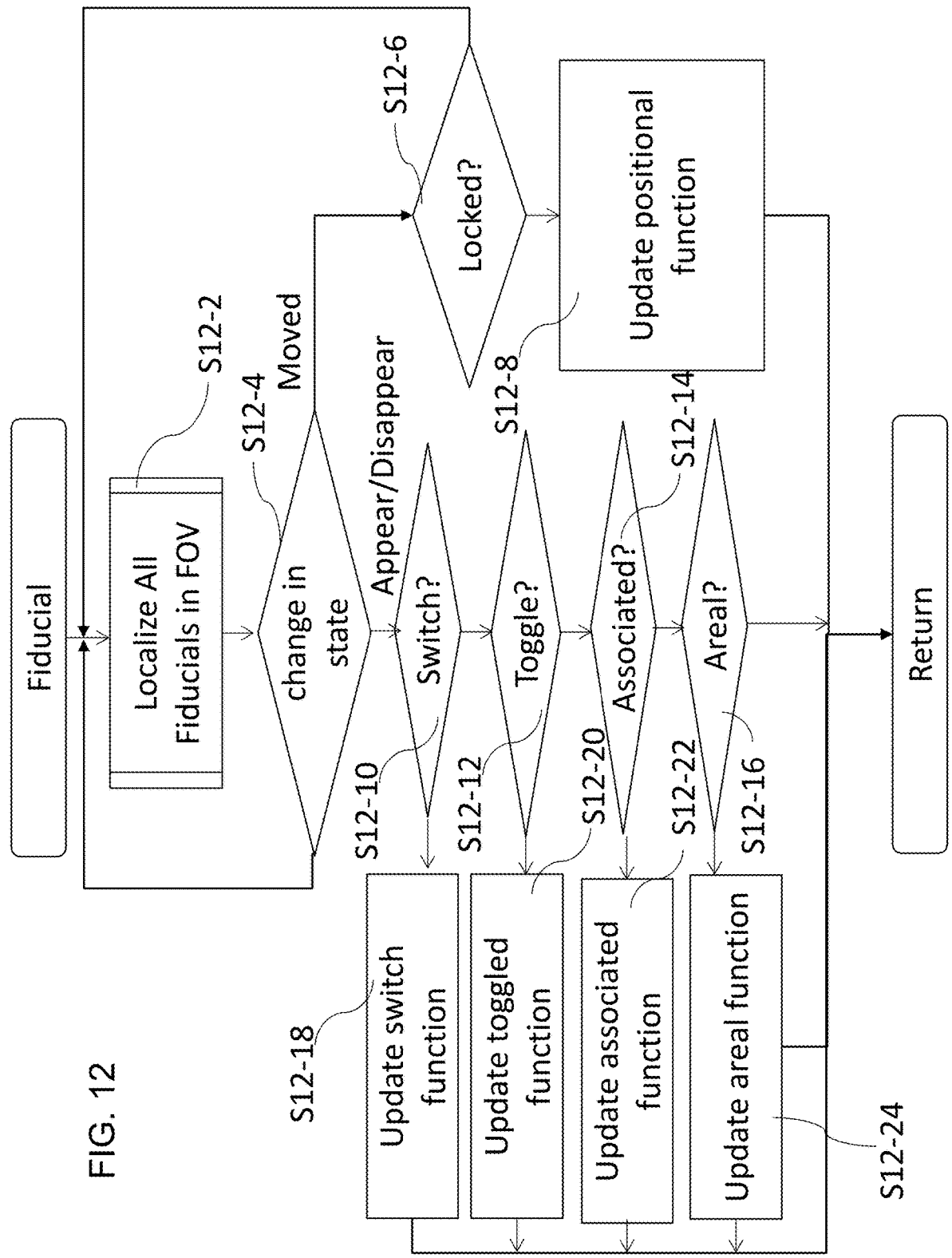
FIG. 12 shows an exemplary process for using of one or more fiducial marker, tag, or tile according to aspects of the disclosed subject matter.

The routine of FIG. 12 handles each of these, but may be simplified in the case where fewer unique fiducials are used for fewer functional activations (e.g., only one fiducial 8Fc is simply to switch a whiteboard mode on/off and simultaneously localize an upper left corner of a whiteboard menu).

In step S12-2, the processor detects, recognizes, and localizes fiducials within the camera field of view.

Detection and localization of a fiducial 8Fa-8Fg within the field of view of the camera 100 may be complex (e.g., localizing moving, perspective-shifted, illumination-variant, and/or partially occluded fiducials), but may also be more straightforward if only fiducials that tend to be not occluded, stationary, substantially evenly illuminated, and facing the camera are accepted.

In one example, detection may be a combination of processes in relevant order, e.g., the processor may searches the panorama image for a continuous segments or blocks of black pixels; may threshold candidate segments or blocks to uniform blackness; may search near black segments or blocks for white segments or blocks; may validate a located set of white blocks versus black blocks for a ratio matching the code formula; may project or transform the detected fiducial to determine scale, perspective, affine, and/or other transformation (thereby providing information to determine fiducial pose); may use feature detection such as SIFT, SURF and the like to identify keypoints and create descriptors.

Alternatively or in addition, the detection process may resize candidate image areas to reduce computation relating to a candidate fiducial, find marker or fiducial borders by segmentation, may extract contours from a thresholded image and reject irrelevant contours, may approximate extracted contours to similar polygons and reject those that are not four cornered or convex, may computing a homography matrix and compass direction rotations to match to known valid fiducials, or may estimates the lines of the fiducials sides using contour pixels and compute corresponding intersections.

In some examples, this may be only a single fiducial or a few valid fiducials, with the system reporting an error if more than one of the single or few valid fiducials are recognized or localized.

In step S12-4, the processor recognizes that a state of at least one fiducial in the set of previously identified fiducials has changed, e.g., one or more fiducials have moved, appeared, or disappeared within the field of view.

A moved fiducial has been localized to a new position within the field of view (e.g., when the same fiducial previously detected has been recognized and localized at a new position, and no duplicates have appeared, it is deemed moved).

In steps S12-6 and S12-8, the processor filters a recognized fiducial movement. For a whiteboard mode, the movement of a fiducial may signify, at least, a change in size or location of the whiteboard window. For example, in step S12-6, the processor determines whether (i) the current whiteboard window location is a previously locked position, and therefore the movement of the fiducial does not redefine the current whiteboard window location, or (ii) the current whiteboard window location is "portable" with the fiducial, and is to be moved. If the window is locked, movements of the fiducial may be ignored (e.g., the process sent back to step S12-2) until the fiducial is flipped or otherwise "reset" by appearance/disappearance in the field of view. If the window is not locked, its position (or size, or both) may be updated, as in step S12-8.

A newly appearing fiducial may be independent, or may have an encoding associated with one or more other fiducials, e.g., a fiducial may be associated with a flip-side of the tile it appears on, or with an opposite corner of the whiteboard "window" of interest, or both.

In step S12-14, a newly appearing or newly missing fiducial is checked for "flipside" association with another fiducial (which may also have remained in the field of view, stationary or moved, or may have disappeared from the field of view) If an association with a flip-side fiducial is found, the tile associated therewith is deemed to have been flipped. The processor may also check if the associated and newly appearing fiducial is within a reasonable distance (e.g., 10-40 cm, 100-300 pixels) and/or time (appearance of fiducial 1 within disappearance of fiducial 2 within ½ second) to be deemed a "flip", and may reject instances in which both sides of a unique tile are recognized at once. In the case of, e.g., tile 8Tc as shown in FIGS. 9B and 9C, the flipping of the tile may trigger the processor to begin or to terminate, as appropriate, the manually designated whiteboard mode. These steps are carried out in steps S12-12 and S12-20.

In step S12-10, a newly appearing or newly missing fiducial is checked for switch function—e.g., to act as a switch type trigger, the appearance of the fiducial signifying an "on" state and the absence of the fiducial signifying an "off" state, as with the tile 8Tb of FIG. 9B. The processor associates a change in the manually designated view DV-change with the switch trigger, e.g., whether to begin or end whiteboard mode, and updates or changes the associated function in step S12-18.

While the operations of FIG. 12 may be conducted in different orders, in the example of FIG. 12, in step S12-12 the processor subsequently checks for a toggle-type function, e.g. the appearance and or absence of the fiducial signifying a change between an "on" state and an "off" state. The processor associates a change in the manually designated view DV-change with the toggle trigger, e.g., whether to begin or end whiteboard mode, and updates or changes the associated function in step S12-20.

As discussed herein, a toggle function may also be an associated toggle-type function as in step S12-14, where two fiducials 8Fa, 8Fb on each side of a same tile (such as tile 8Ta as in FIG. 9A) each signify a toggle of the same functional state and each fiducial is in association with another fiducial (which may also have remained in the field of view, stationary or moved, or may have disappeared from the field of view). If an association with a flip-side fiducial is found, the tile associated therewith may be deemed to have been flipped. The processor may also check if the associated and newly appearing fiducial is within a reasonable distance (e.g., 10-40 cm, 100-300 pixels) and/or time (appearance of fiducial 1 within disappearance of fiducial 2 within ½ second) to be deemed a "flip", and may reject instances in which both sides of a unique tile are recognized at once. In the case of, e.g., tile 8Ta as shown in FIG. 9A, the flipping of the tile 8Ta may trigger the processor to begin or to terminate, as appropriate, the manually designated whiteboard mode, and/or to set a position for the window (subscene) associated with it. This update of the function may be carried out in step S12-22.

As discussed herein, a function may also be an areal function as in step S12-16, where two tiles 8Tc, 8Td that may be placed at different locations each signify a change in a same or associated functional state and the recognized fiducials may define an area within the panorama view (e.g., the extent of the subscene of the whiteboard mode). Each fiducial of this type may be associate with another fiducial simultaneously appearing within the field of view. Defining corners of the subscene may be considered an areal function. In step S12-16, a newly appearing or newly missing fiducial is checked for "corner" association with another fiducial (which may also have remained in the field of view, stationary or moved, or may have disappeared from the field of view). If a "corner" or areal association with a newly appearing (or disappearing) fiducial is found, the tile associated therewith is deemed to have been added, moved, or removed as appropriate. The processor may also check if the associated and newly appearing fiducial is within a reasonable position relative position to be deemed associated as a corner tile, and may reject instances in a rectangular window may not be formed or in which the tiles are not arranged in a valid arrangement. In the case of, e.g., the tiles 8Tc and 8Td as shown in FIGS. 9C, 9D, and 10, the placing of the corner tile may trigger the processor to size or resize, as appropriate, a size of the whiteboard window in a designated whiteboard mode. The removal of the corner tile may trigger the processor to resize the whiteboard window to a default size. These operations or responses to an associated change command DV-change may be carried out in step S12-24.

In some embodiments, a fiducial marker, tag or tile may be replaced with other visual signals, audio signals, or any combinations thereof to perform similar functions in the meeting camera described herein. In some embodiments, the meeting camera 100 can be configured to detect one or more hand gestures of a participant to turn on whiteboard mode, toggle whiteboard mode on/off, restart whiteboard mode, or turn off whiteboard mode. In one example, a whiteboard WB can be tapped certain number of times (e.g., tapped by a hand) by a user, and the meeting camera 100's processor may detect such action (e.g., based on visual signals of a user's hand tapping, or based on audio signals of tapping sound) as an instruction to turn on whiteboard mode, toggle whiteboard mode on/off, restart whiteboard mode, or turn off whiteboard mode. In another example, when a user approaches a whiteboard WB and writes or draws on a whiteboard WB, the meeting camera 100's processor may detect such action (e.g., based on visual signals of user's action, based on visual signals of writing or drawing on a whiteboard WB, or based on audio signals) as an instruction to turn on whiteboard mode, toggle whiteboard mode on/off, restart whiteboard mode, or turn off whiteboard mode. In another example, a whiteboard WB's window size or location may be controlled by certain hand gestures, such pinching hand gestures to control the window size or locations. For example, a user may place one hand on a whiteboard WB's writing surface as a first anchor corner (e.g., upper left) and another hand as a second anchor corner (e.g., lower right), and the meeting camera 100's processor may detect such action (e.g., based on visual signals of user's action) as defining a whiteboard WB's window size or location.

Examples of Bearings of Interest

For example, bearings of interest may be those bearing(s) corresponding to one or more audio signal or detection, e.g., a participant M1, M2 . . . Mn speaking, angularly recognized, vectored, or identified by a microphone array 4 by, e.g., beam forming, localizing, or comparative received signal strength, or comparative time of flight using at least two microphones. Thresholding or frequency domain analysis may be used to decide whether an audio signal is strong enough or distinct enough, and filtering may be performed using at least three microphones to discard inconsistent pairs, multipath, and/or redundancies. Three microphones have the benefit of forming three pairs for comparison.

As another example, in the alternative or in addition, bearings of interest may be those bearing(s) at which motion is detected in the scene, angularly recognized, vectored, or identified by feature, image, pattern, class, and or motion detection circuits or executable code that scan image or motion video or RGBD from the camera 2.

As another example, in the alternative or in addition, bearings of interest may be those bearing(s) at which facial structures are detected in the scene, angularly recognized, vectored, or identified by facial detection circuits or executable code that scan images or motion video or RGBD signal from the camera 2. Skeletal structures may also be detected in this manner.

As another example, in the alternative or in addition, bearings of interest may be those bearing(s) at which color, texture, and/or pattern substantially contiguous structures are detected in the scene, angularly recognized, vectored, or identified by edge detection, corner detection, blob detection or segmentation, extrema detection, and/or feature detection circuits or executable code that scan images or motion video or RGBD signal from the camera 2. Recognition may refer to previously recorded, learned, or trained image patches, colors, textures, or patterns.

As another example, in the alternative or in addition, bearings of interest may be those bearing(s) at which a difference from known environment are detected in the scene, angularly recognized, vectored, or identified by differencing and/or change detection circuits or executable code that scan images or motion video or RGBD signal from the camera 2. For example, the device 100 may keep one or more visual maps of an empty meeting room in which it is located, and detect when a sufficiently obstructive entity, such as a person, obscures known features or areas in the map.

As another example, in the alternative or in addition, bearings of interest may be those bearing(s) at which regular shapes such as rectangles are identified, including 'whiteboard' shapes, door shapes, or chair back shapes, angularly recognized, vectored, or identified by feature, image, pattern, class, and or motion detection circuits or executable code that scan image or motion video or RGBD from the camera 2.

As another example, in the alternative or in addition, bearings of interest may be those bearing(s) at which fiducial objects or features recognizable as artificial landmarks are placed by persons using the device 100, including active or passive acoustic emitters or transducers, and/or active or passive optical or visual fiducial markers, and/or RFID or otherwise electromagnetically detectable, these angularly recognized, vectored, or identified by one or more techniques noted above.

Multiple Units

As shown in FIG. 1C, more than one meeting camera 100a, 100b may be used together to provide multiple viewpoints in the same meeting. As noted, the tabletop 360 camera 100a, 100b may deliver a live or streamed video display to the videoconferencing platform, and the live video display provided may be composited to include various subscenes. The subscenes may be primarily those taken from the 360 degree camera—such as a panoramic view of all meeting participants or focused subviews cropped from the full resolution panoramic view—may also include other views (e.g., a separate camera for a whiteboard) or even synthesized views (e.g., a digital slide presentation).

By compositing from among potential focused views according to perceived utility (e.g., autonomously or by direction), the tabletop 360-type camera can present consolidated, holistic views to remote observers that are more inclusive, natural, or information-rich.

When such a camera is used in a small meeting (e.g., where all participants are within 6 feet of the virtual tabletop 360), the central placement of the camera includes focused subviews of local participants (e.g., individual, tiled, or upon a managed stage) presented to the videoconferencing platform. As participants direct their gaze or attention across the table (e.g., across the camera), the subview appears natural, as the participant tends to face the central camera. There are at least two situations in which at least these benefits of the virtual tabletop 360 camera may be somewhat compromised.

When a remote participant takes a leading or frequently speaking role in the meeting, the local group may tend to often face the videoconferencing monitor upon which they appear (e.g., typically placed upon a wall or cart to one side of the meeting table). The tabletop 360 camera then presents more profile subviews of the local participants, and fewer face-on views, which is less natural and satisfying to the remote participants. Additionally, when the meeting table or room is particularly oblong, having a higher 'aspect ratio', the local group may not look across the camera, but more along the table, and tabletop 360 camera may then, again present more profile subviews of the local participants.

As shown in FIG. 1C, introducing a second 360 degree tabletop 360 camera 100b can provide more views from which face-on views may be selected. In addition, the second tabletop 360 camera's complement of speakers and/or microphones can provide richer sound sources to collect or present to remote or local participants.

In some embodiments, a down sampled version of a camera's dewarped, and full resolution panorama view may be provided as an 'unrolled cylinder' ribbon subscene within the composited signal provided to the videoconferencing platform. While having two or more panorama views from which to crop portrait subscenes can be beneficial, this down sampled panorama ribbon is often presented primarily as a reference for the remote viewer to understand the spatial relationship of the local participants. In some embodiments, one camera 100a or 100b can be used at a time to present the panorama ribbon, and the two or more cameras 100a or 100b can be used to select sub-views for compositing. In some embodiments, videoconferencing, directional, stereo, or polyphonic or surround sound (e.g., might be found in music reproduction) can be less important than consistent sound, so the present embodiments include techniques for merging and correcting audio inputs and outputs for uniformity and consistency.

Challenges include achieving communication enabling two tabletop 360 cameras 100a, 100b to work together, how to select subscenes from two or more panorama images in a manner that is natural, how to blend associated audio (e.g., microphone/input and speaker/output) in an effective manner, and how to ensure changes in the position of the tabletop 360 cameras are seamlessly accounted for.

Throughout this disclosure, when referring to "first" and "second" tabletop 360 cameras, or "primary" and "second-ary" tabletop 360 cameras or roles, "second" will mean "second or subsequent" and "secondary" will mean "secondary, tertiary, and so on". Details on the manner in which a third, fourth, or subsequent camera or role may communicate with or be handled by the primary camera or host computer may included in some cases, but in general a third or fourth camera or role would be added or integrated in the substantially same manner or in a routinely incremented manner to the manner in which the second camera or role is described.

As shown in FIG. 1C, in an implementation, the tabletop 360 cameras 100, 100a, 100b may include substantially identical hardware and software, and may be configured such that two or more can be used at once. In this case, a first tabletop 360 camera may take a primary or gatekeeping role (e.g., presenting itself as a conventional webcam connected by, e.g., USB, and providing conventional webcam signals) while the second and subsequent cameras may take a secondary role (e.g., communicating data and telemetry primarily to the first tabletop 360 camera, which can select and process selected data as describe from the second camera's offering).

In some embodiments, in an implementation, where the primary and secondary roles are performed by substantially similar hardware/software structures, active functions appropriate for the role may be performed by the camera while the remaining functions remain available, but are not active.

Two or More Units—Designated Views

To select an arbitrary designated view, input coordinates from the controller app overlap ranges scanned from each camera 100, 100a, 100b. The designated view DV may hop between paired cameras either manually or in response to scrolling a selection from near one camera to near another. This allows selection of an angle of view, a magnification level, and an inclination angle, and remaps selected angle from a controlling application to allow full scans of all paired tabletop 360 cameras' fields of view.

It may be noted that a tabletop 360 camera may be switched between being in the Pair or Lone/Solitary mode based on detections that are continuously monitored. For example, if line of sight is broken or broken for a predetermined period of time, each of the primary and secondary cameras may revert to solitary operation, and may re-pair using previously established credentials once coming into common line of site. In another example, if the secondary tabletop 360 is plugged into a USB port of a host computer and a videoconferencing platform begins to use or connect to the secondary tabletop 360 camera as a solitary unit, both primary and secondary cameras may revert to solitary operation, and may re-pair, again, once the secondary camera is disconnected. In each of those case, the tabletop 360 cameras may continue to monitor for the loss of the triggering 'solitary mode' event, and again pair autonomously and immediately once the trigger is no longer present.

Enabling Different Teleconferencing Clients with a Meeting Camera

FIG. 1B shows a construction in which the meeting camera 100 is associated with a computing platform at its base, including a display 12 and sufficient CPU/GPU 6, ROM/RAM 4, and USB/LAN 10 connectivity to operate a plurality of teleconferencing clients, e.g., a Zoom client, a Google Hangouts or Meet client, a Skype client, a GoToMeeting client, a Microsoft Teams client, a Cisco Webex client, among others. These clients may be browser-based or local applications on the operating system of the computing platform. The base computing platform may be unitarily formed with or physically coupled (e.g., via gravity or a locking mechanism) to the meeting camera 100.

In most cases, meeting invitations for these platforms and/or clients are shared (e.g., in calendars, in emails, in texts) as encoded URLs, a "URL string". The URL string includes the web address of the sponsoring entity, as well as a trailing suffix thereto with a recognizable syntax having sufficient information to define a date, time, access privileges, and the like for the teleconferencing meeting. When the URL is entered into a browser, local or remote code provided by the sponsoring entity in response to the URL string is executed which either instantiates a client within the browser, or hands the URL string to a local non-browser application.

The client or platform to be used is therefore encoded into the invitation as a URL string in the invitation that is sent to the meeting camera 100 serving as a meeting resource. (e.g., as illustrated by URL and Passkey in FIG. 7A) The apparatus of FIG. 1B may operate in a manner to decide which browser-based or non-browser-based client is to be activated, before the URL string is passed to the browser or interpreted by the browser. The client may autonomously activate at the time of the meeting (e.g., without the operator actively "clicking" URL to pass it to a browser.)

In this process for interacting with a teleconferencing device, the computing platform and/or meeting camera (e.g., the integrated meeting camera) may, with a localization sensor array, identify one or more bearings of interest within a panoramic view (e.g., forming a stage with one or more meeting participants). The integrated meeting camera may sub-sample the localized subscene video signals of lesser height and width than the panoramic view, and may composite a stage view including the localized subscene video signals. A webcam video signal may then be composited including a representation of the panoramic view and the stage view.

In addition or alternatively, the integrated meeting camera may receive a URL string representative of a teleconferencing meeting, and may maintain a reference database of URL syntax characteristics, each URL syntax characteristic being associated with a unique teleconferencing client of a plurality of teleconferencing clients. One URL syntax characteristic may be the sponsoring entity's triggering URL, another might be the particular format of the trailing suffix. The integrated meeting camera may parse the received URL string to extract the target URL syntax characteristic. Optionally, the meeting time and date may also be parsed from the target URL or from an associated calendar event in a calendar database within memory 4. Based on the target URL syntax characteristic, the integrated meeting camera may recall the teleconferencing client having the target URL syntax characteristic from its memory 4, and may execute the recalled teleconferencing client (e.g., upon the time and date of the associated meeting, without waiting for activation by a user). Accordingly, the URL string may be transmitted to the executed teleconferencing client to initiate the teleconferencing meeting. The webcam video signal including a representation of the panoramic view and the stage view may then be provided to the executed teleconferencing client as the local camera view.

Multi-client teleconferencing arrangement may take different forms. In one example, as noted, the "invitation" may take the form of a URL with an encoded suffix specifying at least the identity of the unique meeting. A proprietary client may receive the invitation (the encoded URL handed over by, e.g., a calendar application) and initiate a secure connection (e.g., HTTPS, port 443) to the provider's management servers (e.g., at that URL), receiving metadata describing the session (e.g., a list of candidate server addresses physically close to the invited client, meeting description and time, and the like). Information regarding the use of proxy servers or VPNs may be exchanged as well. Server addresses may correspond to "management servers" or "media routers".

A client may conduct performance testing for throughput, lag, stutter by communicating with multiple candidate management servers, and select a well-performing connection to a management server, again over port 443 (SSL). The management server will be locally connected (e.g., over a local ethernet backbone) to many candidate media routers, and will select one or more, again based on performance and load-balancing considerations, to dynamically route media traffic, apply QoS (Quality of Service) prioritization and the like. Using addressing information provided by the management server, the original proprietary client will open up a high-speed, often connectionless (e.g., UDP, port 8801) media channel to one of the candidate media routers. The management servers and media routers may be at fixed IP addresses or may provide relevant IP addressing information for clients to establish connections.

Whiteboard Notes Sharing Via, e.g., a Wireless PAN Gateway to a Meeting Camera

As described herein, an in-room whiteboard WB may be the subject of subscene attention, being targeted for cropping, distortion correction, contrast enhancement, and the like as a subscene and/or manually or automatically designated view DV. The in-room whiteboard WB is a subject for imaging by the meeting camera, and may be a conventional physical whiteboard (e.g., a white enamel board, magnetic or non-magnetic, upon which dry-erase markers are used to make "whiteboard notes," or any physical writing surface of any color or any material), or a so-called "smart-board" which is projected upon the wall or imaged upon an, e.g., internet-connected touch-capable flat-panel display FP.

In some embodiments, the conventional physical whiteboard can be more common and accessible, and can be preferred for its simplicity and familiarity. One common situation is an open office space surrounded by small huddle rooms for team meetings. These huddle rooms, because there are several or many of them, can be equipped with an affordable physical whiteboard and an affordable flat panel display rather than a smartboard. While the physical whiteboard's notes may be shared with remote participants using the meeting camera 100, 100a, or 100b as discussed herein, the streaming video of the physical whiteboard WB may not itself allow remote participants to contribute to the physical whiteboard WB. A replacement or complement to the conventional physical whiteboard WB that permits all meeting participants to contribute and share whiteboard notes is of value. It is also of value to avoid introducing complexity or cost in setup, use, administration or granting permissions.

In some embodiments, similar to the streaming whiteboard WB view, designated view DV, or independently provided, the meeting camera can be provided with a means to provide meeting participants, both local and remote, with access to a shared virtual or augmented whiteboard. Among the problems to be solved are ease of use and administration, sufficient network and access security when needed but not when unnecessary, and management of resources and bandwidth.

In some embodiments, the wide camera 2, 3 or 5 can be configured to image a wide scene and make available video streams of subscenes within the full resolution wide video, and any of these can be representative of the wide scene. For example, a down-sampled lower resolution full panorama stream would be representative of the wide scene, and may be transitioned into and/or composited into the webcam video signal as a strip along the top; and/or a sub-sampled or down-sampled portrait "window" isolating a meeting participant or physical whiteboard WB may be transitioned into and/or composited into the webcam video signal CO, onto the stage along with other subscenes, or to fill the stage. The full resolution wide video stream may be kept in different ways, e.g., as a full-resolution uncompressed scene in memory, or as a compressed scene that is only decoded in particular windows when necessary to provide the sub scenes.

A sampling processor, e.g., configured to execute upon a CPU or GPU configured to, and/or circuit(s) configured to, sample video or image signals or memory locations, may be configured to sample two or more independent subscene video streams (e.g., selected from the attendee subscene(s), manually or automatically designated view(s) DV, and/or whiteboard WB views) from the wide video stream. It should be noted that the use of CPU or GPU as terminology to describe a "processor" herein may include other circuits used for special-purpose or general processing, for example FPGA(s), DSP(s), or IP cores or integrated circuits within or separate from a CPU or GPU embodying various encoders and/or decoders (e.g., video, image, audio, object detection, face detection, lens distortion correction, dynamic range, etc.).

As described herein, a transitioning and/or compositing processor may be configured to transition subscene video streams into a composited split screen video stream, and a webcam signal processor may convert the split screen video stream into a webcam signal. A wired output, e.g., USB may transmit the webcam signal.

A wireless personal area network connection (e.g., 802.15, Bluetooth, or the like, in some cases characterized by partial meeting camera-side isolation from the public internet or local wireless IP networks) may be configured to receive whiteboard notes and a command to include whiteboard notes (e.g., in the composited split screen video stream and/or webcam video signal).

In some embodiments, whiteboard notes can be stored as vectorized paths. In one approach, freehand path-tracing input from the operator to a touch screen on a mobile device (e.g., as shown in FIG. 4C) is received via the WPAN, and converted by the meeting camera 100 to a filled area, where the perimeter of the area is recorded as a closed vector path (e.g., as "blobs"). In another approach, the path-tracing input is captured as a locus of the traced path or interconnected strokes (e.g., cubic splines, Bezier curves) of the traced path, and the locus is recorded as an open or closed vector path with an accompanying width (optionally varying along the path). These may be combined (e.g., any of the "center" set of strokes, widths along the strokes, and/or perimeter outline being recorded). In each case, the width of the path or shape of the perimeter outline may be dependent upon pressure, speed, or angle of input, and a color or texture may also be recorded with the vectorized path. Erasing may be recorded as boolean subtract operations, comparing an erase path to a prior recorded stroke paths. Timestamps may be recorded along with a stroke, path, or outline.

In some embodiments, whiteboard notes, as described herein, can be path-oriented vector paths rather than pixel or bitmap oriented. In some embodiments, vector paths or vectorized paths can be advantageous because (a) they may be recorded as changes, rather than as complete pictures, (b) the changes may be temporally-related, so as to permit undo, erase, or scrubbing (e.g., fast-forward or slower display than real-time) operations (c) they may be scaled to any resolution without degradation in quality and (d) in many cases, because paths can be defined sparsely by recording starting, ending, and curve changing nodes and a few curve-defining parameters for each stroke, they may need far less memory, transmission bandwidth, or compression processing than streaming or motion video. A vectorized path may be recorded directly as a vector path, or may be vectorized from a bitmap or pixel area of substantially uniform color and/or texture and/or luminance. Similarly, a vectorized path may be converted to a bitmap or pixel area, and the area filled with an arbitrary color, texture, luminance, pattern, or image. The conservation of computing, memory, and transmission bandwidth resources may be particularly valuable to minimize lag or rendering time if the notes as a whole (e.g., an entire session) are communicated to a client upon a mobile device.

Based upon the selection (e.g., the selection to include the virtual or augmented whiteboard notes in the e.g., in the composited split screen video stream and/or webcam video signal), the transitioning and/or compositing processor may transition and/or composite the whiteboard notes into the composited split screen video stream (e.g., which may be converted into, or packetized into, or encapsulated into/ tunneled into the webcam signal).

In one example, a panel upon the stage may contain the virtual whiteboard notes. In this instance, the meeting camera 100 receives the whiteboard notes data from the mobile device (or other) over the WPAN, as vector paths. The meeting camera 100 may then render or updates a motion video panel including a pixelized version of the vector paths. This panel may correspond in resolution and size to a subscene; to the entire stage; to the entire scene; or for other display. In addition, the meeting camera 100 may transmit the whiteboard notes on to a remote server, which may render a pixelized version of the vector paths and make this available as a standards-based video stream, as a 'cloud whiteboard' at a particular URL accessible by any permissioned browser. Alternatively the vector paths may be rendered as a vector stream or interactive media, e.g., HTML 5 or Javascript, at a particular URL, again accessible by any permissioned browser, in this case with a particular plug-in.

Figure 13:
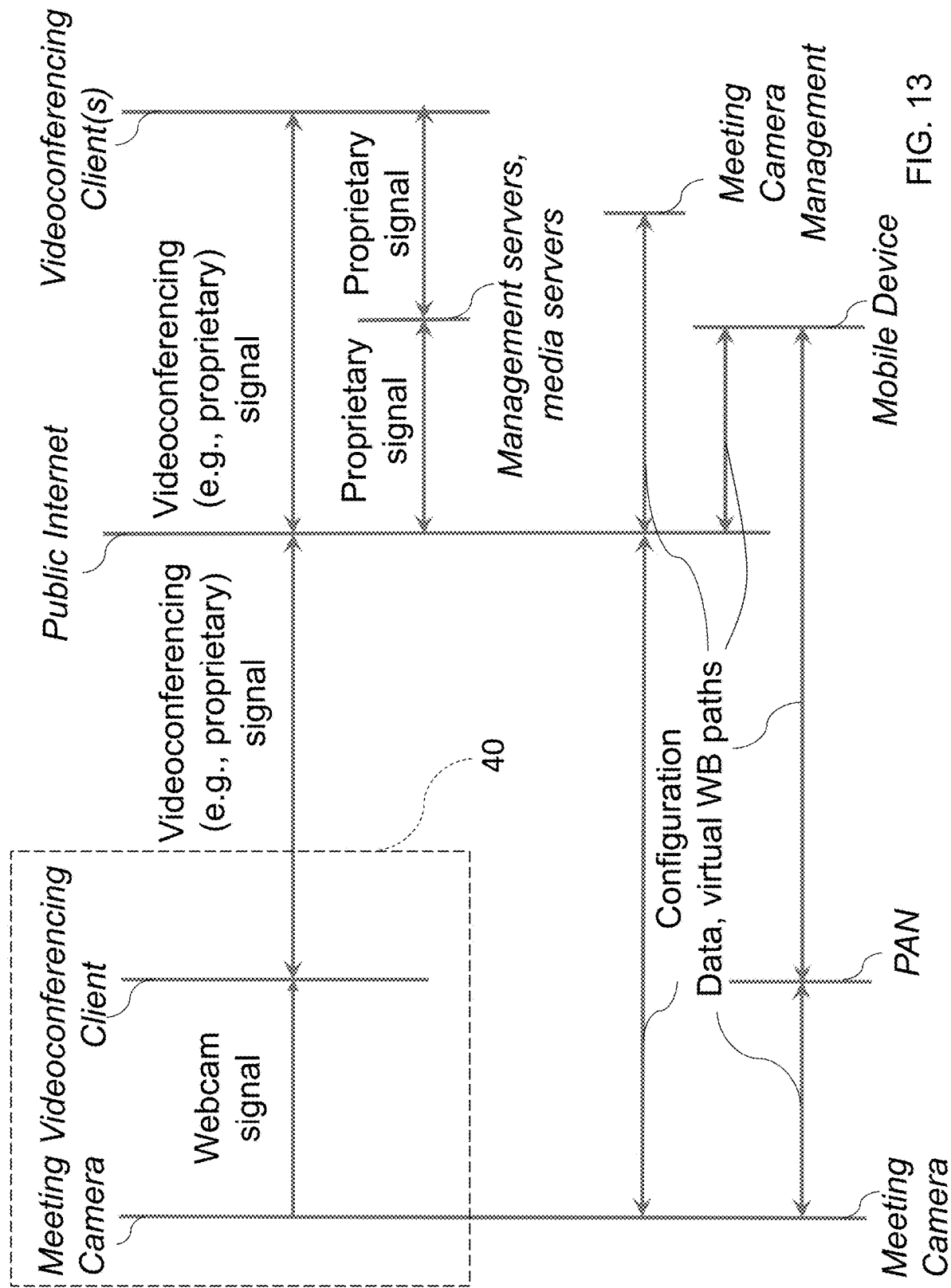
FIG. 13 shows an exemplary network interface architecture according to aspects of the disclosed subject matter.

FIG. 1D shows a simplified schematic of the device 100 and the teleconferencing device 40. For example, as shown in FIG. 1D, both the device 100 of FIG. 1A and the teleconferencing device 40 may be unitary or separate. Even if enclosed in a single, unitary housing, the wired connection (e.g., USB) providing the webcam video signal permits various video conferencing platforms to be used on the teleconferencing device 40 to be used, as the various platforms all receive the webcam video signal as an external camera (e.g., UVC). The meeting camera 100 portion of the optionally combined 100, 40 device is directly connected to the teleconferencing device 40 as a wired webcam, and may receive whiteboard notes and commands from a mobile device via a WPAN. In some embodiments, the teleconferencing device 40 can be connected to other devices, networks, servers, etc., as illustrated in FIG. 13.

While many mobile devices include multiple network interfaces, these are roughly divided into internet-capable and internet-denied networks. Internet capable may include the cellular telephone interfaces, which connect to several cellular networks, many of which may tunnel or carry IP signals to and from the public internet, as well as WiFi, which connect to several types of WLAN, each of which may tunnel or carry IP signals to the public internet. Internet denied may include wireless personal area networks (PANs) or WPAN or NFC, which might not include internet capability.

In some embodiments, there can be exceptions to these definitions, and there may be bridged and/or tunneled IP traffic between and among network interfaces and networks, although this might not be a default capability and may be blocked in some consumer or business operating systems. A division between internet capable and internet denied networks may be useful for security and user convenience. For example, if the WPAN or NFC networks may not reach the public internet at all, then they are less vulnerable to third party spoofing or intrusion. This can be an advantage of short range, line-of-sight, and other non-IP and internet denied networks—they may be used to verify identity or access privileges for long range and internet networks.

In the context of the present disclosure, the use of the internet denied wireless PAN restricts control of the meeting camera and adding meeting information (e.g., whiteboard notes) to those in the near vicinity of the meeting camera. This can be sufficient for many purposes—in a business or educational context, many meeting participants are eligible for control, and little harm is done by a presumptively authorized nearby colleague or student connecting to control the meeting camera. Mechanisms of "internet denial" are various, but one form is to prevent or not provide IP transport capability to that wireless network interface on the meeting camera side, whether or not a connected mobile device may bridge the WPAN and IP networks. For example, with respect to Bluetooth, a relevant profile capability defines data, messages, and packet types and formats that may be exchanged. Bluetooth profiles define possible applications and specify general behaviors that Bluetooth-enabled devices use to communicate with other Bluetooth devices. If the meeting camera does not include an enabling combination of IP transport capable or IP necessary profiles or protocols in the host stack, it will not respond to or create a connection with a mobile device that does. Alternatively, even if the profiles and protocols are available, if they are not permissioned or configured to work with one another to provide IP services, the meeting camera will not permit internet connection over Bluetooth to a connected mobile device. If the meeting camera implements no internet gateway available to the mobile device, or does not permit access to the mobile device, HTTP and IP operations do not take place.

In some embodiments, the meeting camera system may, from the wide or panoramic camera image and video stream, composite a dynamic split screen including a stage that has the capability of (e.g., preferably localization-dependent, e.g., wipe) transitioning subject views depending on speaker and attendee activity. The wired (e.g., USB connection) can be configured to carry the dynamic split screen as a standard webcam signal. A PC receiving the webcam signal may be separate from or unitary with the meeting camera system. Local control with the meeting camera may include communicating over a WPAN (e.g., Bluetooth) connection that receives whiteboard notes from an app on a mobile device, and also receives an instruction via that app to composite those notes into the dynamic split screen.

Figure 14:
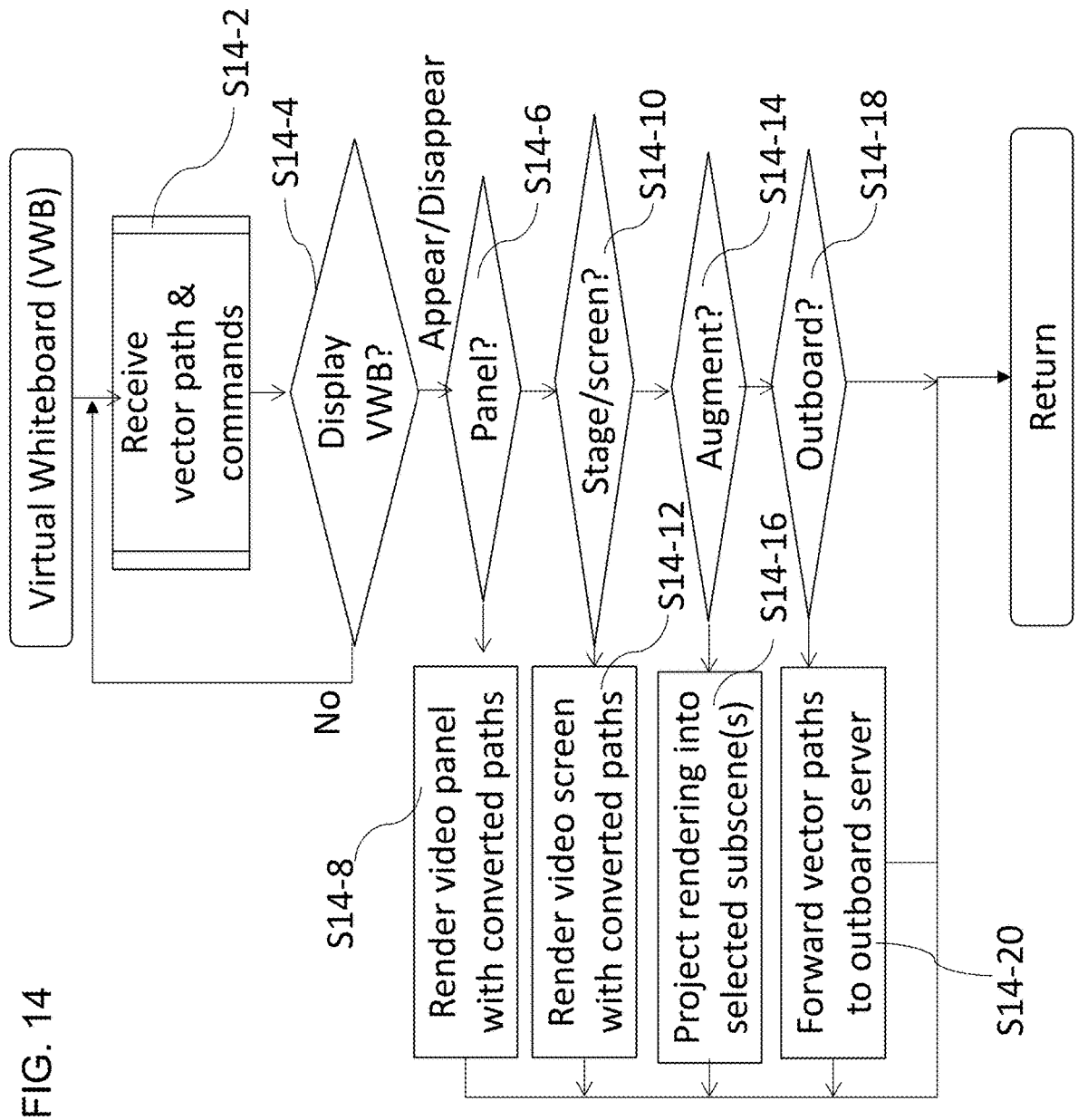
FIG. 14 shows an exemplary process for using a virtual whiteboard according to aspects of the disclosed subject matter.

FIG. 14 shows one exemplary method for managing the virtual whiteboard for the meeting camera and its local and remote connections. A wide scene may be imaged, and a wide video stream representative of the wide scene may be output. Two or more independent video streams may be sampled from the wide video stream. Subscene video streams may be transitioned and/or composited into a composited split screen video stream. The composited split screen video stream may be converted into a webcam signal, and the webcam signal transmit over a wired output. Whiteboard notes and/or commands to display the whiteboard notes may be received via the WPAN, and based upon the commands, the whiteboard notes may be transitioned or composited into the composited split screen video stream (and, e.g., webcam signal).

In step S14-2, the meeting camera 100 receives the current set of whiteboard notes, or updates to the set, of vector paths via the WPAN, from a local mobile device. In addition, commands for handling the whiteboard notes may be received. The current whiteboard notes may include a null payload for vector path data if no notes have yet been recorded when a command for displaying the whiteboard notes is received, in which case, a blank virtual whiteboard may be displayed, awaiting the first notes data. Updates to the set may also be a null payload if no changes have been made since the last receipt.

The set of whiteboard notes or changes are matched, with either the mobile client or the meeting camera's set being the master set, depending on preference. By default, the meeting camera's set may be default. If another local mobile device is paired with the meeting camera, and wishes to make notes, then the new local mobile device may take over the privilege 'conch' to add notes or make changes in notes to the master set upon the meeting camera 100. These notes may also have been downloaded to the mobile device in background, but without the permission to change them. Without enabling fully parallel access to the master set, the use of vector paths and changes in vector paths in uploading and downloading the latest state of the notes may make the process of changing the privilege over note-making fast and lag-free. Similarly, if remote participants elect to take over the privilege to make notes, whiteboard notes uploaded to the public internet via, e.g., wifi provided to the meeting camera 100, may be downloaded at the point of privilege transfer or in background awaiting privilege transfer. Again, the use of vector paths may make this amount of data very small and fast to exchange.

In step S14-4, if a command to display the virtual whiteboard notes (or e.g., a command instructing which forms of display or parameters for display) is received by the meeting camera (e.g., over the WPAN from the mobile device), the meeting camera 100 may proceed to display or update the manner of display of the whiteboard notes. As shown, if no command to display is received, the vector paths, current or updated, may nonetheless be received and stored pending an instruction to display them. The display-virtual-whiteboard command received in step S14-4 may be received via the WPAN, and/or from a button, switch, or sensor (not shown) upon the meeting camera 100, 100a, 100b.

Each of the following cases S14-6 through S14-20 may be displayed, independent of one another, unless there is a conflict. In addition, the display of the virtual whiteboard notes does not preclude the display of the local physical whiteboard WB, but may, depending on the selection, be used beside, instead of, or augmented into a display of the physical whiteboard WB as shown in FIG. 4C.

In step S14-6, the meeting camera 100 determines that a panel upon the stage is to be displayed including the whiteboard notes, e.g., converted from vector paths to a filled pixel areas video stream proportioned as a panel of less than screen width (e.g., color filled strokes or blobs upon a, e.g., white background, as determined by the recorded vectorized paths, widths, etc.) step S14-8. The display proportion of the panel may be set to, e.g., the same or similar to a subscene, or substantially ⅓ to ⅔ of the width of the entire webcam signal. The transitioning and/or compositing of the filled pixel area video stream (panel) may be handled by the staging system as a panel with a speaker, e.g., the virtual whiteboard panel is transitioned onto the stage in the same manner as a new speaker. In this manner, e.g., the display of the virtual whiteboard may correspond to the appearance of FIG. 4B, but the area noted as DV, instead of displaying a sub scene from the wide camera, displays a rendered video stream from the virtual whiteboard notes.

Figure 15A:
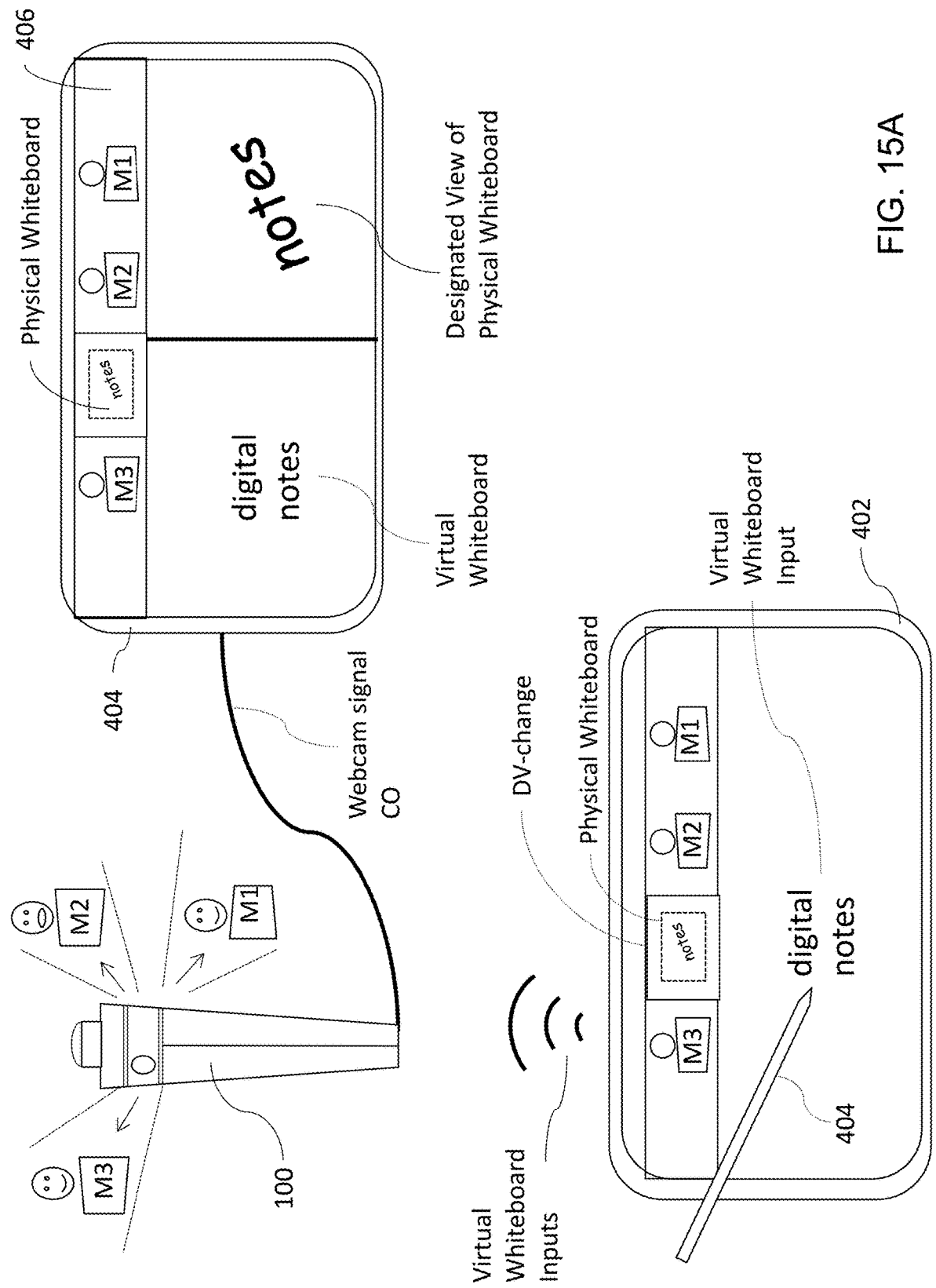
FIGS. 15A-15B show exemplary schematic views of composited signal CO by the devices 100 according to aspects of the disclosed subject matter.
Figure 15B:
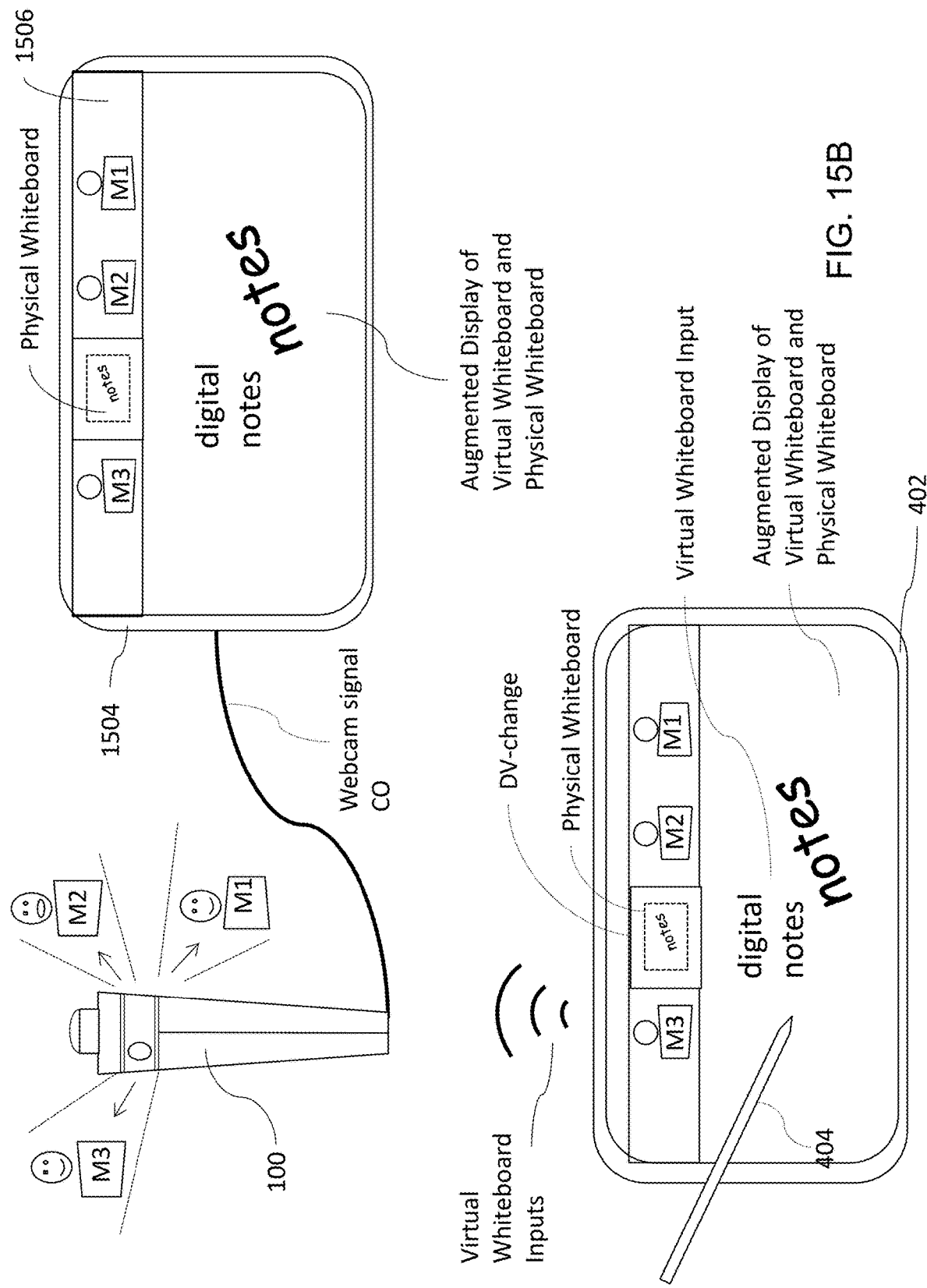

In some embodiments, as shown in FIG. 15A, the DV and/or physical whiteboard WB subscene can be displayed beside the virtual whiteboard notes. FIG. 15A's descriptions are similar or analogous to FIG. 4C. In another embodiment, the DV and/or physical whiteboard WB subscene can be displayed instead of the virtual whiteboard notes. In another embodiment, as shown in FIG. 15B, the DV and/or physical whiteboard WB subscene can be augmented or superimposed into the display of the virtual whiteboard notes. In some embodiments, a local mobile device 402 connected to the meeting camera 100 can be configured to display the augmented whiteboard (e.g., augmented display of virtual whiteboard and physical whiteboard). The local mobile device 402 can also be configured to provide an input (e.g., virtual whiteboard input of "digital notes") to an augmented whiteboard, for example, using a writing device 404 (e.g., stylus, finger, etc.). In some embodiments, the webcam video signal CO in FIG. 15B can generate a composited video 1504, which can be displayed, for example, by a host computer 40, remote client 50, etc. For example, the composited video 1504 shows the panorama view 1506 with the participants M1, M2, and M3, and the physical whiteboard WB. For example, the composited video 1504 also shows the stage view with augmented display of the virtual whiteboard and the physical whiteboard (e.g., designated view DV of the physical whiteboard WB augmented or superimposed with the virtual whiteboard input). For example, the composited video 1504 shows augmented display of the virtual whiteboard and the physical whiteboard where the physical whiteboard WB's writing "notes" is augmented or superimposed with the virtual whiteboard input "digital notes."

Figure 15C:
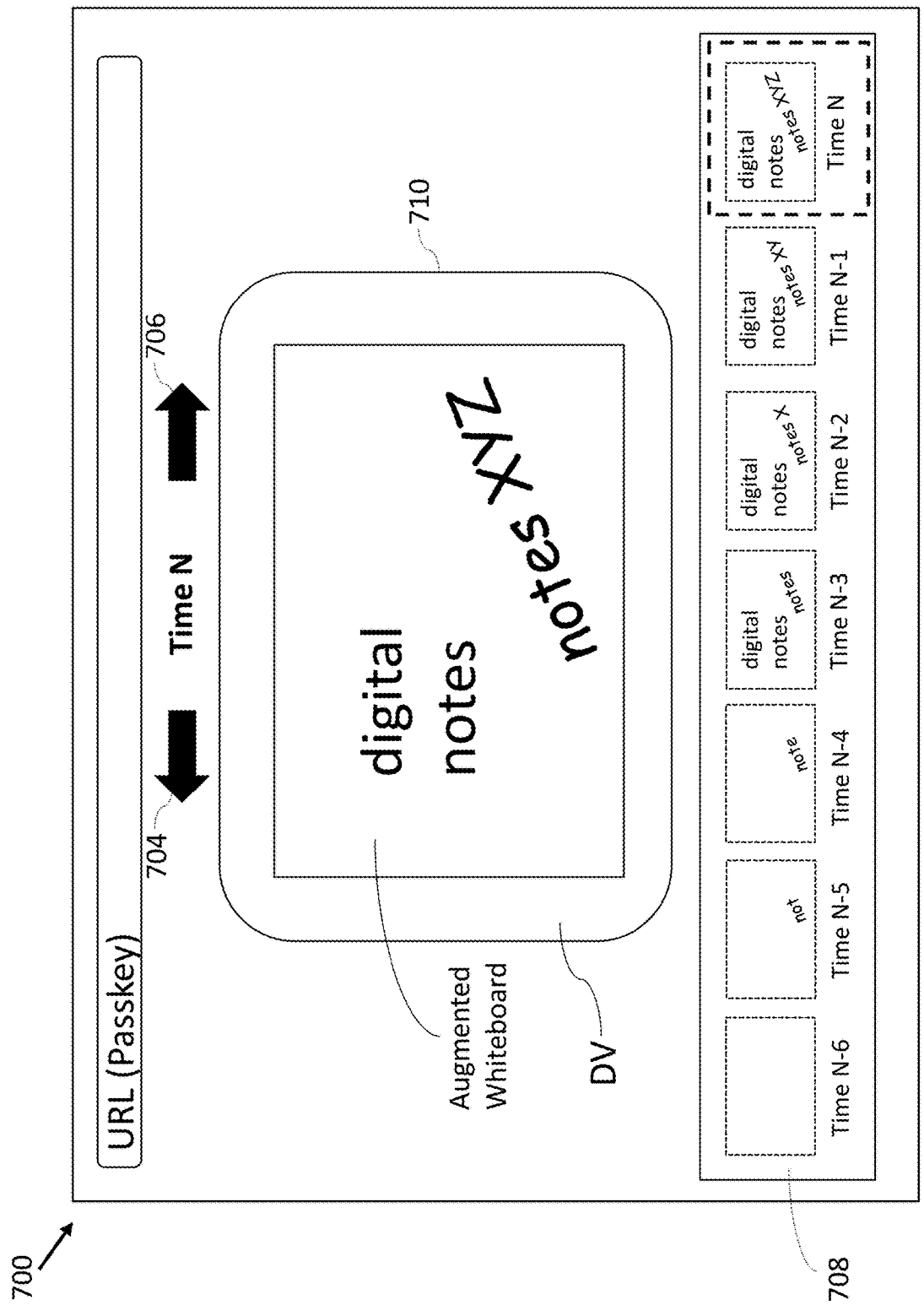
FIG. 15C shows an exemplary server website layout according to aspects of the disclosed subject matter.

In some embodiments, the meeting camera 100 can be configured to record the augmented whiteboard as a still image and save the image to an archive (e.g., in a remote server or any local storage device). For example, FIG. 15C shows exemplary server 700 storing and showing a series (e.g., time n−6, time n−5, time n−4, time n−3, time n−2, time n−1, and time n) of the window images of the augmented whiteboard (e.g., augmented display of virtual whiteboard and physical whiteboard). FIG. 15C's descriptions are similar or analogous to FIG. 7B. For example, FIG. 7B shows a server with a series of dynamically updated and processed images of physical whiteboard, and FIG. 15C shows a series of dynamically updated and processed images of physical whiteboard augmented with digital whiteboard. For example, in FIG. 15C at time n−6, the augmented whiteboard had no writing. For example, in time n−5, the augmented whiteboard had physical whiteboard writing that states "not." For example, in time n−4, the augmented whiteboard had physical whiteboard writing that states "note." For example, in time n−3, the augmented whiteboard had physical whiteboard writing that states "notes," which was augmented with the digital whiteboard input that states "digital notes." For example, in time n−2, the augmented whiteboard had physical whiteboard writing that states "notes X," which was augmented with the digital whiteboard input that states "digital notes." For example, in time n−1, the augmented whiteboard had physical whiteboard writing that states "notes XY," which was augmented with the digital whiteboard input that states "digital notes." For example, in time n, the augmented whiteboard shows physical whiteboard writing that states "notes XYZ," which is augmented with the digital whiteboard input that states "digital notes."

Turning to FIG. 14, in step S14-10, the meeting camera 100 determines that, e.g., stage is to be replaced with the whiteboard notes, e.g., converted from vector paths to a filled pixel areas video stream proportioned at screen width, S14-12. The display proportion of the whiteboard notes may be set to, e.g., substantially the width of the entire webcam signal. This option may not be performed at the same time as the rendered panels. In one variation, the previously rendered subscenes of certain attendees may be reduced in size and rendered picture-in-picture upon the screen-width virtual whiteboard notes.

In both of these cases, the display area of the virtual whiteboard panel or video screen may be smaller than the corresponding recorded whiteboard notes area, e.g., the whiteboard notes may be progressively recorded on a virtual area extending to the left and right as new notes are recorded (e.g., beginning with a 2×1 aspect ratio akin to a physical whiteboard, but growing to, e.g., a 10×1~20×1 aspect ratio as new notes are recorded), but the displayed panel or screen is a sliding and/or zoomable window over the entire width of the recorded whiteboard notes.

The panel may be treated by the staging system as a panel with a speaker, e.g., the virtual whiteboard panel is transitioned onto the stage in the same manner as a new speaker. In this manner, e.g., the display of the virtual whiteboard may correspond to the appearance of FIGS. 5A and 5B, but the area noted as DV, instead of displaying a subscene from the wide camera, displays a rendered video stream from the virtual whiteboard notes. As noted, the DV and/or physical whiteboard WB subscene may also or alternatively be displayed beside the virtual whiteboard notes.

In step S14-14, the meeting camera 100 determines that one or more subscenes are to be augmented with the whiteboard notes, e.g., converted from vector paths to filled pixel areas that are combined with existing video stream (e.g., subscene and/or panorama) as an augmented reality display, S14-16. The whiteboard notes may be projected according to system parameters, e.g., according to coordinates and frames of reference to appear in-scene at positions within the scene. For example, a blank wall space or other homogenous color area in the scene may be designated (e.g., using the manually designated view process), and the whiteboard notes projected within the scene as filled pixel area video projected upon the blank wall space as it appears in, e.g., the panorama and/or any subscene that includes the blank wall space. In this manner, the content of the virtual whiteboard may be more memorable, familiar, or interactive/interesting. If more than one virtual whiteboard is used, the projections within scene of different virtual whiteboards may be used as a reference to select an active one, or to select a segment of interest within an elongated whiteboard.

In step S14-18, the meeting camera 100 determines that the whiteboard notes, e.g., are to be made accessible to meeting participants via an external server, and transmits the whiteboard notes to a meeting server or other server, which may render the whiteboard notes as a display and local and remote meeting participants may access via URL, browser, or other client, S14-20. The routine then returns and repeats, updating displays and content each time.

As noted, optionally the whiteboard notes are received as a vectorized paths, and the transitioning and/or compositing processor rasterizes the whiteboard notes from the vectorized paths to a video stream in order to composite the whiteboard notes composited split screen video stream. Further optionally, a transitioning and/or compositing processor may composite the whiteboard notes as a subsequent independent subscene video stream, and the transitioning and/or compositing processor may be configured to transition the subsequent independent video stream into the composited split screen video stream alongside one of the independent subscene video streams.

Still further optionally, the transitioning and/or compositing processor may composite the whiteboard notes as a subsequent independent subscene video stream, and the transitioning and/or compositing processor may be configured to transition the subsequent independent video stream into the composited split screen video stream in place of two or more of the independent subscene video streams. Additionally, or in the alternative, the transitioning and/or compositing processor may composite the whiteboard notes as an augmented reality video stream, and the transitioning and/or compositing processor may be configured to augment the whiteboard notes into the composited split screen video stream projected into one or more of the independent subscene video streams.

A wireless personal area network ("WPAN") is a preferably a device discoverable, ad-hoc connected, bidirectional, relatively short-range network (less than substantially 500 m, preferably less than 30 m) having relatively low bandwidth (less than substantially 10 Mbps), in which setup and administration is simple for the end user. Each WPAN device preferably has a unique address. Example standards suitable for the WPAN would be 802.15, Bluetooth, and even IrDA. While the increasing range and bandwidth of WPAN technologies may blur the line between WPAN (e.g., 802.15) and WLAN (e.g., 802.11) implementations, for the purposes of the present disclosure, a unicast WPAN connection is not defined by range or bandwidth. Instead, the unicast WPAN connection is completed after a meeting camera having a unique ID is discovered upon the WPAN and a direct, unicast, bidirectional WPAN connection is confirmed between the mobile device and the meeting camera having that unique ID.

The WPAN may use a "pairing" technique between the meeting camera and a mobile device of limited range, with proximate (e.g., 30m or less) or substantial line of sight pairing, and with optional passkey or out-of-band (e.g., NFC) confirmation if additional security is selected. For example, Bluetooth devices can be paired with Secure Simple Pairing via several modes, including with and without security (e.g., passkey, number confirmation, or out-of-band confirmation).

In the case of the designated view DV for locking upon a desired speaker or whiteboard, minimum security (e.g., pairing based on short-range RF connectivity) may be sufficient. If minimum security is used, the paired mobile user may move the DV field of view, but may not alter or view/listen to any video or audio handled by the meeting camera. The mobile user may only pair to one meeting camera at a time (even if several are in range), although another local mobile user may supersede the prior pairing. In some cases, the convenience of no-passkey pairing can be more useful than the minimal danger of spoofed instructions for the DV, and contention for control of the DV can be handled by straightforward courtesy among users.

In the case of a shared virtual whiteboard, pairing may use a personal area security check (e.g., a passkey provided by the meeting camera to the connecting mobile device, or out-of-band proximity confirmation via NFC or illumination between the meeting camera and connecting mobile device). This added security may be desirable when potentially confidential information (e.g., whiteboard notes) is to be provided by the mobile device to meeting camera and then to the conferencing client. Once personal area based pairing is achieved, the host meeting camera may initiate encrypted, and/or connection-oriented communication (e.g., link-layer encryption, error checking) with the mobile device to receive the whiteboard notes, etc. Application-level security and/or encryption may be used instead of, or in addition to link-layer security.

In the present disclosure, "wide angle camera" and "wide scene" is dependent on the field of view and distance from subject, and is inclusive of any camera having a field of view sufficiently wide to capture, at a meeting, two different persons that are not shoulder-to-shoulder.

"Field of view" is the horizontal field of view of a camera, unless vertical field of view is specified. As used herein, "scene" means an image of a scene (either still or motion) captured by a camera. Generally, although not without exception, a panoramic "scene" SC is one of the largest images or video streams or signals handled by the system, whether that signal is captured by a single camera or stitched from multiple cameras. The most commonly referred to scenes "SC" referred to herein include a scene SC which is a panoramic scene SC captured by a camera coupled to a fisheye lens, a camera coupled to a panoramic optic, or an equiangular distribution of overlapping cameras. Panoramic optics may substantially directly provide a panoramic scene to an camera; in the case of a fisheye lens, the panoramic scene SC may be a horizon band in which the perimeter or horizon band of the fisheye view has been isolated and dewarped into a long, high aspect ratio rectangular image; and in the case of overlapping cameras, the panoramic scene may be stitched and cropped (and potentially dewarped) from the individual overlapping views. "Sub-scene" means a sub-portion of a scene, e.g., a contiguous and usually rectangular block of pixels smaller than the entire scene. A panoramic scene may be cropped to less than 360 degrees and still be referred to as the overall scene SC within which sub-scenes are handled.

As used herein, an "aspect ratio" is discussed as a H:V horizontal:vertical ratio, where a "greater" aspect ratio increases the horizontal proportion with respect to the vertical (wide and short). An aspect ratio of greater than 1:1 (e.g., 1.1:1, 2:1, 10:1) is considered "landscape-form", and for the purposes of this disclosure, an aspect of equal to or less than 1:1 is considered "portrait-form" (e.g., 1:1.1, 1:2, 1:3).

A "single camera" video signal may be formatted as a video signal corresponding to one camera, e.g., such as UVC, also known as "USB Device Class Definition for Video Devices" 1.1 or 1.5 by the USB Implementers Forum, each herein incorporated by reference in its entirety (see, e.g., http://www.usb.org/developers/docs/devclass docs/ USB_Video_Class_1_5.zip or USB_Video_Class_1_1_090711.zip at the same URL). Any of the signals discussed within UVC may be a "single camera video signal," whether or not the signal is transported, carried, transmitted or tunneled via USB. For the purposes of this disclosure, the "webcam" or desktop video camera may or may not include the minimum capabilities and characteristics necessary for a streaming device to comply with the USB Video Class specification. USB-compliant devices are an example of a non-proprietary, standards-based and generic peripheral interface that accepts video streaming data. In one or more cases, the webcam may send streaming video and/or audio data and receive instructions via a webcam communication protocol having payload and header specifications (e.g., UVC), and this webcam communication protocol is further packaged into the peripheral communications protocol (e.g. UBC) having its own payload and header specifications.

A "display" means any direct display screen or projected display. A "camera" means a digital imager, which may be a CCD or CMOS camera, a thermal imaging camera, or an RGBD depth or time-of-flight camera. The camera may be a virtual camera formed by two or more stitched camera views, and/or of wide aspect, panoramic, wide angle, fisheye, or catadioptric perspective.

A "participant" is a person, device, or location connected to the group videoconferencing session and displaying a view from a web camera; while in most cases an "attendee" is a participant, but is also within the same room as a meeting camera 100. A "speaker" is an attendee who is speaking or has spoken recently enough for the meeting camera 100 or related remote server to identify him or her; but in some descriptions may also be a participant who is speaking or has spoken recently enough for the videoconferencing client or related remote server to identify him or her.

"Compositing" in general means digital compositing, e.g., digitally assembling multiple video signals (and/or images or other media objects) to make a final video signal, including techniques such as alpha compositing and blending, anti-aliasing, node-based compositing, keyframing, layer-based compositing, nesting compositions or comps, deep image compositing (using color, opacity, and depth using deep data, whether function-based or sample-based). Compositing is an ongoing process including motion and/or animation of sub-scenes each containing video streams, e.g., different frames, windows, and subscenes in an overall stage scene may each display a different ongoing video stream as they are moved, transitioned, blended or otherwise composited as an overall stage scene. Compositing as used herein may use a compositing window manager with one or more off-screen buffers for one or more windows or a stacking window manager. Any off-screen buffer or display memory content may be double or triple buffered or otherwise buffered. Compositing may also include processing on either or both of buffered or display memory windows, such as applying 2D and 3D animated effects, blending, fading, scaling, zooming, rotation, duplication, bending, contortion, shuffling, blurring, adding drop shadows, glows, previews, and animation. It may include applying these to vector-oriented graphical elements or pixel or voxel-oriented graphical elements. Compositing may include rendering pop-up previews upon touch, mouse-over, hover or click, window switching by rearranging several windows against a background to permit selection by touch, mouse-over, hover, or click, as well as flip switching, cover switching, ring switching, Expose switching, and the like. As discussed herein, various visual transitions may be used on the stage—fading, sliding, growing or shrinking, as well as combinations of these. "Transition" as used herein includes the necessary compositing steps.

A 'virtual tabletop 360' panoramic meeting 'web camera' may have a panoramic camera as well as complementary 360 degree microphones and speakers. The tabletop 360 camera is placed roughly in the middle of a small meeting, and connects to a videoconferencing platform such as Zoom, Google Hangouts, Skype, Microsoft Teams, Cisco Webex, or the like via a participant's computer or its own computer. Alternatively, the camera may be inverted and hung from the ceiling, with the picture inverted. "Tabletop" as used herein includes inverted, hung, and ceiling uses, even when neither a table nor tabletop is used.

"Camera" as used herein may have different meanings, depending upon context. A "camera" as discussed may just be a camera module—a combination of imaging elements (lenses, mirrors, apertures) and an image sensor (CCD, CMOS, or other), which delivers a raw bitmap. In some embodiments, "camera" may also mean the combination of imaging elements, image sensor, image signal processor, camera interface, image front end ("IFE"), camera processor, with image processing engines ("IPEs"), which delivers a processed bitmap as a signal. In another embodiments, "camera" may also mean the same elements but with the addition of an image or video encoder, that delivers an encoded image and/or video and/or audio and/or RGBD signal. Even further, "camera" may mean an entire physical unit with its external interfaces, handles, batteries, case, plugs, or the like. "Video signal" as used herein may have different meanings, depending upon context. The signal may include only sequential image frames, or image frames plus corresponding audio content, or multimedia content. In some cases the signal will be a multimedia signal or an encoded multimedia signal. A "webcam signal" will have a meaning depending on context, but in many cases will mean a UVC 1.5 compliant signal that will be received by an operating system as representing the USB-formatted content provided by a webcam plugged into the device using the operating system, e.g., a signal formatted according to one or more "USB Video Class" specifications promulgated by the USB Implementers Forum (USB-IF). See, e.g., https://en.wikipedia.org/wiki/USB video device class and/or https://www.usb.org/sites/default/files/USB_Video_Class_1_5.zip, hereby incorporated by reference in their entireties. For example, different operating systems include implementations of UVC drivers or gadget drivers. In all cases, the meaning within context would be understood by one of skill in the art.

The steps of a method or algorithm described in connection with the embodiments disclosed herein may be embodied directly in hardware, in a software module executed by a processor, or in a combination of the two. A software module may reside in one or more RAM memory, flash memory, ROM memory, EPROM memory, EEPROM memory, registers, hard disk, a removable disk, a CD-ROM, or another form of computer-readable storage medium. An exemplary storage medium may be coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

All of the processes described above may be embodied in, and fully automated via, software code modules executed by one or more general purpose or special purpose computers or processors. The code modules may be stored on one or more of any type of computer-readable medium or other computer storage device or collection of storage devices. Some or all of the methods may alternatively be embodied in specialized computer hardware.

All of the methods and tasks described herein may be performed and fully automated by a computer system. The computer system may, in some cases, include single or multiple distinct computers or computing devices (e.g., physical servers, workstations, storage arrays, etc.) that may communicate and interoperate over a network to perform the described functions. Each such computing device typically includes a processor (or multiple processors or circuitry or collection of circuits, e.g. a module) that executes program instructions or modules stored in a memory or other non-transitory computer-readable storage medium. The various functions disclosed herein may be embodied in such program instructions, although some or all of the disclosed functions may alternatively be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state. Specifically, any of the functions of manipulating or processing audio or video information described as being performed by meeting camera 100, 100a, and/or 100b can be performed by other hardware computing devices.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A system for imaging a panorama view including a physical writing surface, the system comprising:
    a camera configured to capture the panorama view with a horizontal angle greater than 140 degrees;
    a sensor configured to identify a bearing of interest within the panorama view;
    a processor; and
    a memory storing computer-readable instructions that, when executed, cause the processor to:
        maintain a coordinate map of the panorama view,
        adjust an aspect ratio of the panorama view captured by the camera,
        generate a scaled panorama view signal based on the adjusted aspect ratio of the panorama view,
        sub-sample a localized subscene video signal based on the panorama view along the bearing of interest,
        generate a stage view signal based on the localized subscene video signal,
        determine a coordinate instruction associated with the coordinate map of the panorama view,
        determine a coordinate of a designated view based on the coordinate instruction,
        generate a designated view signal based on the determined coordinate of the designated view, the determined coordinates of the designated view comprising at least a portion of the physical writing surface,
        composite a video signal including one or more of the scaled panorama view signal, the stage view signal, or the designated view signal, and
        transmit, to a host computer, the composite video signal.

2. The system according to claim 1,
    wherein the camera is configured to capture the panorama view with a horizontal angle of 360 degrees; and
    wherein the system is configured to receive, from a second camera, a designated view video of the physical writing surface, the designated view video based on the coordinate of the designated view.

3. The system according to claim 2, wherein the computer-readable instructions cause the processor to:
    determine a first location of a first tag attached to the physical writing surface,
    determine a second location of a second tag attached to the physical writing surface, and
    determine the coordinate instruction of the designated view based on the first location of the first tag attached to the physical writing surface and the second location of the second tag attached to the physical writing surface.

4. The system according to claim 1, wherein the computer-readable instructions cause the processor to:
    determine, in the coordinate map and based on an image from a second camera, a location of a first tag corresponding to a first designated view trigger or a location of a second tag corresponding to a second designated view trigger, and
    based on determining, in the coordinate map, the location of the first tag or the location of the second tag, determine the coordinate instruction associated with the coordinate map of the panorama view.

5. The system according to claim 4, wherein the computer-readable instructions cause the processor to, responsive to the first designated view trigger or the second designated view trigger:
    detect an instruction to calibrate and denoise the designated view signal;
    calibrate the designated view signal by adjusting at least one of brightness, contrast, or gamma; and
    decrease a noise in the designated view signal by decreasing a frame rate of the designated view signal and averaging two or more image frames in the designated view signal.

6. The system according to claim 4, wherein the computer-readable instructions cause the processor to, responsive to the first designated view trigger or the second designated view trigger:
    detect an instruction to filter an object in the designated view, the object located in between the second camera and the physical writing surface;
    detect, in the designated view signal, a first set of digital image pixels corresponding to the blocking object; and
    convert the first set digital image pixels to a second set of translucent digital image pixels by performing a morphological erosion operation and a morphological dilation operation on the first set of digital image pixels.

7. The system according to claim 1, wherein the computer-readable instructions cause the processor to:
generate, based on a digital writing input, a digital writing signal;
generate the composite video signal including one or more of the scaled panorama view signal, the stage view signal, the designated view signal, or the digital writing signal.

8. The system according to claim 1, wherein the computer-readable instructions cause the processor to:
generate, based on a digital writing input, a digital writing signal;
generate, based on the digital writing signal and the designated view signal, an augmented signal by superimposing the digital writing input and the designated view;
generate the composite video signal including one or more of the scaled panorama view signal, the stage view signal, or the augmented signal.

9. The system according to claim 1, wherein the computer-readable instructions cause the processor to:
generate the designated view signal as a subscene of lesser height and lesser width than the panorama view.

10. The system according to claim 1, wherein the received coordinate instruction includes a direction of movement of the coordinate of the designated view, and
wherein the computer-readable instructions cause the processor to:
change the designated view signal responsive to the direction of movement of the coordinate of the designated view, and
periodically update the composite video signal to show the changed designated view signal.

11. The system according to claim 1, wherein the computer-readable instructions cause the processor to:
receive an instruction to change a magnification of the designated view,
change the designated view in accordance with the instruction to change the magnification of the designated view, and
update the composite video signal to reflect the changed magnification of the designated view.

12. The system according to claim 2, wherein a distance between the second camera and the physical writing surface is greater than a minimum threshold distance, and the distance is less than a maximum threshold distance.

13. The system according to claim 1, comprising:
a wired communication interface; and
a wireless communication interface.

14. The system according to claim 1, wherein the computer-readable instructions cause the processor to:
generate, based on a width of the composite video signal, the scaled panorama view signal as a reduced magnification of the panorama view.

15. The system according to claim 1, wherein the computer-readable instructions cause the processor to:
use temporal video denoising to decrease noise in the designated view signal.

16. The system of claim 1, wherein the sensor includes an acoustic array having at least two microphones and configured to be used to compare signals from each of the at least two microphones with one another to identify the bearing of interest.

17. The system of claim 1, wherein the computer-readable instructions cause the processor to identify one or more of motion or a human face to identify the bearing of interest.

18. The system of claim 1, wherein the coordinate instruction includes a change in appearance of a manually designated view, and the computer-readable instructions cause the processor to change the manually designated view in real time in accordance with the change in appearance, and continuously update the designated view signal to show the real-time change in appearance of the manually designated view.

19. The system of claim 1, wherein the computer-readable instructions cause the processor to process the designated view signal with spatial noise reduction in one or more of portions of the designated view signal before compositing the designated view signal.

20. The system of claim 1, wherein the computer-readable instructions cause the processor to use temporal video separately in chroma and luma channels to decrease noise before compositing the designated view signal.

21. The system of claim 1, wherein the computer-readable instructions cause the processor to use temporal video denoising without motion compensation in areas of the designated view signal having a textural contrast level lower than a predetermined threshold to decrease noise before compositing the designated view signal.

22. The system of claim 1, wherein the computer-readable instructions cause the processor to:
receive a digital writing input as a vectorized path; and
generate the composite video signal based on rasterizing the digital writing input from the vectorized path to a video stream to composite the digital input in a composited split screen video stream.

23. The system of claim 1, wherein the computer-readable instructions cause the processor to:
receive a digital writing input as a vectorized path; and
generate the composite video signal as a subsequent independent subscene video stream, wherein the subsequent independent video stream is transitioned into a composited split screen video stream alongside the stage view signal.

24. The system of claim 1, wherein the computer-readable instructions cause the processor to:
receive a digital writing input as a vectorized path; and
generate the composite video signal as an augmented reality video stream and augment the digital writing input into a composited split screen video stream projected into the stage view signal.

25. The system of claim 1, wherein the computer-readable instructions cause the processor to:
receive a digital writing input as a vectorized path; and
generate the composite video signal based on sampling a subsequent independent subscene video stream from the panorama view and transition the subsequent independent video stream into a composited split screen video stream alongside the stage view signal.

26. A method of imaging a panorama view including a physical writing surface, the method comprising:
capturing the panorama view with a horizontal angle greater than 140 degrees;
identifying a bearing of interest within the panorama view;
maintaining a coordinate map of the panorama view;
adjusting an aspect ratio of the captured panorama view;
generating a scaled panorama view signal based on the adjusted aspect ratio of the panorama view;
sub-sampling a localized subscene video signal based on the panorama view along the bearing of interest;
generating a stage view signal based on the localized subscene video signal;

determining a coordinate instruction associated with the coordinate map of the panorama view;

determining a coordinate of a designated view based on the coordinate instruction;

generating a designated view signal based on the determined coordinate of the designated view, the determined coordinates of the designated view comprising at least a portion of the physical writing surface;

compositing a video signal including one or more of the scaled panorama view signal, the stage view signal, or the designated view signal; and transmitting, to a host computer, the composite video signal.

27. The method according to claim 26, wherein the panorama view is captured with a horizontal angle of 360 degrees, and the method further comprising:

receiving a designated view video of the physical writing surface from a source different from a source of the panorama view, the designated view video based on the coordinate of the designated view.

28. The method according to claim 27, further comprising:

determining a first location of a first tag attached to the physical writing surface;

determining a second location of a second tag attached to the physical writing surface; and determining the coordinate instruction of the designated view based on the first location of the first tag attached to the physical writing surface and the second location of the second tag attached to the physical writing surface.

29. The method according to claim 26, further comprising:

determining, in the coordinate map and based on an image from a source different from a source of the panorama view, a location of a first tag corresponding to a first designated view trigger or a location of a second tag corresponding to a second designated view trigger, and based on determining, in the coordinate map, the location of the first tag or the location of the second tag, determining the coordinate instruction associated with the coordinate map of the panorama view.

30. The method according to claim 29, further comprising:

responsive to the first designated view trigger or the second designated view trigger:

detecting an instruction to calibrate and denoise the designated view signal;

calibrating the designated view signal by adjusting at least one of brightness, contrast, or gamma; and decreasing a noise in the designated view signal by decreasing a frame rate of the designated view signal and averaging two or more image frames in the designated view signal.

31. The method according to claim 29, further comprising:

responsive to the first designated view trigger or the second designated view trigger:

detecting an instruction to filter an object in the designated view, the object located in between the source different from the source of the panorama view and the physical writing surface;

detecting, in the designated view signal, a first set of digital image pixels corresponding to the blocking object; and converting the first set digital image pixels to a second set of translucent digital image pixels by performing a morphological erosion operation and a morphological dilation operation on the first set of digital image pixels.

32. The method according to claim 26, further comprising:

generating, based on a digital writing input, a digital writing signal;

generating the composite video signal including one or more of the scaled panorama view signal, the stage view signal, the designated view signal, or the digital writing signal.

33. The method according to claim 26, further comprising:

generating, based on a digital writing input, a digital writing signal;

generating, based on the digital writing signal and the designated view signal, an augmented signal by superimposing the digital writing input and the designated view;

generating the composite video signal including one or more of the scaled panorama view signal, the stage view signal, or the augmented signal.

34. The method according to claim 26, further comprising:

generating the designated view signal as a subscene of lesser height and lesser width than the panorama view.

35. The method according to claim 26, wherein the received coordinate instruction includes a direction of movement of the coordinate of the designated view, the method further comprising:

changing the designated view signal responsive to the direction of movement of the coordinate of the designated view, and periodically updating the composite video signal to show the changed designated view signal.

36. The method according to claim 26, further comprising:

receiving an instruction to change a magnification of the designated view, changing the designated view in accordance with the instruction to change the magnification of the designated view, and updating the composite video signal to reflect the changed magnification of the designated view.

37. The method according to claim 27, wherein a distance between the source different from the source of the panorama view and the physical writing surface is greater than a minimum threshold distance, and the distance is less than a maximum threshold distance.

38. The method according to claim 26, further comprising:

generating, based on a width of the composite video signal, the scaled panorama view signal as a reduced magnification of the panorama view.

39. The method according to claim 26, further comprising:

using temporal video denoising to decrease noise in the designated view signal.

40. The method of claim 26, wherein identifying the bearing of interest within the panorama uses an acoustic array having at least two microphones, the method further comprising:

comparing signals from each of the at least two microphones with one another to identify the bearing of interest.

41. The method of claim 26, further comprising:
identifying one or more of motion or human faces to identify the bearing of interest.

42. The method of claim 26, wherein the coordinate instruction includes a change in appearance of a manually designated view, the method further comprising:
changing the manually designated view in real time in accordance with the change in appearance; and
continuously updating the designated view signal to show the real-time change in appearance of the manually designated view.

43. The method of claim 26, further comprising:
processing the designated view signal with spatial noise reduction in one or more of portions of the designated view signal before compositing the designated view signal.

44. The method of claim 26, further comprising:
using temporal video separately in chroma and luma channels to decrease noise before compositing the designated view signal.

45. The method of claim 26, further comprising:
using temporal video denoising without motion compensation in areas of the designated view signal having a textural contrast level lower than a predetermined threshold to decrease noise before compositing the designated view signal.

46. The method of claim 26, further comprising:
receiving a digital writing input as vectorized path; and
generating the composite video signal based on rasterizing the digital writing input from the vectorized path to a video stream to composite the digital input in a composited split screen video stream.

47. The method of claim 26, further comprising:
receiving a digital writing input as a vectorized path; and
generating the composite video signal as a subsequent independent subscene video stream, wherein the subsequent independent video stream is transitioned into a composited split screen video stream alongside the stage view signal.

48. The method of claim 26, further comprising:
receiving a digital writing input as a vectorized path;
generating the composite video signal as an augmented reality video stream; and
augmenting the digital writing input into a composited split screen video stream projected into the stage view signal.

49. The method of claim 26, further comprising:
receiving a digital writing input as a vectorized path;
generating the composite video signal based on sampling a subsequent independent subscene video stream from the panorama view; and
transitioning the subsequent independent video stream into a composited split screen video stream alongside the stage view signal.

* * * * *